United States Patent
Young et al.

(10) Patent No.: US 11,598,115 B2
(45) Date of Patent: Mar. 7, 2023

(54) WIRE STRAND ATTACHMENT CLIP

(71) Applicant: Illinois Tool Works Inc., Glenview, IL (US)

(72) Inventors: Graeme Young, Cooks Beach (NZ); Daniel Stemper, Chicago, IL (US); Tayebeh Alirezaee, Melbourne (AU)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/328,662

(22) Filed: May 24, 2021

(65) Prior Publication Data

US 2021/0381270 A1 Dec. 9, 2021

Related U.S. Application Data

(60) Provisional application No. 63/172,399, filed on Apr. 8, 2021, provisional application No. 63/034,183, filed on Jun. 3, 2020.

(51) Int. Cl.
  *E04H 17/10* (2006.01)
  *F16B 2/24* (2006.01)
(52) U.S. Cl.
  CPC .......... *E04H 17/124* (2021.01); *F16B 2/248* (2013.01)
(58) Field of Classification Search
  CPC ....... E04H 17/02; E04H 17/10; E04H 17/124; A01K 3/005; F16B 2/248
  USPC .......................................... 256/47
  See application file for complete search history.

(56) References Cited

U.S. PATENT DOCUMENTS

| | | | |
|---|---|---|---|
| 554,977 A * | 2/1896 | Blecher | E04H 17/10 256/57 |
| 925,229 A * | 6/1909 | Rider | E04H 17/10 256/34 |
| 1,454,254 A | 5/1923 | Lee | |
| 1,499,933 A | 7/1924 | Jones | |
| 1,814,228 A * | 7/1931 | Peters | E04H 17/10 256/57 |
| 1,855,136 A | 4/1932 | Ochiltree | |

(Continued)

FOREIGN PATENT DOCUMENTS

| | | | | |
|---|---|---|---|---|
| DE | 10 2011 013292 | | 9/2012 | |
| FR | 2978808 A1 * | | 2/2013 | F16B 2/24 |

(Continued)

OTHER PUBLICATIONS

International Search Report and Written Opinion from International Patent Application No. PCT/US2021/034534, dated Sep. 24, 2021 (16 pages).

(Continued)

*Primary Examiner* — Amber R Anderson
*Assistant Examiner* — Zachary A Hall
(74) *Attorney, Agent, or Firm* — Neal, Gerber & Eisenberg LLP

(57) ABSTRACT

A wire strand attachment clip including a wire catch that defines a wire strand receiving and holding area configured to receive a wire strand, and a plurality of attachment arms connected to and extending from the wire catch that are dimensionally and biasingly configured to be positioned on a support post to attach the wire strand to that support post such that the attachment arms engage multiple surfaces of the support post.

16 Claims, 33 Drawing Sheets

(56) References Cited

U.S. PATENT DOCUMENTS

| | | | |
|---|---|---|---|
| 2,355,767 A * | 8/1944 | White | E04H 17/10 |
| | | | 256/48 |
| 2,467,604 A | 4/1949 | Tinnerman | |
| 2,631,804 A * | 3/1953 | Uhlhorn | E04H 17/12 |
| | | | 24/131 R |
| 2,802,644 A | 8/1957 | Ferdinand et al. | |
| 3,411,754 A | 11/1968 | Fahrenholz | |
| 3,508,730 A | 4/1970 | Knezo, Jr. | |
| 3,820,758 A | 6/1974 | Berg et al. | |
| 4,936,550 A | 6/1990 | Wickham et al. | |
| 5,303,821 A * | 4/1994 | Ayres | F16B 15/0015 |
| | | | 206/346 |
| 5,350,155 A | 9/1994 | Burk | |
| 5,733,085 A | 3/1998 | Shida et al. | |
| 5,927,163 A | 7/1999 | Habermehl et al. | |
| 6,050,549 A | 4/2000 | Foy | |
| 6,071,053 A | 6/2000 | Kuhns | |
| 6,499,514 B1 | 12/2002 | Hodge | |
| 6,619,627 B2 | 9/2003 | Salisbury et al. | |
| 6,705,598 B2 | 3/2004 | Collins | |
| 6,883,785 B1 | 4/2005 | Knapp | |
| 6,959,630 B2 | 11/2005 | Habermehl | |
| 7,273,337 B2 | 9/2007 | Lat et al. | |
| 7,511,227 B2 | 3/2009 | Ritchie | |
| 7,960,654 B2 | 6/2011 | Ritchie | |
| 7,968,797 B2 | 6/2011 | Williams | |
| 8,141,853 B2 | 3/2012 | Malins | |
| 8,353,658 B2 | 1/2013 | Heskel et al. | |
| 8,480,061 B2 | 7/2013 | Graves | |
| 8,650,740 B2 | 2/2014 | Heskel et al. | |
| 8,893,458 B2 | 11/2014 | Lawson et al. | |
| 9,234,367 B2 | 1/2016 | Kopp | |
| 10,323,436 B2 | 6/2019 | White et al. | |
| 10,358,840 B2 | 7/2019 | Hiner et al. | |
| 10,593,168 B2 | 3/2020 | Brown | |
| 2008/0276761 A1 | 11/2008 | Hale et al. | |
| 2010/0283023 A1 | 11/2010 | Thompson | |
| 2012/0067007 A1 | 3/2012 | Lawson et al. | |
| 2015/0028604 A1 | 1/2015 | Lankford | |
| 2020/0256085 A1 | 8/2020 | Hiner et al. | |

FOREIGN PATENT DOCUMENTS

| | | | |
|---|---|---|---|
| GB | 1207741 A * | 10/1970 | F16B 2/24 |
| GB | 1323388 A | 7/1973 | |
| GB | 2187771 A | 9/1987 | |
| WO | WO 2011/020165 | 2/2011 | |

OTHER PUBLICATIONS

Clip Bender image (available prior to Sep. 11, 2020)(1 page).
Fence Fork Clips image (available prior to Sep. 11, 2020)(1 page).
LockJawz—The Last T-Post Insulator You Will Ever Need, retrieved from the Internet at https://www.lockjawz.com/, on Sep. 29, 2020 (available prior to Sep. 11, 2020)(10 pages).
Stay-Tuff T Post Clip & 11ga drill chuck image (available prior to Sep. 11, 2020)(1 page).
T-Post Clips—CHS image (available prior to Sep. 11, 2020)(1 page).
T-Post Clips—CMC image (available prior to Sep. 11, 2020)(1 page).
T-Post Gripper—Goldenrod image (available prior to Sep. 11, 2020)(1 page).
International Search Report and Written Opinion from International Patent Application No. PCT/US2021/034560, dated Jul. 29, 2021 (10 pages).

\* cited by examiner

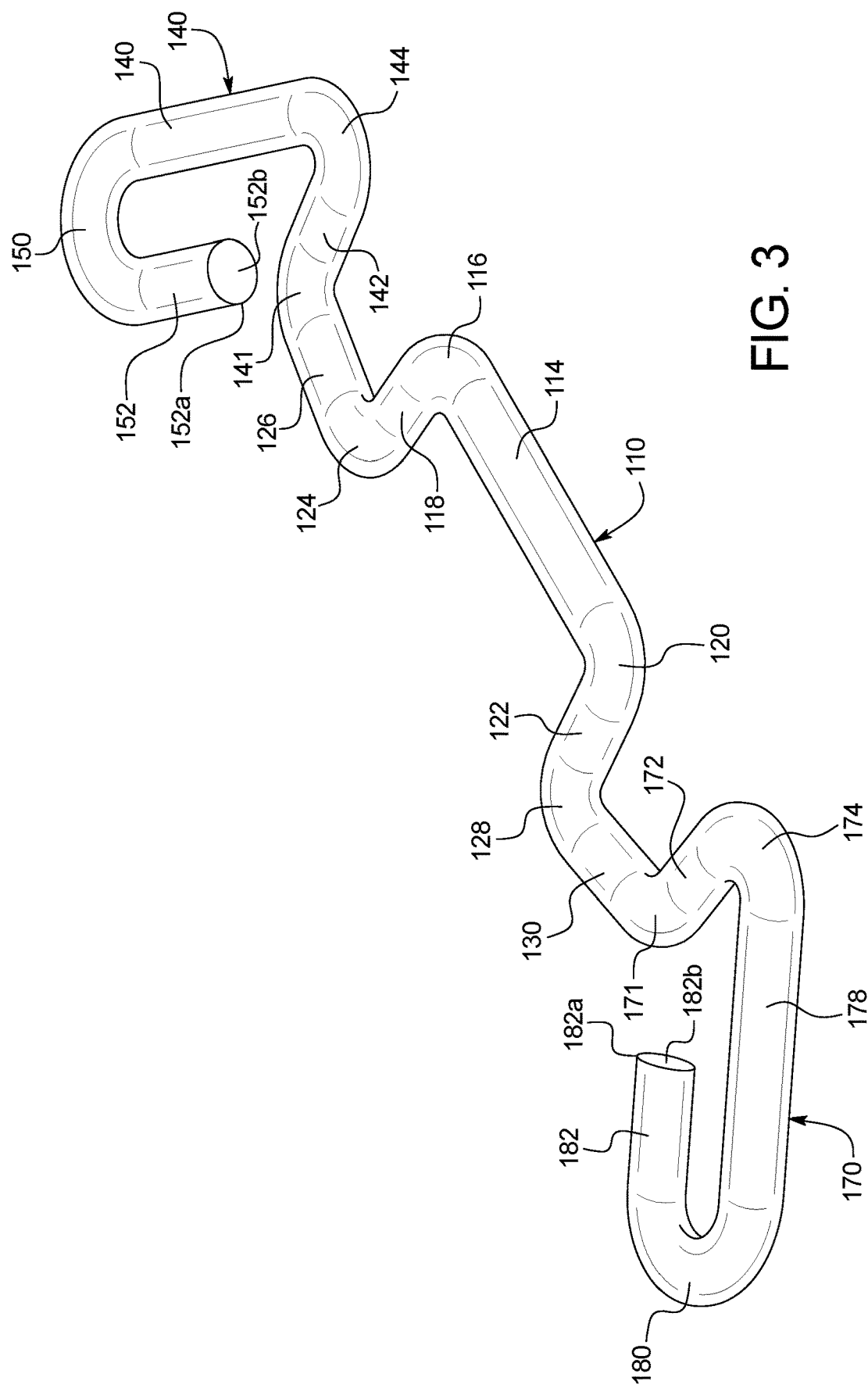

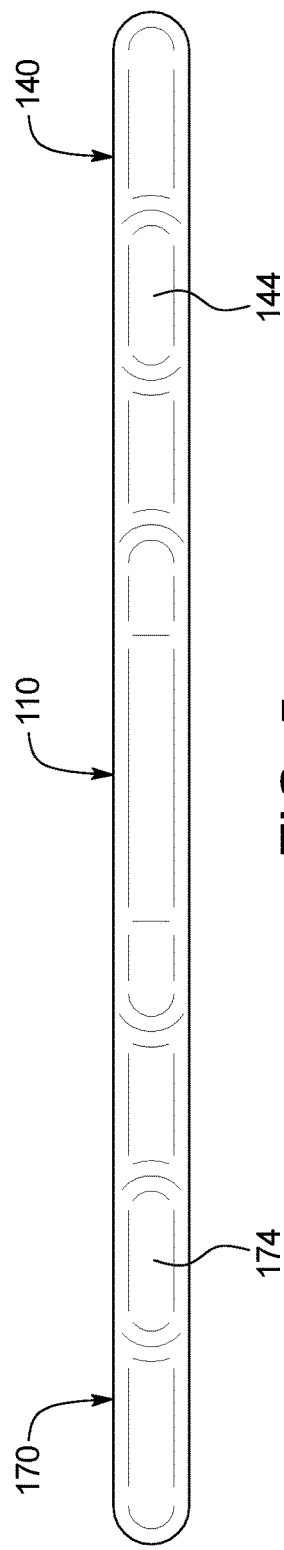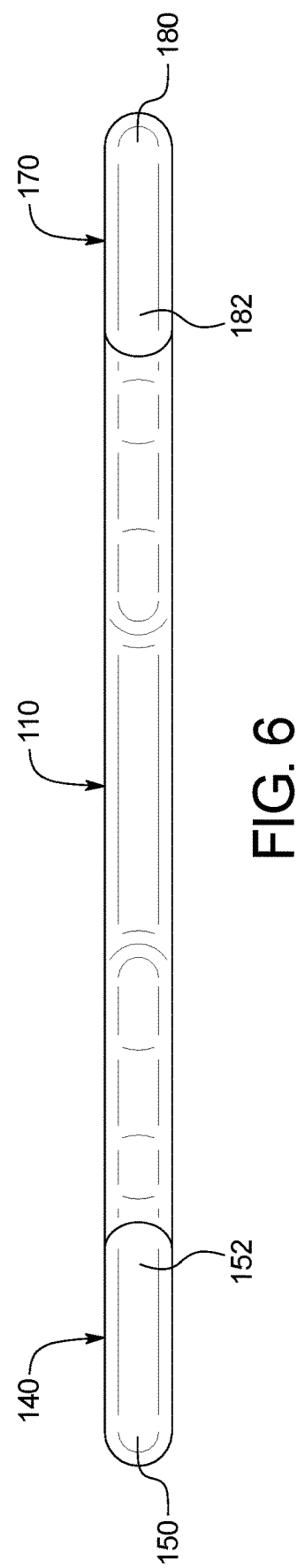

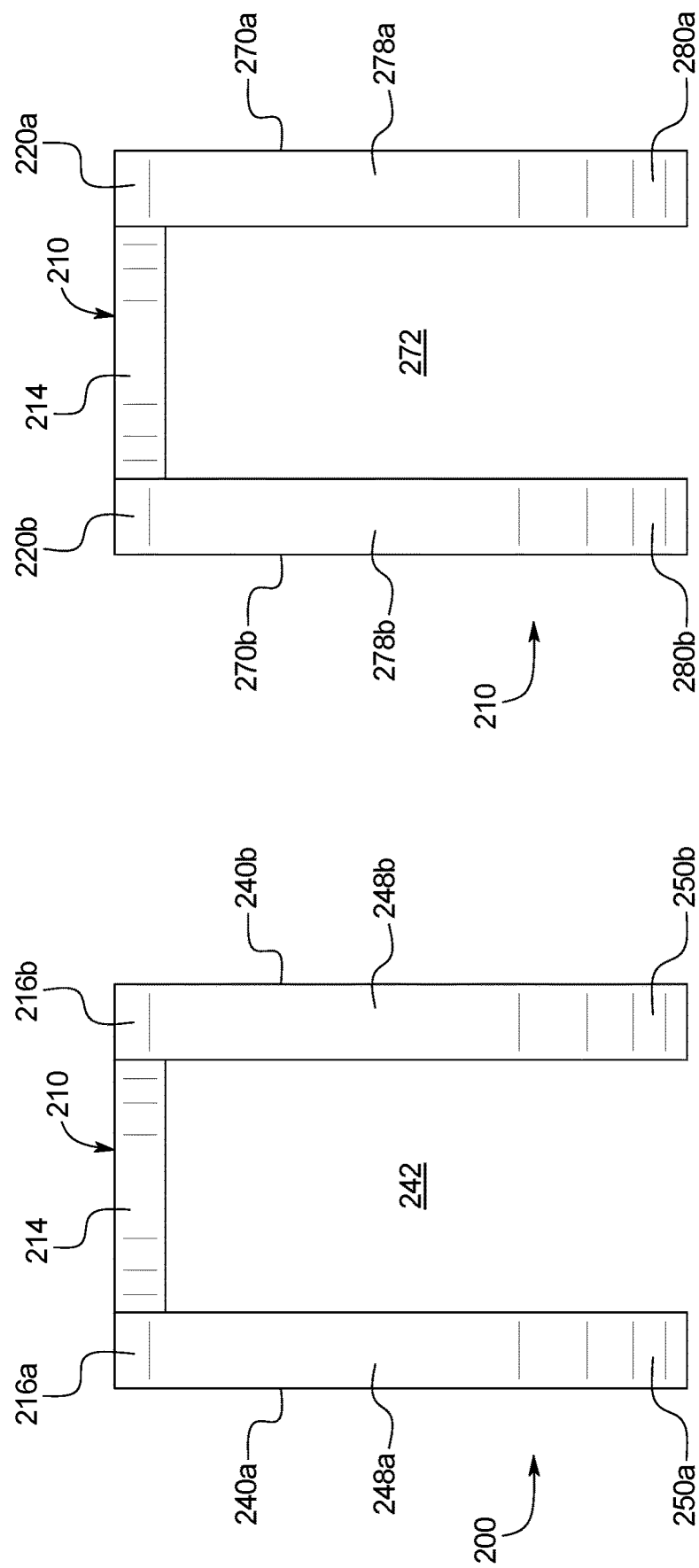

WIRE STRAND ATTACHMENT CLIP

PRIORITY CLAIM

This application claims priority to and the benefit of U.S. Provisional Patent Application No. 63/034,183, filed Jun. 3, 2020, and of U.S. Provisional Patent Application No. 63/172,399, filed Apr. 8, 2021, the entire contents of which are incorporated herein by reference.

CROSS-REFERENCE TO RELATED APPLICATION

This application is related to the following commonly owned co-pending patent application: U.S. application Ser. No. 17/328,630, entitled "WIRE STRAND ATTACHMENT CLIP".

BACKGROUND

Various widely used fences (such as boundary fences, farm fences, and livestock boundary fences) have incorporated a series of wire strands (such as an electrically conductive metal single wire, barbed wire, or other wire with multiple strands) attached to a series of metal support posts that are each secured in the ground. The metal support posts frequently used for such fences include a ground securing mechanism connected to an elongated stem. The elongated stem extends upwardly (typically vertically) from the ground securing mechanism. The elongated stem typically has a T-shaped cross-section and typically has spaced-apart alignment guides that are sometimes employed to maintain the spacing of wire strands that form the fence. In various known fences, each of the wire strands are secured to each of the metal posts by a wire strand attachment device. Various known wire strand attachment devices have been employed. For example, one such known wire strand attachment device includes a short length of attachment wire that has a first end wrapped around the wire strand, a middle section passed around the metal support post, and a second end wrapped around the wire strand to hold the wire strand to the metal support post. To attain a tightly stretched and secured fence when using the this wire strand attached device, it is often necessary to employ a tool such as a wire puller in tandem. This is a time-consuming and cumbersome task, especially in view of the large quantity of such wire strand attachment devices that are needed to build a typical large boundary fence. While various other wire strand attachment devices have been proposed and employed to solve this problem, there is a continuing need for improved wire strand attachment devices that can be quickly, easily, and cost effectively employed to attach wire strands to support posts.

SUMMARY

Various embodiments of the present disclosure provide a wire strand attachment clip that can be quickly, easily, and cost effectively used to attach a wire strand to a support post such as a barbed and/or electrically conductive metal wire strand to a T-shaped metal support post. In various embodiments, a plurality of wire strand attachment clips of the present disclosure can be quickly, easily, and cost effectively used to attach a plurality of wire strands to a plurality of support posts to build a fence. In various embodiments of the present disclosure, the wire strand attachment clip includes a wire catch, a first attachment arm connected to and extending from the wire catch, and a second attachment arm connected to and extending from the wire catch. Generally, the wire catch, the first attachment arm, and the second attachment arm are dimensionally and biasingly configured to be positioned on a T-shaped support post to attach a wire strand to that T-shaped support post, and particularly such that the wire catch and/or the attachment arms engage(s) spaced apart rear or side surfaces of the T-shaped support post, such that the first and second attachment arms engage spaced apart front surfaces of the T-shaped support post, and such that the wire catch engages and holds the wire strand to the T-shaped support post.

Other objects, features, and advantages of the present disclosure will be apparent from the following detailed disclosure and accompanying drawings.

BRIEF DESCRIPTION OF THE FIGURES

FIG. 3 is an enlarged perspective view of the wire strand attachment clip of FIGS. 1 and 2.

FIG. 5 is an enlarged rear view of the wire strand attachment clip of FIGS. 1 and 2.

FIG. 6 is an enlarged front view of the wire strand attachment clip of FIGS. 1 and 2.

FIG. 15 is an enlarged first side view of the wire strand attachment clip of FIG. 10.

FIG. 16 is an enlarged second side view of the wire strand attachment clip of FIG. 10.

DETAILED DESCRIPTION

Figure 1:
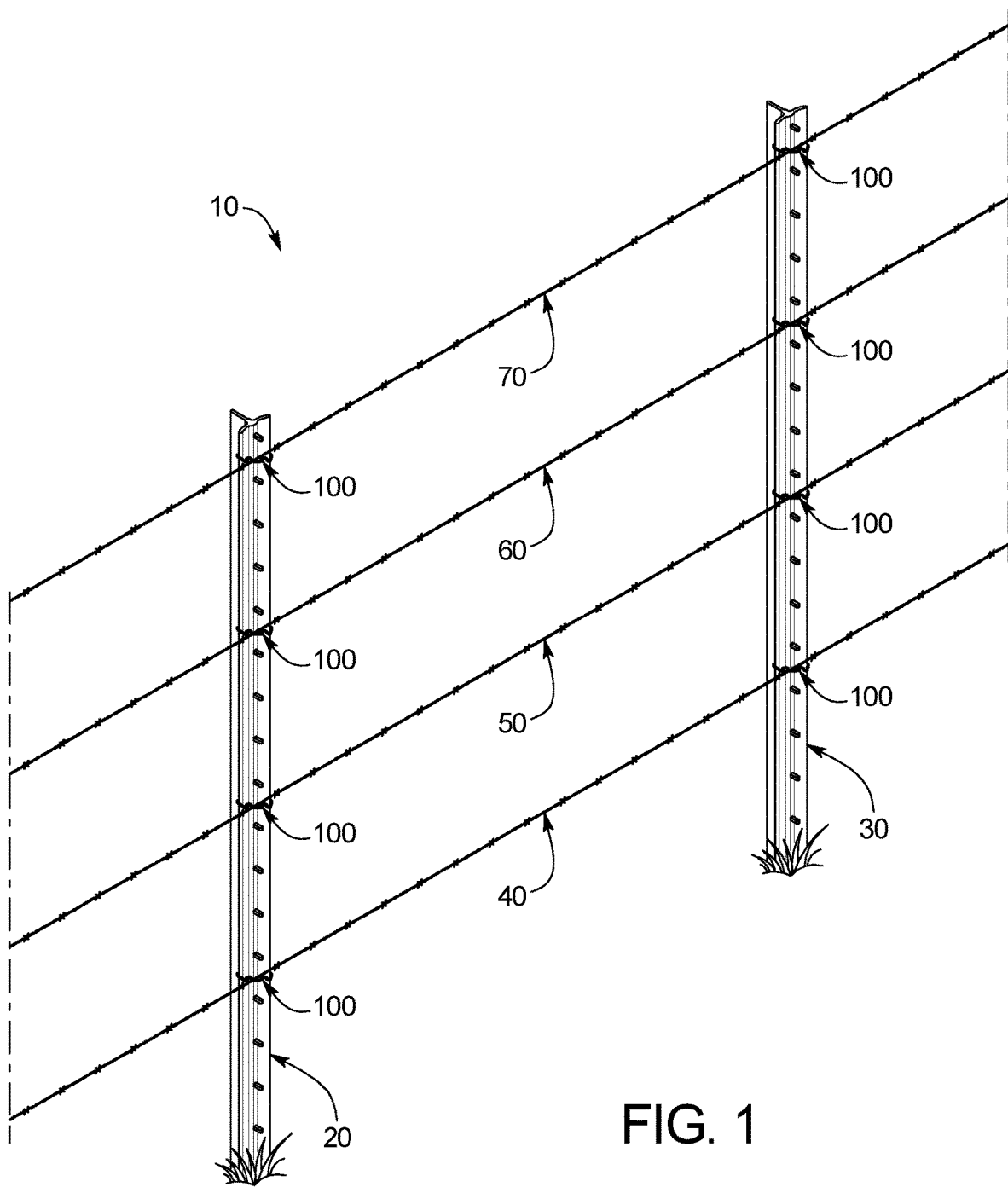
FIG. 1 is a fragmentary perspective view of a portion of an example boundary fence including a plurality of example vertically spaced apart T-shaped support posts and a plurality of example horizontally spaced apart wire strands attached to the plurality of spaced apart T-shaped support posts by a plurality of wire strand attachment clips of one example embodiment of the present disclosure.

While the systems, devices, and methods described herein may be embodied in various forms, the drawings show and the specification describes certain exemplary and non-limiting embodiments. Not all components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as mounted, connected, etc., are not intended to be limited to direct mounting methods but should be interpreted broadly to include indirect and operably mounted, connected, and like mounting methods. This specification is intended to be taken as a whole and interpreted in accordance with the principles of the present disclosure and as understood by one of ordinary skill in the art.

FIGS. 1 to 9 illustrate one example embodiment of a wire strand attachment clip of the present disclosure that is generally indicated by numeral 100 (and that may be sometimes referred to herein as a "clip" for brevity). FIGS. 1, 2, 7, 8, and 9 generally show how a plurality of the illustrated example wire strand attachment clips 100 attach a plurality of example horizontally spaced apart wire strands 40, 50, 60, and 70, to a plurality of example T-shaped support posts 20 and 30 to form part of an example boundary fence 10, as further discussed below. It should be appreciated that the wire strand attachment clip 100 of the present disclosure can be employed with different wire strands and different support posts in accordance with the present disclosure. As best shown in FIGS. 2 to 9, the illustrated example wire strand attachment clip 100 includes: (1) a wire catch 110; (2) a first attachment arm 140 connected to and extending from the wire catch 110; and (3) a second attachment arm 170 connected to and extending from the wire catch 110. Generally, the wire catch 110, the first attachment arm 140, and the second attachment arm 170 are dimensionally and biasingly configured to snap onto a T-shaped support post (such as post 20) to attach a wire strand (such as strand 40) to that T-shaped support post 20, and particularly such that the wire catch 110 and/or the attachments arms 140 and 170 engage (s) spaced apart rear or side surfaces of the T-shaped support post 20, such that the first and second attachment arms 140 and 170 engage spaced apart front surfaces of the T-shaped support post 20, and such that the wire catch 110 can engage and hold the wire strand 40 to the T-shaped support post 20, as further described below. In this illustrated example embodiment, the wire strand attachment clip 100 is formed (and particularly bent) into its shape from a solid straight cylindrical metal (and particularly steel such as a carbon spring steel) wire having about a 0.124 inch to about a 0.138 inch (about a 3.15 mm to about a 3.5 mm) outer diameter and a suitable length. It should be appreciated that the wire strand attachment clip 100 can be formed from other suitable materials and formed from other wires having other suitable outer diameters and lengths. The wire strand attachment clip 100 is formed such that the wire catch 110, the first attachment arm 140, and the second attachment arm 170 each have a desired amount of flexibility or bendability relative to each other, and a reasonably strong bias back toward their respective original positions relative to one another, as further described below.

More specifically, the illustrated example wire catch 110 includes: (1) a rear wire engager 114; (2) a first connector 116 connected to and extending forwardly and outwardly from a first end of the rear wire engager 114; (3) a first side wire engager 118 connected to and extending forwardly from the first connector 116 and from the first end of the rear wire engager 114; (4) a second connector 120 connected to and extending forwardly and outwardly from a second end of the rear wire engager 114; (5) a second side wire engager 122 connected to and extending forwardly from the second connector 120 and the second end of the rear wire engager 114; (6) a third connector 124 connected to and extending forwardly and outwardly from a front end of the first side wire engager 118; (7) a first side post engager 126 connected to and extending outwardly from the third connector 124 and from the front end of the first side wire engager 118; (8) a fourth connector 128 connected to and extending forwardly and outwardly from a front end of the second side wire engager 122; and (9) a second side post engager 130 connected to and extending outwardly from the fourth connector 128 and from the front end of the second side wire engager 122. The rear wire engager 114, the first connector 116, the first side wire engager 118, the second connector 120, the second side wire engager 122, the third connector 124, and the fourth connector 128 define a wire strand receiving and holding area 112 that receives the wire strand and also allows for certain movements of the wire strand in the wire strand receiving and holding area 112. When the wire catch 110, the first attachment arm 140, and the second attachment arm 170 are snapped onto a T-shaped support post (such as post 20) to attach a wire strand (such as strand 40) to that T-shaped support post 20, the first side post engager 126 and the second side post engager 130 are configured to, in certain instances, securely engage spaced apart rear surfaces of the T-shaped support post 20 to provide a secure attachment of the wire strand attachment clip 100 to the T-shaped support post 20 and to prevent the wire strand 40 from exiting the wire strand receiving and holding area 112.

In this illustrated example embodiment, the first connector 116, the second connector 120, the third connector 124, and the fourth connector 128 are each curved sections formed from the solid cylindrical metal wire employed to form the wire strand attachment clip 100. It should be appreciated that one or more of these connectors can be otherwise suitably formed in accordance with the present disclosure.

In this illustrated example embodiment, the rear wire engager 114, the first side wire engager 118, the second side wire engager 122, the first side post engager 126, and the second side post engager 130 are each straight sections formed from the solid cylindrical metal employed to form the wire strand attachment clip 100. It should be appreciated that one or more of these engagers can be otherwise suitably formed in accordance with the present disclosure. It should also be appreciated that two or more of each respective pair of connectors and engagers can be combined in accordance with the present disclosure.

In this illustrated example embodiment, the first connector 116, the first side wire engager 118, the third connector 124, and the first side wire engager 118 are symmetrical to the second connector 120, the second side wire engager 122, the fourth connector 128, and the second side post engager 130 with respect to the rear wire engager 114. It should be appreciated that such connectors and engagers can be non-symmetrical in accordance with the present disclosure. In this illustrated example embodiment, the first connector 116, the first side wire engager 118, the third connector 124, and the first side wire engager 118 have the same respective dimensions as the second connector 120, the second side wire engager 122, the fourth connector 128, and the second side post engager 130 with respect to the rear wire engager 114. It should be appreciated that such respective connectors and engagers can have different dimension in accordance with the present disclosure.

In this illustrated example embodiment, (1) the first side wire engager 118 extends at about a 89 to 95 degree angle (labeled A1) from the rear wire engager 114; (2) the second side wire engager 122 extends at about a 89 to 95 degree angle (labeled A2) from the rear wire engager 114; (3) the first side post engager 126 extends at about a 85 to 90 degree angle (labeled B1) from the first side wire engager 118; and (4) the second side post engager 130 extends at about a 85 to 90 degree angle (labeled B2) from the second side wire engager 118. It should be appreciated that one or more of such angles may vary in accordance with the present disclosure. In various example embodiments of the present disclosure, (1) angle A1 may be in the range of about 89 degrees to about 95 degrees; (2) angle A2 may be in the range of about 89 degrees to about 95 degrees; (3) angle B1 may be in the range of about 85 degrees to about 90 degrees; and (4) angle B2 may be in the range of about 85 degrees to about 90 degrees.

The illustrated example first attachment arm 140 includes: (1) a first arm shoulder 141 connected to and extending outwardly and rearwardly from the first side post engager 126; (2) a first upper arm 142 connected to and extending outwardly and rearwardly from the first arm shoulder 141 and from the first side post engager 126; (3) a first elbow 144 connected to and extending outwardly and then forwardly from the first upper arm 142; (4) a first forearm 148 connected to and extending outwardly and forwardly from the first elbow 144; (5) a first wrist 150 connected to and extending outwardly and forwardly from the first forearm 148 and then rearwardly and inwardly back toward the first arm shoulder 141 and the rear wire engager 114; and (6) a first post engagement hand 152 connected to and extending inwardly and rearwardly from first wrist 150 toward the first arm shoulder 141 and the rear wire engager 114.

The illustrated example second attachment arm 170 includes: (1) a second arm shoulder 171 connected to and extending outwardly and rearwardly from the second side post engager 130; (2) a second upper arm 172 connected to and extending outwardly and rearwardly from the second arm shoulder 171 and from the second side post engager 130; (3) a second elbow 174 connected to and extending outwardly and then forwardly from the second upper arm 172; (4) a second forearm 178 connected to and extending outwardly and forwardly from the second elbow 174; (5) a second wrist 180 connected to and extending outwardly and forwardly from the second forearm 178 and then rearwardly and inwardly back toward the second arm shoulder 171 and the rear wire engager 114; and (6) a second post engagement hand 182 connected to and extending inwardly and rearwardly from the second wrist 180 toward the second arm shoulder 171 and the rear wire engager 114.

Figure 2:
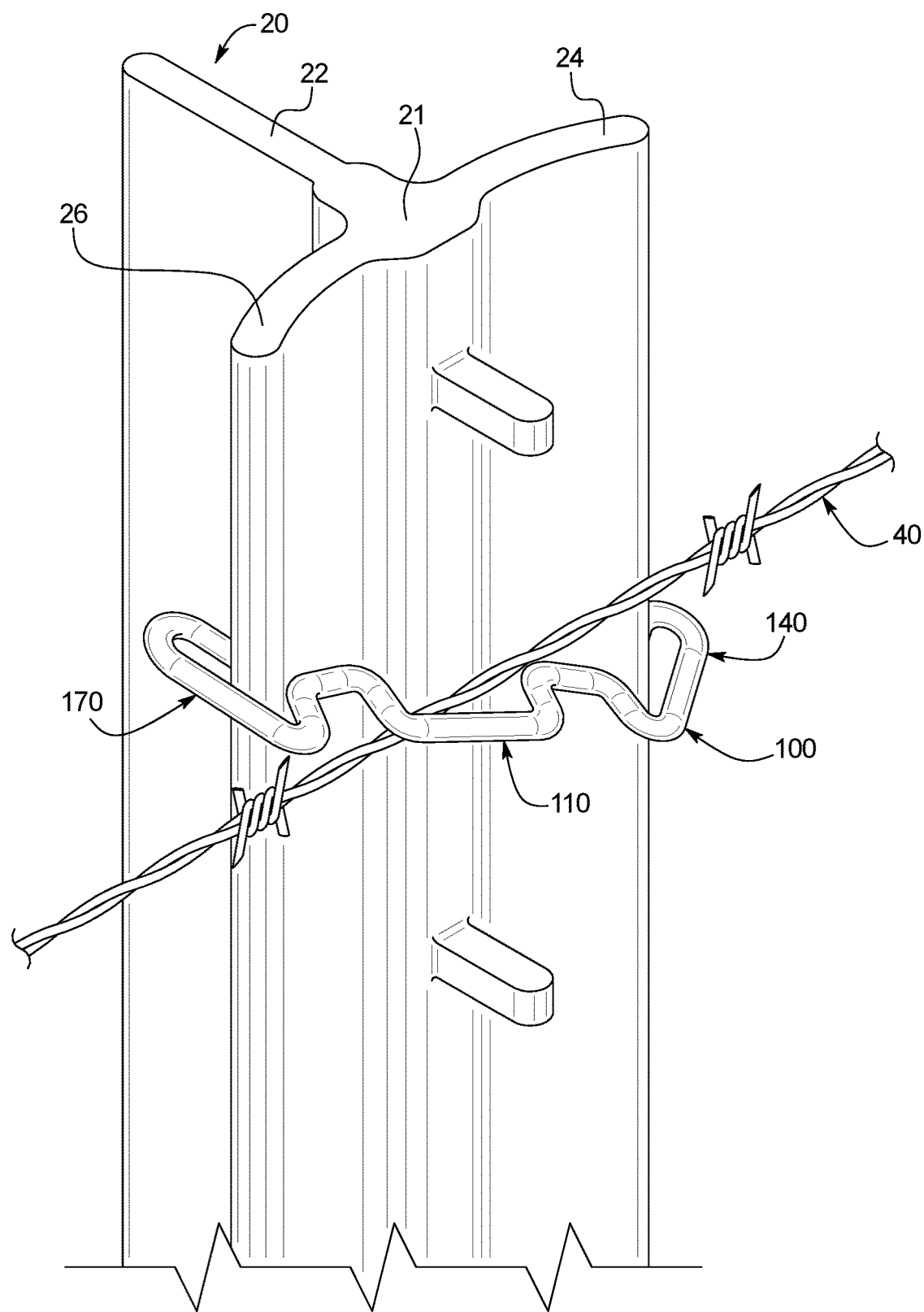
FIG. 2 is an enlarged fragmentary perspective view of a portion of one of the T-shaped support posts and one of the wire strands attached to the T-shaped support post of the boundary fence of FIG. 1, and showing one of the wire strand attachment clips of FIG. 1 attaching that wire strand to that T-shaped support post.
Figure 9:
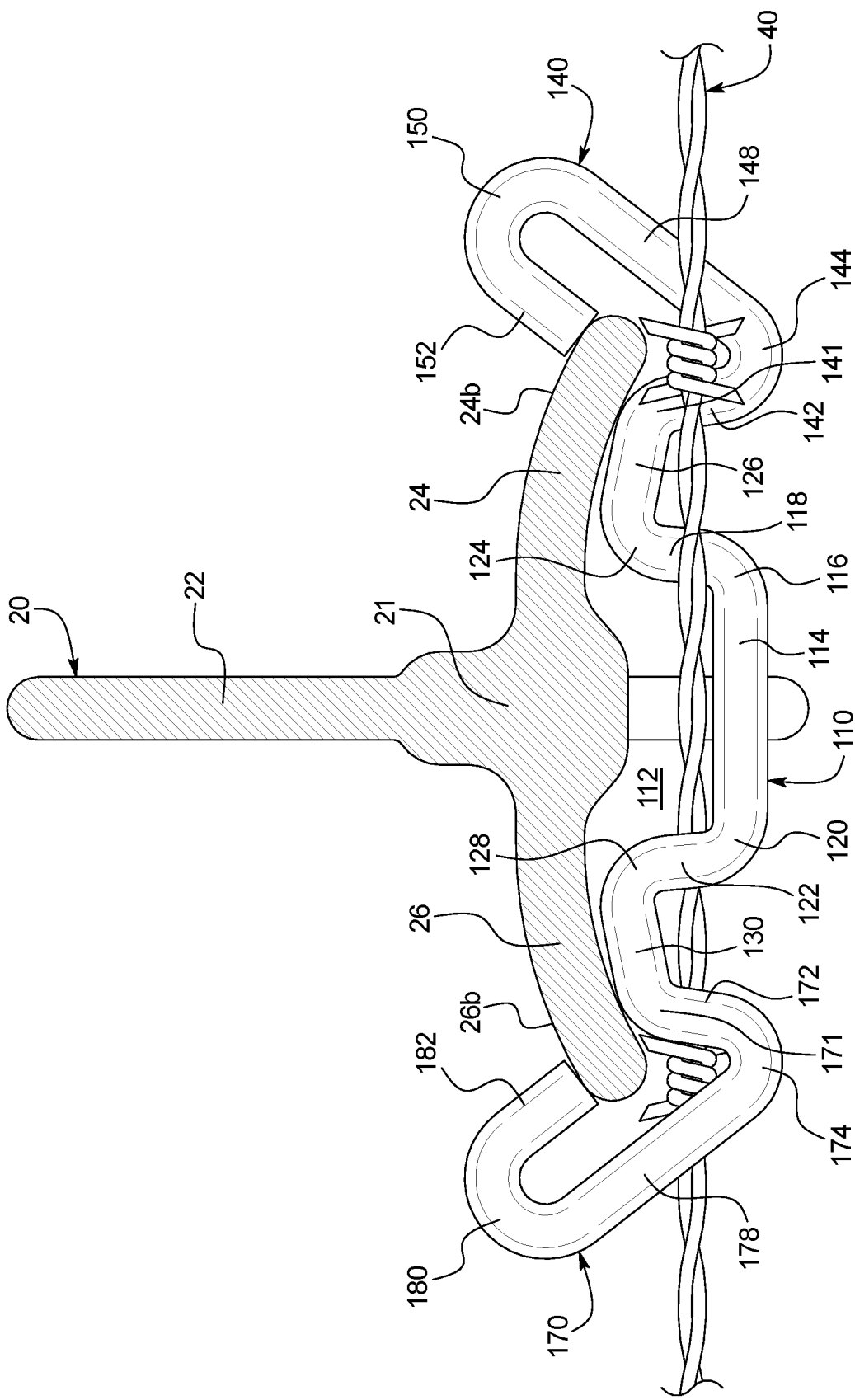
FIG. 9 is an enlarged top view of the wire strand attachment clip of FIGS. 1 and 2, an enlarged fragmentary perspective view of the wire strand, and an enlarged cross-sectional view of the T-shaped support post of FIG. 2 after the attachment process, showing the engagement of the wire strand attachment clip with the T-shaped support post after the attachment process, and showing the engagement of the wire strand attachment clip with the wire strand after the attachment process.

When the wire catch 110, the first attachment arm 140, and the second attachment arm 170 are snapped onto a T-shaped support post (such as post 20) to attach a wire strand (such as strand 40) to that T-shaped support post 20, the first arm shoulder 141, the first post engagement hand 152, the first arm shoulder 171, and the second post engagement hand 182 are configured to securely engage spaced apart front surfaces of the T-shaped support post 20 to provide a secure attachment of the wire strand attachment clip 100 to the T-shaped support post 20 and to prevent the wire strand 40 from exiting the wire strand receiving and holding area 112, as best seen in FIGS. 2 and 9.

In this illustrated example embodiment, the first arm shoulder 141, the first elbow 144, the first wrist 150, the second arm shoulder 171, the second elbow 174, and the second wrist 180 are each formed as curved sections from the solid cylindrical metal employed to form the wire strand attachment clip 100. It should be appreciated that one or more of these shoulders, elbows, and wrists can be otherwise suitably formed in accordance with the present disclosure.

In this illustrated example embodiment, the first upper arm 142, the first forearm 148, the first post engagement hand 152, the second upper arm 172, the second forearm 178, and the second post engagement hand 182 are each formed as straight sections of the solid cylindrical metal employed to form the wire strand attachment clip 100. It should be appreciated that one or more of these sections can be otherwise suitably formed in accordance with the present disclosure. It should also be appreciated that two or more of each respective pair of shoulders, elbows, wrists, upper arms, forearms, and hands can be combined in accordance with the present disclosure.

In this illustrated example embodiment, the first attachment arm 140 and the second attachment arm 170 (including the respective shoulders, elbows, wrists, upper arms, forearms, and hands) are symmetrical relative to each other and with respect to the wire strand catch 110. It should be appreciated that such components can be non-symmetrical in accordance with the present disclosure. In this illustrated example embodiment, the first attachment arm 140 and the second attachment arm 170 are of the same dimensions, and specifically the respective shoulders 141 and 171, elbows 144 and 174, wrists 150 and 180, upper arms 142 and 172, forearms 148 and 178, and hands 152 and 182 have the same respective dimensions. It should be appreciated that such components can have different dimensions in accordance with the present disclosure.

In this illustrated example embodiment, (1) the first upper arm 142 extends at about a 112 degree angle (labeled C1) from the first side post engager 126; (2) the first forearm 148 extends at about a 34 degree angle (labeled D1) from the first upper arm 142; (3) the first hand 152 extends at a 180 degree angle (labeled E1) from the first forearm 148; (4) the second upper arm 172 extends at about a 112 degree angle (labeled C2) from the second side post engager 130; (5) the second forearm 178 extends at about a 34 degree angle (labeled D2) from the second upper arm 172; and (6) the second hand 182 extends at about a 180 degree angle (labeled E2) from the second forearm 178. It should be appreciated that one or more of such angle may vary in accordance with the present disclosure. In various example embodiments of the present disclosure, (1) angle C1 may be in the range of about 110 degrees to about 125 degrees; (2) angle C2 may be in the range of about 110 degrees to about 125 degrees; (3) angle D1 may be in the range of about 30 degrees to about 36 degrees; (4) angle D2 may be in the range of about 30 degrees to about 36 degrees; (5) angle E1 may be in the range of about 175 degrees to about 185 degrees; and (6) angle E2 may be in the range of about 175 degrees to about 185 degrees.

Figure 7:
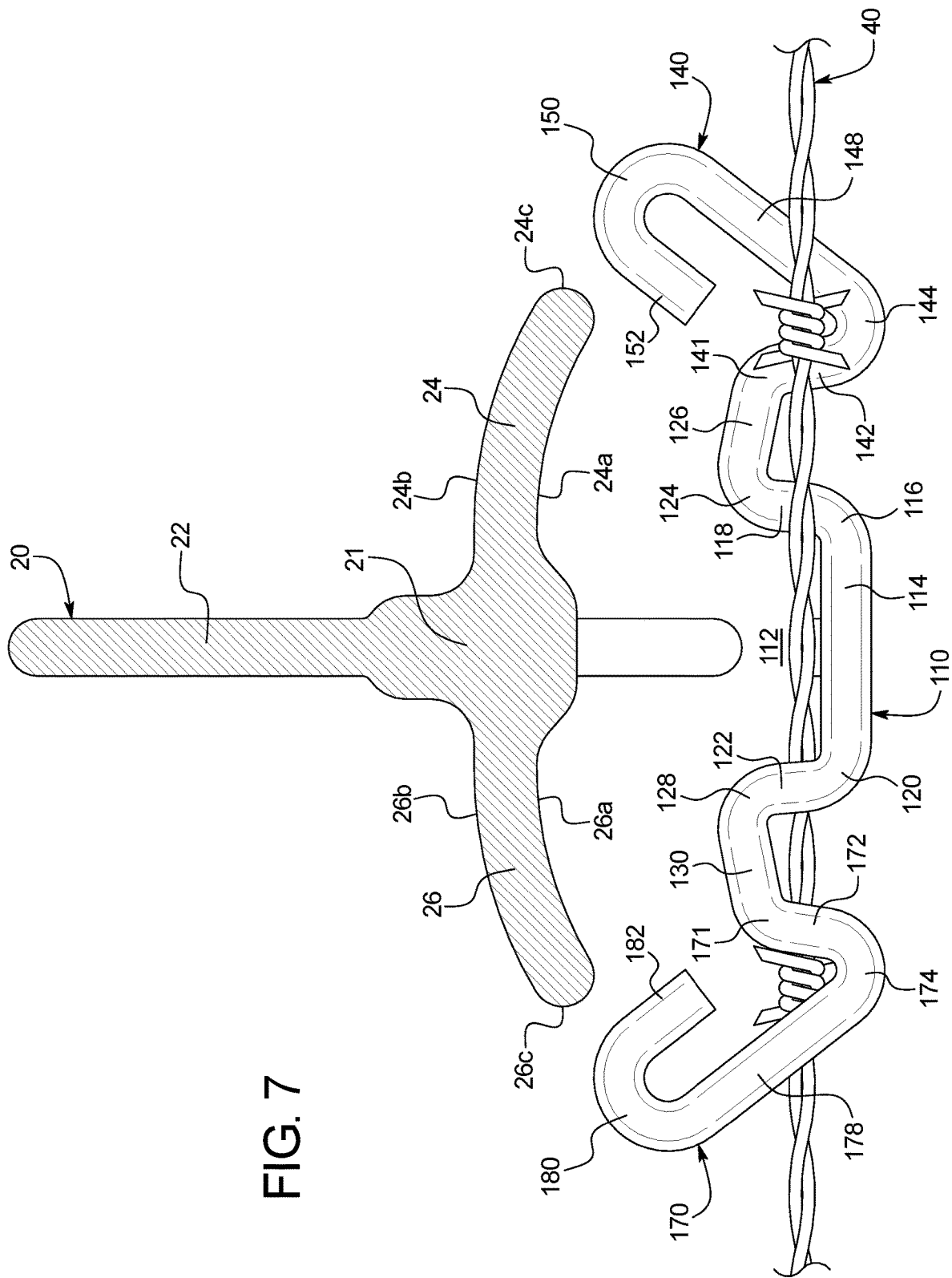
FIG. 7 is an enlarged top view of the wire strand attachment clip of FIGS. 1 and 2, an enlarged fragmentary perspective view of the wire strand, and an enlarged cross-sectional view of the T-shaped support post of FIG. 2 prior to the attachment of the wire strand attachment clip to the T-shaped support post.
Figure 8:
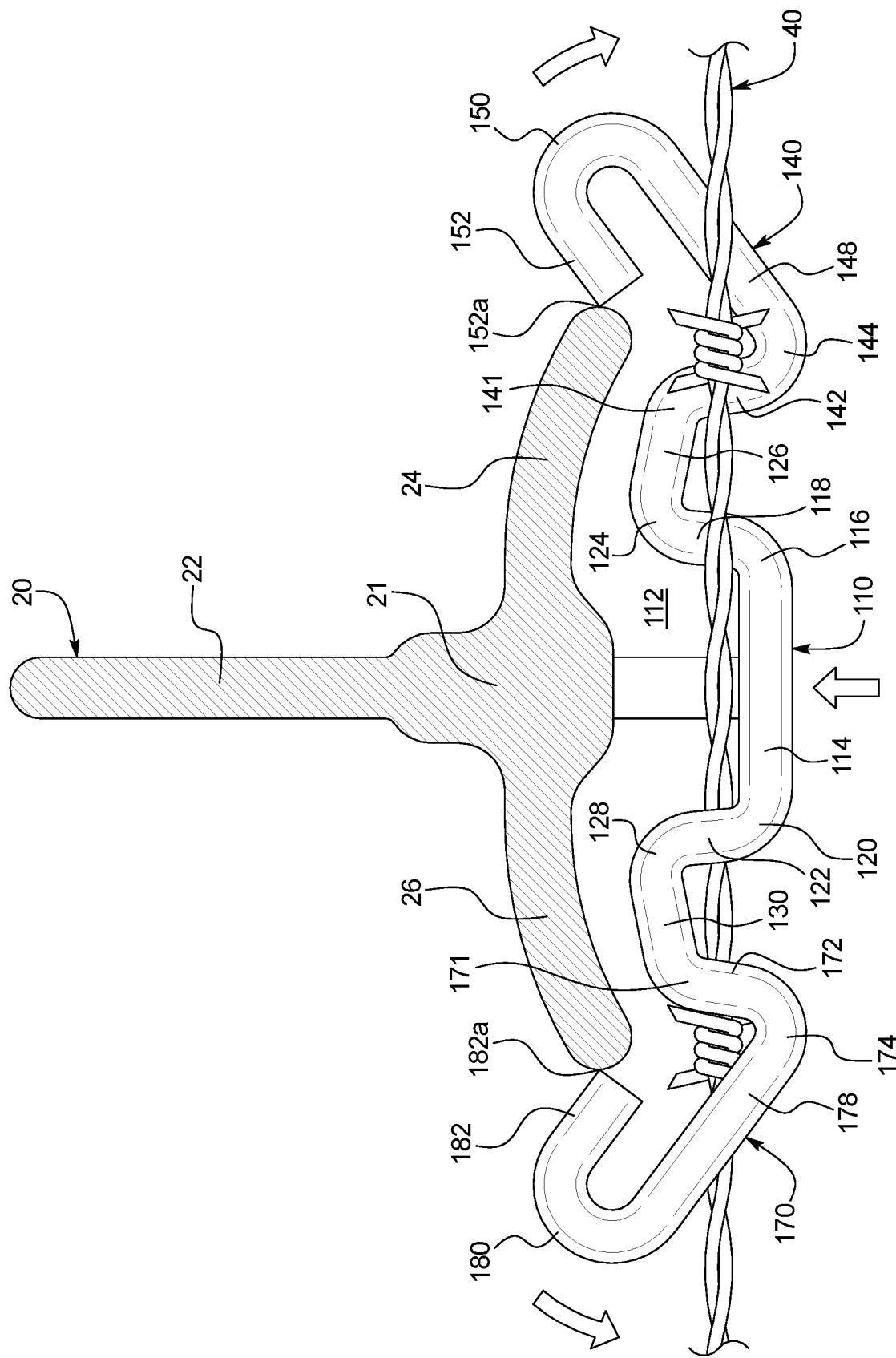
FIG. 8 is an enlarged top view of the wire strand attachment clip of FIGS. 1 and 2, an enlarged fragmentary perspective view of the wire strand, and an enlarged cross-sectional view of the T-shaped support post of FIG. 2 as the wire strand attachment clip is being attached to the T-shaped support post, showing the engagement of the arms of the wire strand attachment clip with the T-shaped support post during an attachment process, and showing the opening of the arms of the wire strand attachment clip with the T-shaped support post during the attachment process.

As shown in FIGS. 7, 8, and 9, the wire strand attachment clip 100 and specifically the wire catch 110, the first attachment arm 140, and the second attachment arm 170 are configured to snap onto a T-shaped support post 20 to attach a wire strand 40 to that T-shaped support post 20. In this illustrated example, the wire strand 40 is a barbed wire strand. In this illustrated example, the T-shaped support post 20 includes: (1) an elongated core 21; (2) an elongated front leg 22 connected to and extending from the front of the elongated core 21; (3) an elongated first side leg 24 connected to and extending from a first side of the elongated core 21; and (4) an elongated second side leg 26 connected to and extending from an opposite second side of the front of the elongated core 21. The elongated first side leg 24 includes: (a) a curved (concave) rear surface 24a; (b) a curved (convex) front surface 24b; and (c) a curved (convex) side surface 24c connecting the rear surface 24a and the front surface 24b. The elongated second side leg 26 includes: (a) a curved (concave) rear surface 26a; (b) a curved (convex) front surface 26b; and (3) a curved (convex) side surface 26c connecting the rear surface 26a and the front surface 26b.

More specifically, FIG. 7 shows the positions of the wire strand attachment clip 100 and specifically the wire catch 110, the first attachment arm 140, and the second attachment arm 170 relative to, but before being attached to, the T-shaped support post 20 and before attaching the wire strand 40 to the T-shaped support post 20. At this point in the attachment process, the wire strand attachment clip 100 is positioned relative to the T-shaped support post 20. Specifically, (1) the wire catch 110 is aligned with the wire strand 40 such that the wire strand 40 can be positioned in the wire strand receiving area 112; (2) the first attachment arm 140 is aligned with the first side leg 24 such that the hand 152 is aligned to engage the curved side surface 24c of the first side leg 24 of the T-shaped support post 20; and (3) the second attachment arm 170 is aligned with the second side leg 26 such that the hand 182 is aligned to engage the curved side surface 26c of the second side leg 26 of the T-shaped support post 20. It should be appreciated that the wire strand attachment clip 100 is configured to be angled relative to the T-shaped support post 20 (such as shown in FIG. 2) such that the first attachment arm 140 and the second attachment arm 170 are positioned at different heights (i.e., one is higher than the other) to account for the correct positioning of the wire strand 40 in the wire strand receiving area 112.

FIG. 8 shows the position of the wire strand attachment clip 100 and specifically the wire catch 110, the first attachment arm 140, and the second attachment arm 170 during the attachment process relative to the T-shaped support post 20. At this point in the attachment process, the wire strand attachment clip 100 is positioned in engagement with the T-shaped support post 20. Specifically, (1) the wire catch 110 is aligned with the wire strand 40 such that the wire strand 40 is in the wire strand receiving area 112; (2) the first attachment arm 140 is engaging the first side leg 24 such that the hand 152 is engaging the curved side surface 24c of the first side leg 24 of the T-shaped support post 20; and (3) the second attachment arm 170 is engaging the second side leg 26 such that the hand 182 is engaging the curved side surface 26c of the second side leg 26 of the T-shaped support post 20. The combination of the engagement of: (1) the hand 152 with the curved side surface 24c of the elongated first side leg 24 of the T-shaped support post 20; and (2) the hand 182 with the curved side surface 26c of the elongated second side leg 26 of the T-shaped support post 20, causes the first attachment arm 140 and the second attachment arm 170 to open wider (with respect to each other) against their respective natural positions. It should be appreciated that each of the curved connectors 116, 120, 124, and 128, each of the curved shoulders 141 and 171, and each of the curved elbows 144 and 174 facilitate this opening of the first attachment arm 140 and the second attachment arm 170. It should also be appreciated that the amount of opening of the first attachment arm 140 and the second attachment arm 170 varies based on the points of engagements with the curved side surfaces 24c and 26c of the T-shaped support post 20. The maximum amount of opening is shown in FIG. 8, where the outer corner edges 152a and 182a of the hands 152 and 182 engage the outermost points of the curved side surfaces 24c and 26c of the T-shaped support post 20. It should also be appreciated that the amount of opening of the first attachment arm 140 and the second attachment arm 170 may vary based on the angle of the attachment arms 140 and 170 relative to the T-shaped support post 20 (i.e., based on the respective different heights of the attachment arms 140 and 170).

FIG. 9 shows the position of the wire strand attachment clip 100 and specifically the wire catch 110, the first attachment arm 140, and the second attachment arm 170 after being attached to the T-shaped support post 20 and attaching the wire strand 40 to the T-shaped support post 20. At this point in the attachment process, the wire strand attachment clip 100 is positioned on and securely attached to the T-shaped support post 20. Specifically, (1) the wire strand 40 is in the wire strand receiving area 112; (2) the first attachment arm 140 is securely engaging the first side leg 24; and (3) the second attachment arm 170 is securely engaging the second side leg 26 of the T-shaped support post 20. The combination of these engagements includes: (1) the end surface 152b of the hand 152 engaging the curved front surface 24b of the first side leg 24 of the T-shaped support post 20; (2) the side post engager 126 and/or the shoulder 141 engaging the rear surface 24a of the elongated first side leg 24 of the T-shaped support post 20; (3) the end surface 182b of the hand 182 engaging the curved side surface 26b of the elongated second side leg 26 of the T-shaped support post 20; and (4) the side post engager 130 and/or the shoulder 172 engaging the rear surface 26a of the second side leg 26 of the T-shaped support post 20.

At this point, the first attachment arm 140 and the second attachment arm 170 are attached to the T-shaped support post 20 under a slight outward bias and remain outwardly biased during such attachment (i.e., they have not returned to their natural or resting positions). In this embodiment, the amount of the bias may depend on the angle of the engagement with the T-shaped support post 20. In alternative embodiments, at this point, the first attachment arm 140 and the second attachment arm 170 can return to their natural positions. The amount of the bias may depend on a combination of the resiliency of the material used to form the clip 100 and the respective bends and angles of the clip 100. The combination of these multiple engagements facilitate the secure attachment of the clip 100 and the wire strand 40 to the T-shaped support post 20. It should also be appreciated that the relative positions of the first attachment arm 140 and the second attachment arm 170 may vary based on the angle of the attachment arms 140 and 170 relative to the T-shaped support post 20 (i.e., based on the respective different heights of the attachment arms 140 and 170). It should also be appreciated that the inner surfaces of the wire catch 110 will (as needed) engage and hold the wire strand 40 attached to the T-shaped support post 20 even when various forces are placed on the clip 100, the T-shaped support post 20, and/or the wire strand 40. In this example embodiment, it is estimated that energy level needed for attaching the clip 100 to a T-shaped support post 20 will be about 8.68 Joules. This energy level will enable manual attachment or attachment using a suitable tool. In this example embodiment, it is estimated that the force level needed for removal of the clip 100 from a T-shaped support post 20 will be about 364 lbs (about 165 kgs).

In various embodiments of the present disclosure, this installation of the wire strand attachment clip 100 can be performed manually without the need for any installation tool such as by an installer using one or more of the installer's hands. In various embodiments of the present disclosure, this installation of the wire strand attachment clip 100 can be performed manually with an installation tool (not shown) such as by an installer using one or more hands with the installation tool. In various embodiments of the present disclosure, this installation of the wire strand attachment clip 100 can be performed automatically by an automatic installation tool (not shown) such as by an installer using one or more hands holding an automatic installation tool. In various such embodiments, the installation tool (not shown) includes a magazine that holds a plurality of wire strand attachment clips 100 that are fed through the manual or automatic installation tool. In various such embodiments, the installation tool (not shown) includes a magazine that holds a plurality of collated group of wire strand attachment clips 100 that are fed through the installation tool. The collated wire strand attachment clips may be collated in any suitable manner.

Figure 3A:
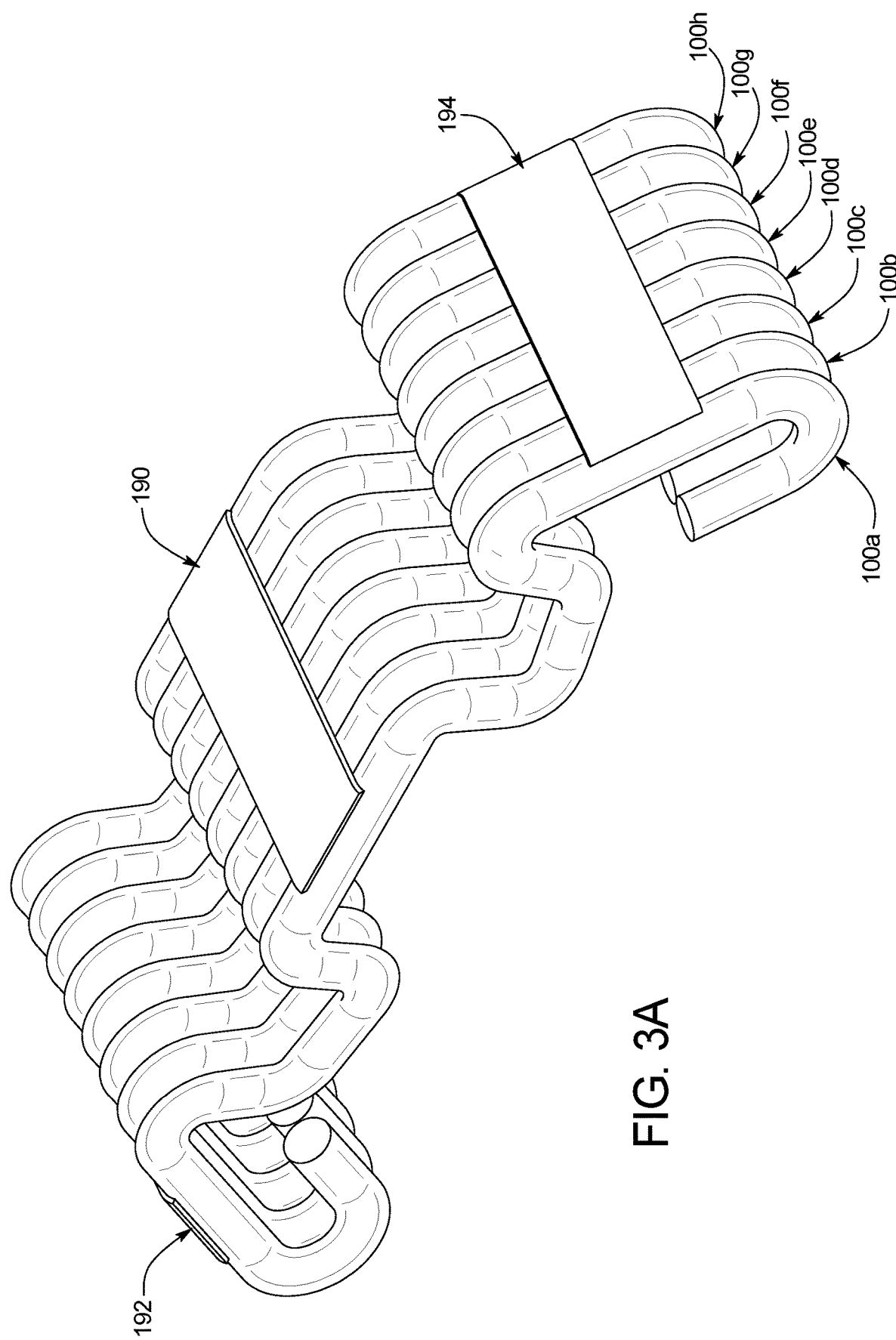
FIG. 3A is a perspective view of a collated group of a plurality of the wire strand attachment clips of FIGS. 1 and 2.
Figure 4:
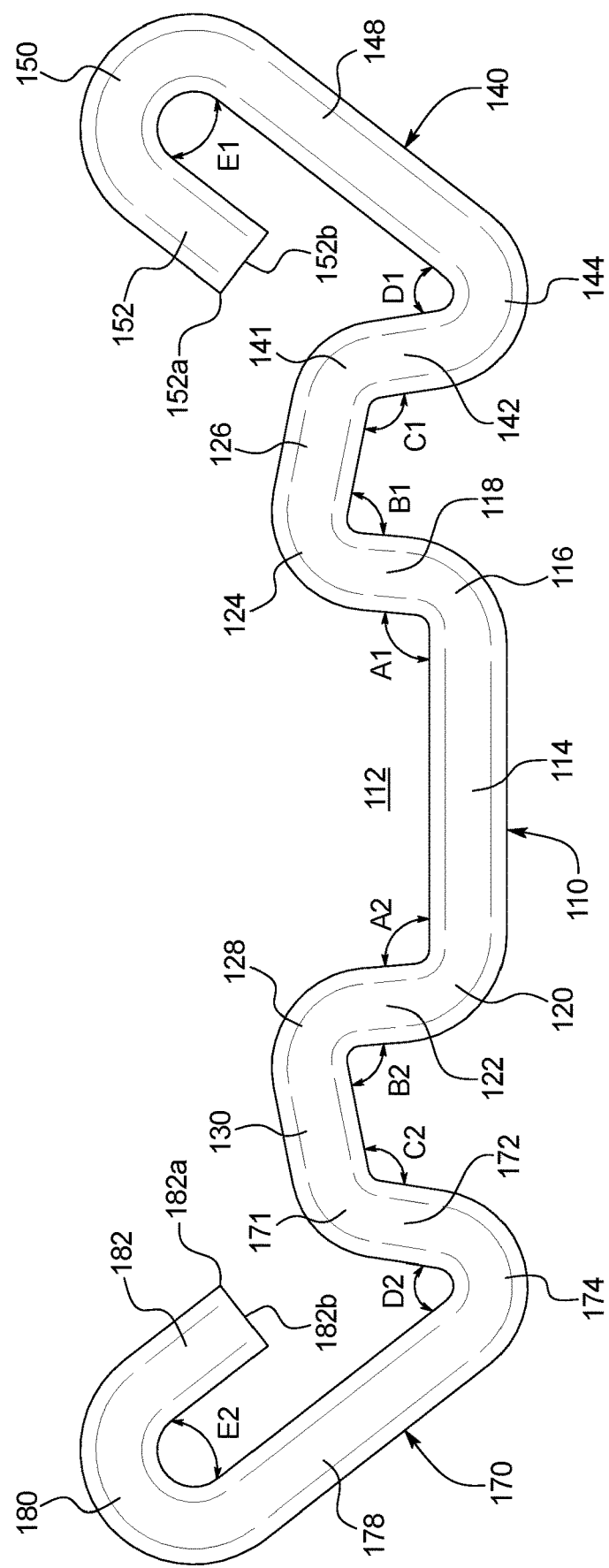
FIG. 4 is an enlarged top view of the wire strand attachment clip of FIGS. 1 and 2.

FIG. 3A shows one way in which a plurality of wire strand attachment clips 100 may be attached and collated in a group such as a group for loading into a magazine attachable or attachable to an installation tool (not shown) such as a powered automatic installation tool (not shown). The example plurality of wire strand attachment clips 100a, 100b, 100c, 100d, 100e, 100f, 100g, and 100h are positioned bottom side to top side and attached by a plurality of clip attachment members 190, 192, and 194. In this illustrated example embodiment, the clip attachment members 190, 192, and 194 are each a section of a suitable tape such as an adhesive backed paper tape. In this illustrated example embodiment, (1) the clip attachment member 190 is attached to the respective wire catches and particularly the respective the rear wire engagers of the wire strand attachment clips 100a, 100b, 100c, 100d, 100e, 100f, 100g, and 100h; (2) the clip attachment member 192 is attached to the respective first attachment arms and particularly the respective first forearms of the wire strand attachment clips 100a, 100b, 100c, 100d, 100e, 100f, 100g, and 100h; and (3) the clip attachment member 194 is attached to the respective second attachment arms and particularly the respective second forearms of the wire strand attachment clips 100a, 100b, 100c, 100d, 100e, 100f, 100g, and 100h. It should be appreciated that: (1) the quantity of wire strand attachment clips 100 in each group; (2) the quantity of clip attachment members; and (3) the placement of the clip attachment members, may all vary in accordance with the present disclosure. It should also be appreciated that the configuration of the wire strand attachment clip 100 provides a significant advantage over prior known wire strand attachment devices by providing the ability to be collated such as the ability to be collated in a bottom side to top side manner for directly adjacent clips 100. It should also be appreciated that the configuration of the wire strand attachment clip 100 facilitates attachment by one or more clip attachment members to one or more respective directly adjacent sections of the directly adjacently positioned clips 100. It should also be appreciated that the relatively short height of the wire strand attachment clip 100 also facilitates this collations.

FIGS. 10 to 19 illustrate another example embodiment of a wire strand attachment clip of the present disclosure, generally indicated by numeral 200 (and also sometimes referred to herein as the "clip" for brevity). FIGS. 10, 17, 18, and 19 generally show how the illustrated example wire strand attachment clip 200 attaches a wire strand 40 to an example T-shaped support post 20 for another example boundary fence (not shown), as further discussed below. The illustrated example wire strand attachment clip 200 includes: (1) a wire catch 210; (2) a first attachment arm 240a connected to and extending from the wire catch 210; (3) a second attachment arm 240b connected to and extending from the wire catch 210; (3) a third attachment arm 270a connected to and extending from the wire catch 210; and (4) a fourth attachment arm 270b connected to and extending from the wire catch 210. Generally, the wire catch 210, the first attachment arm 240a, the second attachment arm 240b, the third attachment arm 270a, and the fourth attachment arm 270b are configured to snap onto a T-shaped support post (such as post 20) to attach a wire strand (such as strand 40) to that T-shaped support post 20, and particularly such that the first and second attachment arms 240a and 240b engage spaced apart front and side surfaces of the T-shaped support post 20, the third and fourth attachment arms 270a and 270b engage spaced apart front and side surfaces of the T-shaped support post 20, such that the wire catch 210, the first and second attachment arms 240a and 240b, and the third and fourth attachment arms 240a and 240b can engage and hold the wire strand 40, as further described below. In this example embodiment, the wire catch 210, the first attachment arm 240a, the second attachment arm 240b, the third attachment arm 270a, and the fourth attachment arm 270b are configured and dimensioned to provide multiple wire strand receiving areas 212, 242, and 272 as further described below. In this illustrated example embodiment, the wire strand attachment clip 200 is formed (and particularly stamped and bent) to form its shape from a solid flat metal such as a steel sheet having an 0.48 inch (1.210 cm) width, an 2.90 inch (7.366 cm) length, and an 0.060 inch (0.152 cm) thickness. It should be appreciated that the wire strand attachment clip 200 can be formed from other suitable materials, and formed from other sheets having other suitable dimensions. The wire strand attachment clip 200 is formed such that the wire catch 210, the first attachment arm 240a, the second attachment arm 240b, the third attachment arm 270a, and the fourth attachment arm 270b have a desired amount of flexibility or bendability relative to each other, and a reasonably strong bias back toward their respective original positions relative to one another, as further described below.

More specifically, the illustrated example wire catch 210 includes: (1) a rear wire engager 214; (2) a first connector 216a connected to and extending forwardly and outwardly from a first end of the rear wire engager 214; (3) a second first connector 216b connected to and extending forwardly and outwardly from the first end of the rear wire engager 214; (4) a third connector 220a connected to and extending forwardly and outwardly from a second end of the rear wire engager 214; and (5) a fourth connector 220b connected to and extending forwardly and outwardly from the second end of the rear wire engager 214. The rear wire engager 214, the first connector 216a, the second connector 216b, the third connector 220a, and the fourth connector 220b partially define a first wire strand receiving and holding area 212 that is configured to receive and allow for certain movements of the wire strand in the first wire strand receiving and holding area 212. When the wire catch 210, the first attachment arm 240a, the second attachment arm 240b, the third attachment arm 270a, and the fourth attachment arm 270b are snapped onto a T-shaped support post (such as post 20) to attach a wire strand (such as strand 40) to that T-shaped support post 20, the rear wire engager 214, the first connector 216a, the second connector 216b, the third connector 220a, and the fourth connector 220b are configured to prevent the wire strand 40 from exiting the wire strand receiving and holding area 212.

In this illustrated example embodiment, the first connector 216a, the second connector 216b, the third connector 220a, and the fourth connector 220b are each curved sections formed from the solid metal sheet employed to form the wire strand attachment clip 200. It should also be appreciated that one or more of these connectors can be otherwise suitably formed in accordance with the present disclosure.

In this illustrated example embodiment, the rear wire engager 214 is a generally flat section formed from the solid metal sheet employed to form the wire strand attachment clip 200. In this illustrated example embodiment, the rear wire engager 214 has a generally hourglass shaped configuration, and particularly defines or has concave upper and lower edges. This provides for the overall resiliency of the wire strand attachment clip 200. More specifically, the curved surfaces or surfaces with each cut radii assist in the flexibility of the material as it flexes around the post to compensate for any material stress in the clip 200.

In this illustrated example embodiment, the first connector 216a is symmetrical to the second connector 216b with respect to the rear wire engager 214. In this illustrated example embodiment, the third connector 220a is symmetrical to the fourth connector 220b with respect to the rear wire engager 214. In this illustrated example embodiment, the first connector 216a, is symmetrical to the third connector 220a with respect to the rear wire engager 214. In this illustrated example embodiment, the second connector 216b is symmetrical to the fourth connector 220b with respect to the rear wire engager 214. In this illustrated example embodiment, the first connector 216a and the second connector 216b are symmetrical to the third connector 220a and the fourth connector 220b with respect to the rear wire engager 214. It should be appreciated that such connectors can be non-symmetrical in accordance with the present disclosure. In this illustrated example embodiment, the first connector 216a, the second connector 216b, the third connector 220a, and the fourth connector 220b all have the same respective lengths and widths. It should be appreciated that such respective connectors can have different lengths and widths in accordance with the present disclosure.

The illustrated example first attachment arm 240*a* includes: (1) a first forearm 248*a* connected to and extending outwardly and rearwardly from the first connector 216*a*; (2) a first wrist 250*a* connected to and extending outwardly and forwardly from the first forearm 248*a* and then rearwardly and inwardly back toward the rear wire engager 214; and (3) a first post engagement hand 252*a* connected to and extending inwardly and rearwardly from the first wrist 250*a* toward the rear wire engager 214.

The illustrated example second attachment arm 240*b* includes: (1) a second forearm 248*b* connected to and extending outwardly and rearwardly from the second connector 216*b*; (2) a second wrist 250*b* connected to and extending outwardly and forwardly from the second forearm 248*b* and then rearwardly and inwardly back toward the rear wire engager 214; and (3) a second post engagement hand 252*b* connected to and extending inwardly and rearwardly from the second wrist 250*b* toward the rear wire engager 214.

The illustrated example third attachment arm 270*a* includes: (1) a third forearm 278*a* connected to and extending outwardly and rearwardly from the third connector 226*a*; (2) a third wrist 280*a* connected to and extending outwardly and forwardly from the third forearm 278*a* and then rearwardly and inwardly back toward the rear wire engager 214; and (3) a third post engagement hand 282*a* connected to and extending inwardly and rearwardly from the third wrist 280*a* toward the rear wire engager 214.

The illustrated example fourth attachment arm 270*b* includes: (1) a fourth forearm 278*b* connected to and extending outwardly and rearwardly from the fourth connector 220*b*; (2) a fourth wrist 280*b* connected to and extending outwardly and forwardly from the fourth forearm 278*b* and then rearwardly and inwardly back toward the rear wire engager 214; and (3) a fourth post engagement hand 282*b* connected to and extending inwardly and rearwardly from the third wrist 280*b* toward the rear wire engager 214.

The rear wire engager 214, the first connector 216*a*, the second connector 216*b*, the first attachment arm 240*a*, and the second attachment arm 240*b* partially define the second wire strand receiving and holding area 242 that is configured to receive and allow for certain movements of the wire strand in the second wire strand receiving and holding area 242.

The rear wire engager 214, the third connector 220*a*, the fourth connector 220*b*, the third attachment arm 270*a*, and the fourth attachment arm 270*b* partially define the second wire strand receiving and holding area 272 that is configured to receive and allow for certain movements of the wire strand in the third wire strand receiving and holding area 272.

When the wire catch 210, the first attachment arm 240*a*, the second attachment arm 240*b*, the third attachment arm 270*a*, and the fourth attachment arm 270*b* are snapped onto a T-shaped support post (such as post 20) to attach a wire strand (such as strand 40) to that T-shaped support post 20: (1) the rear wire engager 214, the first connector 216*a*, the second connector 216*b*, the first attachment arm 240*a*, and the second attachment arm 240*b* are configured to prevent the wire strand 40 from exiting the second wire strand receiving and holding area 242; and (2) the rear wire engager 214, the third connector 220*a*, the fourth connector 220*b*, the third attachment arm 270*a*, and the fourth attachment arm 270*b* are configured to prevent the wire strand 40 from exiting the third wire strand receiving and holding area 272.

Figure 10:
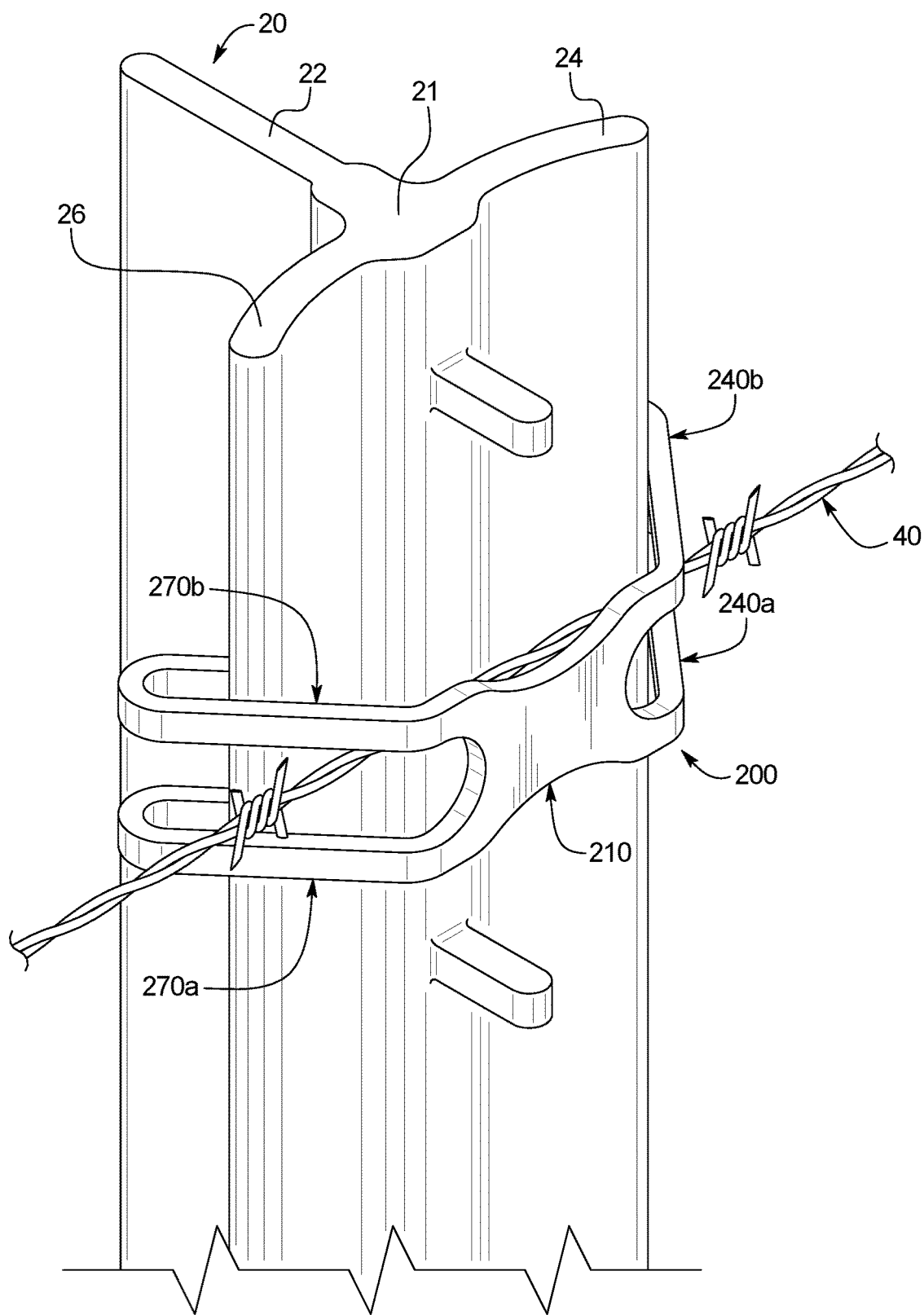
FIG. 10 is an enlarged fragmentary perspective view of a portion of one of the T-shaped support posts and one of the wire strands attached to the T-shaped support post of another example boundary fence, and showing another example wire strand attachment clip of the present disclosure attaching that wire strand to that T-shaped support post.
Figure 19:
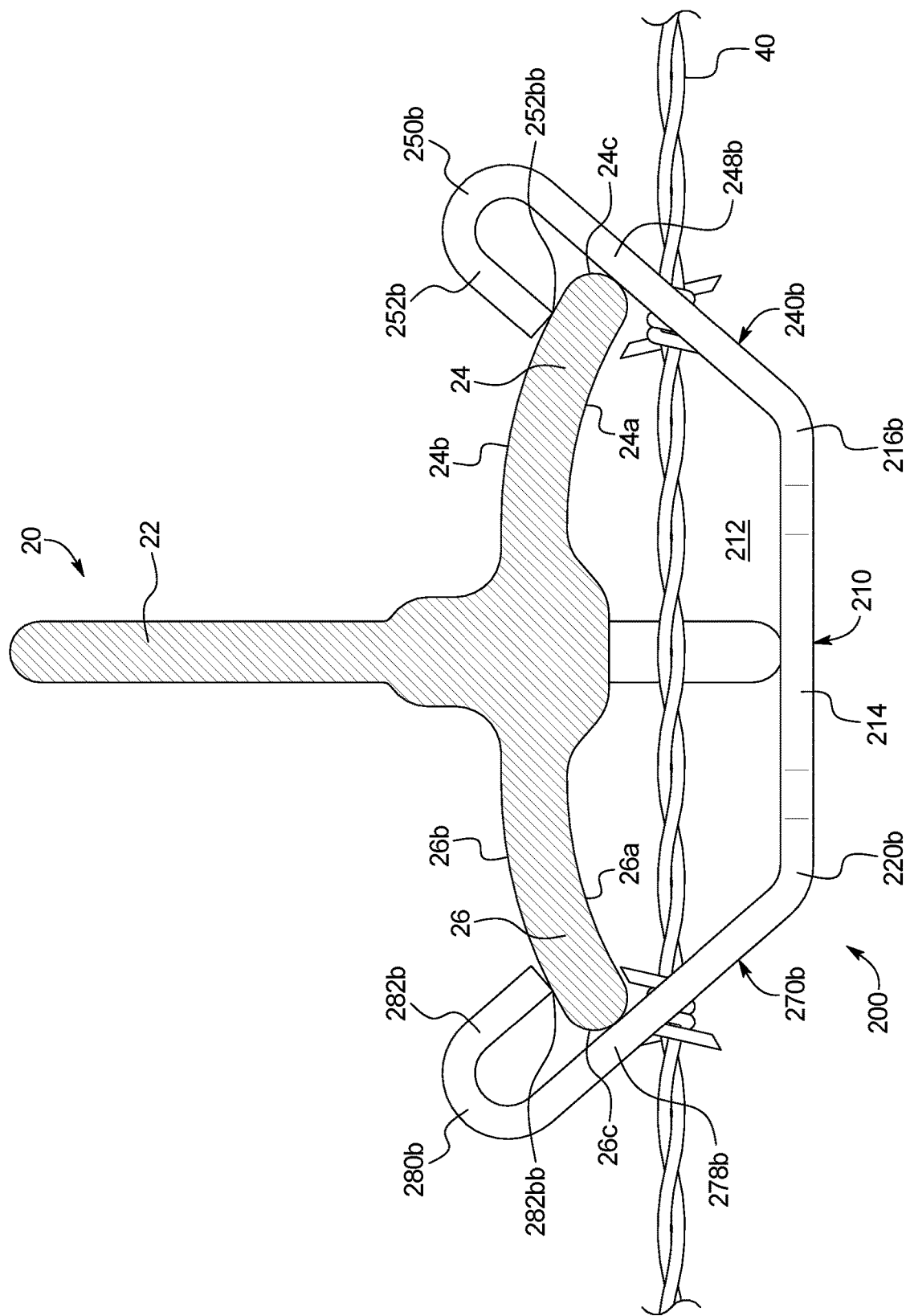
FIG. 19 is an enlarged top view of the wire strand attachment clip of FIG. 10, an enlarged fragmentary perspective view of the wire strand, and an enlarged cross-sectional view of the T-shaped support post of FIG. 10 after the attachment process, showing the engagement of the wire strand attachment clip with the T-shaped support post after the attachment process, and showing the engagement of the wire strand attachment clip with the wire strand after the attachment process.
Figure 20:
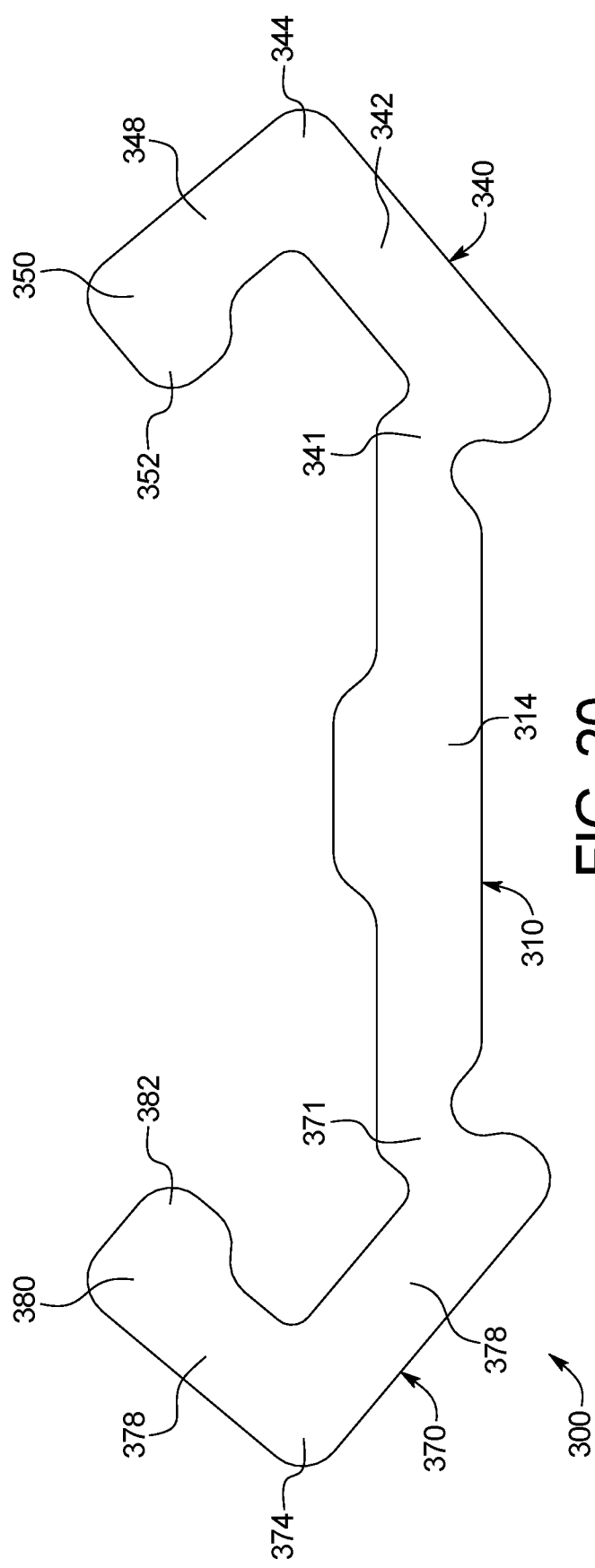
FIG. 20 is a top view of a wire strand attachment clip of another example embodiment of the present disclosure.
Figure 21:
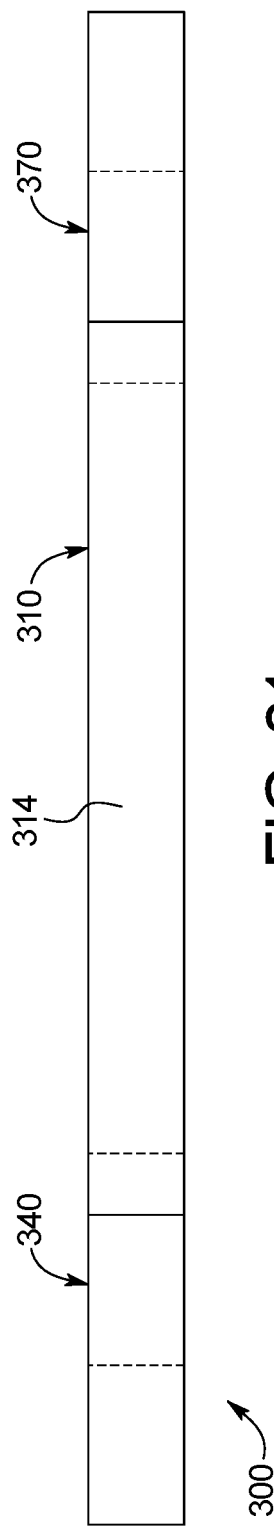
FIG. 21 is a front view of the wire strand attachment clip of FIG. 20.
Figure 22:
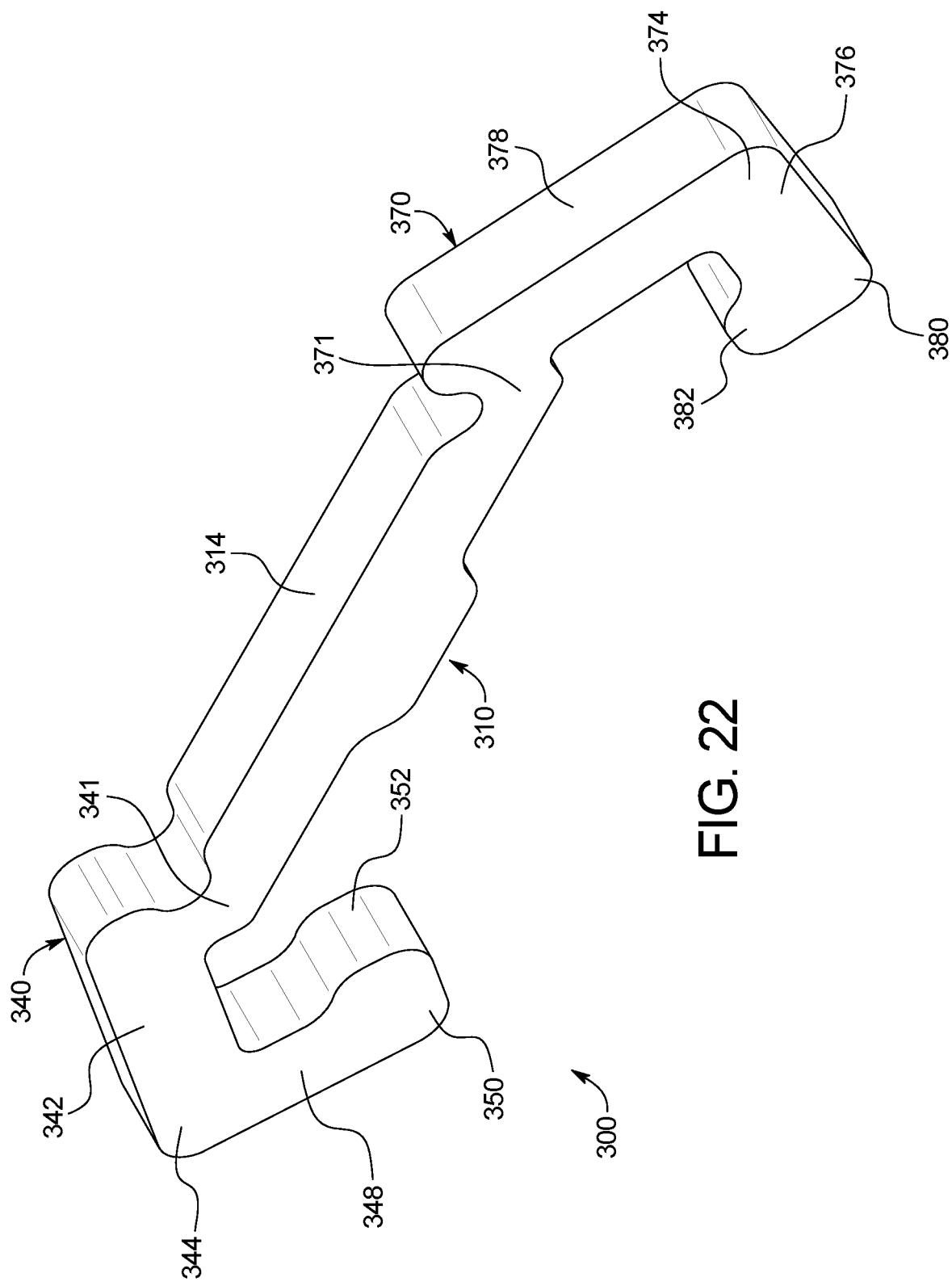
FIG. 22 is a perspective view of the wire strand attachment clip of FIG. 20.

When the wire catch 210, the first attachment arm 240*a*, the second attachment arm 240*b*, the third attachment arm 270*a*, and the fourth attachment arm 270*b*, are snapped onto a T-shaped support post (such as post 20) to attach a wire strand (such as strand 40) to that T-shaped support post 20, the first forearm 248*a*, the second forearm 248*b*, the third fourth forearm 278*a*, the fourth forearm 278*b*, the first post engagement hand 252*a*, the second post engagement hand 252*b*, the third post engagement hand 282*a*, and the fourth post engagement hand 282*b* are configured to securely engage spaced apart side surfaces of the T-shaped support post 20 to provide a secure attachment of the wire strand attachment clip 200 to the T-shaped support post 20 and to prevent the wire strand 40 from exiting the first wire strand receiving and holding area 212, the second wire strand receiving and holding area 242, and the third wire strand receiving and holding area 272, as shown in FIGS. 10 and 19.

In this illustrated example embodiment, the first wrist 250*a*, the second wrist 250*b*, the third wrist 280*a*, and the fourth wrist 280*b*, are each curved sections formed from the solid flat metal sheet employed to form the wire strand attachment clip 200. It should be appreciated that one or more of these wrists can be otherwise suitably formed in accordance with the present disclosure. In this illustrated example embodiment, the first forearm 248*a*, the first post engagement hand 252*a*, the second forearm 248*b*, the second post engagement hand 252*b*, the third forearm 278*a*, the third post engagement hand 282*a*, the fourth forearm 278*b*, and the fourth post engagement hand 282*b* are each straight sections formed from the solid flat metal sheet employed to form the wire strand attachment clip 200. It should be appreciated that one or more of these sections can be otherwise suitably formed in accordance with the present disclosure. It should also be appreciated that two or more of each respective pair of forearms, wrists, and hands can be combined in accordance with the present disclosure.

In this illustrated example embodiment, the first attachment arm 240*a* and the second attachment arm 240*b* (including the respective forearms, wrists, and hands) are symmetrical relative to each other and with respect to the wire strand catch 210. In this illustrated example embodiment, the third attachment arm 270*a* and the fourth attachment arm 270*b* (including the respective forearms, wrists, and hands) are symmetrical relative to each other and with respect to the wire strand catch 210. In this illustrated example embodiment, the first attachment arm 240*a* and the third attachment arm 270*a* (including the respective forearms, wrists, and hands) are symmetrical relative to each other and with respect to the wire strand catch 210. In this illustrated example embodiment, the second attachment arm 240*b* and the fourth attachment arm 270*b* (including the respective forearms, wrists, and hands) are symmetrical relative to each other and with respect to the wire strand catch 210. In this illustrated example embodiment, the first attachment arm 240*a* and the fourth attachment arm 270*b* (including the respective forearms, wrists, and hands) are symmetrical relative to each other and with respect to the wire strand catch 210. In this illustrated example embodiment, the second attachment arm 240*b* and the third attachment arm 270*a* (including the respective forearms, wrists, and hands) are symmetrical relative to each other and with respect to the wire strand catch 210. It should be appreciated that such components can be non-symmetrical in accordance with the present disclosure. In this illustrated example embodiment, the first attachment arm 240*a*, the second attachment arm 240*b*, the third attachment arm 270*a*, and the fourth attachment arm 270*b*, are of the same dimensions, and specifically the respective forearms, wrists, and hands have the same respective dimensions. It should be appreciated that such components can have different dimensions in accordance with the present disclosure. In this illustrated example embodiment, (1) the first forearm 248a extends at about a 131 degree angle (labeled D1) to the rear wire engager 214; (2) the second forearm 248b also extends at about a 131 degree angle to the rear wire engager 214; (3) the third forearm 278a extends at about a 131 degree angle (labeled D2) to the rear wire engager 214; and (4) the fourth forearm 278b also extends at about a 131 degree angle to the rear wire engager 214. In this illustrated example embodiment, E1 and E2 are both about 180 degrees. It should be appreciated that one or more such angles may vary in accordance with the present disclosure and in accordance with manufacturing tolerances. In various example embodiments of the present disclosure, (1) angle D1 may be in the range of about 129 degrees to about 132 degrees; and (2) angle D2 may be in the range of about 129 degrees to about 132 degrees.

Figure 17:
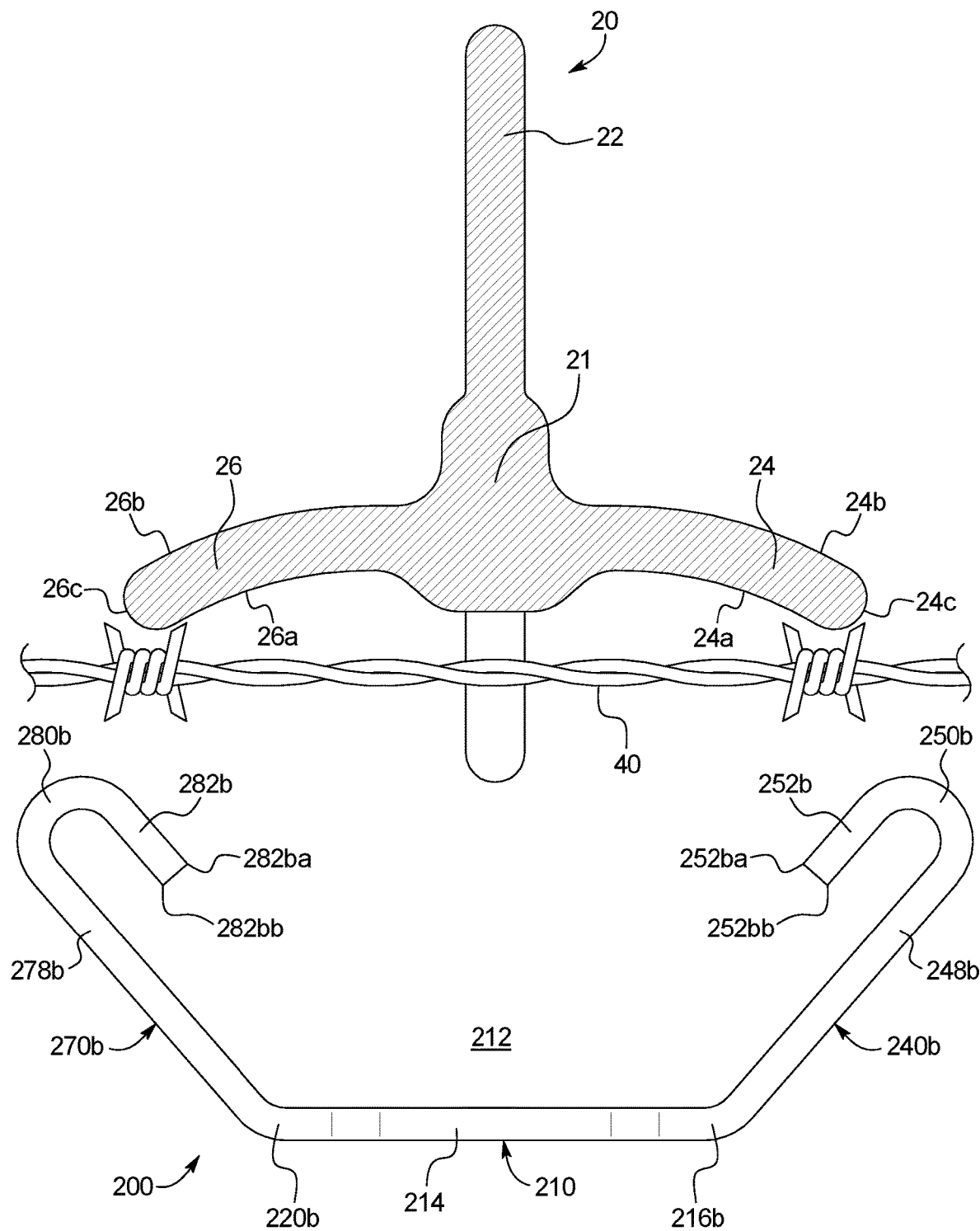
FIG. 17 is an enlarged top view of the wire strand attachment clip of FIG. 10, an enlarged fragmentary perspective view of the wire strand, and an enlarged cross-sectional view of the T-shaped support post of FIG. 10 prior to the attachment of the wire strand attachment clip to the T-shaped support post.
Figure 18:
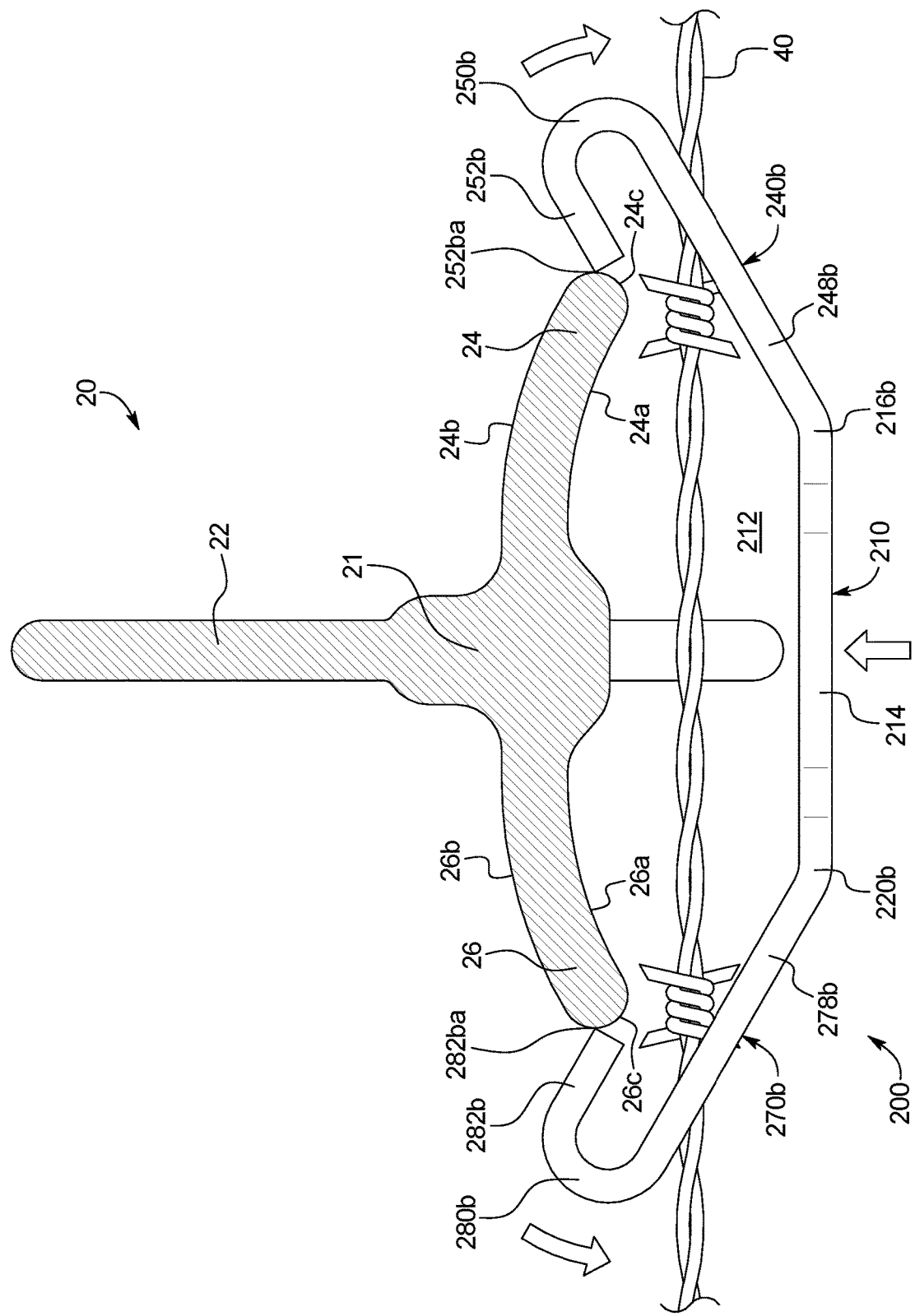
FIG. 18 is an enlarged top view of the wire strand attachment clip of FIG. 10, an enlarged fragmentary perspective view of the wire strand, and an enlarged cross-sectional view of the T-shaped support post of FIG. 10 as the wire strand attachment clip is being attached to the T-shaped support post, showing the engagement of the arms of the wire strand attachment clip with the T-shaped support post during the attachment process, and showing the opening of the arms of the wire strand attachment clip with the T-shaped support post during the attachment process.

As shown in FIGS. 17, 18, and 19, the wire strand attachment clip 200 and specifically, the wire catch 210, the first attachment arm 240a, the second attachment arm 240b, the third attachment arm 270a, and the fourth attachment arm 270b, are configured to snap onto a T-shaped support post 20 to attach a wire strand 40 to that T-shaped support post 20. In this illustrated example, the wire strand 40 is a barbed wire strand. In this illustrated example, the T-shaped support post 20 includes: (1) an elongated core 21; (2) an elongated front leg 22 connected to and extending from the front of the elongated core 21; (3) an elongated first side leg 24 connected to and extending from a first side of the elongated core 21; and (4) an elongated second side leg 26 connected to and extending from a second side of the front of the elongated core 21. The elongated first side leg 24 includes: (a) a curved (concave) rear surface 24a; (b) a curved (convex) front surface 24b; and (c) a curved (convex) side surface 24c connecting the rear surface 24a and the front surface 24b. The elongated second side leg 26 includes: (a) a curved (concave) rear surface 26a; (b) a curved (convex) front surface 26b; and (3) a curved (convex) side surface 26c connecting the rear surface 26a and the front surface 26b.

More specifically, FIG. 17 shows the position of the wire strand attachment clip 200 and specifically the wire catch 210, the first attachment arm 240a, the second attachment arm 240b, the third attachment arm 270a, and the fourth attachment arm 270b positioned relative to but before being attached to the T-shaped support post 20 and before attaching the wire strand 40 to the T-shaped support post 20. At this point in the attachment process, the wire strand attachment clip 200 is positioned relative to the T-shaped support post 20. Specifically, (1) the wire catch 210 is aligned with the wire strand 40 such that the wire strand 40 can be positioned in the wire strand receiving areas 212, 242, and 272; (2) the first attachment arm 240a and the second attachment arm 240b are aligned with the first side leg 24 such that the first and second hands 252a and 252b are aligned to engage the curved side surface 24c of the first side leg 24 of the T-shaped support post 20; and (3) the third attachment arm 270a and the fourth attachment arm 270b are aligned with the first side leg 24 such that the hands 182a and 182b are aligned to engage the curved side surface 26c of the second side leg 26 of the T-shaped support post 20.

FIG. 18 shows the position of the wire strand attachment clip 200 and specifically the wire catch 210, the first attachment arm 240a, the second attachment arm 240b, the third attachment arm 270a, and the fourth attachment arm 270b during the attachment process relative to the T-shaped support post 20. At this point in the attachment process, the wire strand attachment clip 200 is positioned in engagement with the T-shaped support post 20. Specifically, (1) the wire catch 210 is aligned with the wire strand 40 such that the wire strand 40 is in the wire strand receiving area 212; (2) the first attachment arm 240a is engaging the elongated first side leg 24 such that the hand 252a is engaging the curved side surface 24c of the elongated first side leg 24 of the T-shaped support post 20; (3) the second attachment arm 240b is engaging the elongated first side leg 24 such that the hand 252b is engaging the curved side surface 24c of the elongated first side leg 24 of the T-shaped support post 20; (4) the third attachment arm 270a is engaging the elongated second side leg 26 such that the hand 282a is engaging the curved side surface 26c of the second side leg 26 of the T-shaped support post 20; and (5) the fourth attachment arm 270b is engaging the elongated second side leg 26 such that the hand 282b is engaging the curved side surface 26c of the elongated second side leg 26 of the T-shaped support post 20. The combination of the engagement of: (1) the hands 252a and 252b with the curved side surface 24c of the elongated first side leg 24 of the T-shaped support post 20; and (2) the hands 282a and 282b with the curved side surface 26c of the elongated second side leg 26 of the T-shaped support post 20, causes the first and second attachment arms 240a and 240b and the third and fourth attachment arms 270a and 270b to open wider against their natural position. It should be appreciated that each of the curved connectors 216a, 216b, 220a, and 220b facilitate this opening of the first and second attachment arms 240a and 240b relative to the third and fourth attachment arms 270a and 270b. It should be appreciated that the amount of opening of the first and second attachment arms 240a and 240b relative to the third and fourth attachment arm 270a and 270b varies based on the points of engagements with the curved side surfaces 24c and 26c of the T-shaped support post 20. The maximum amount of opening is shown in FIG. 18 where the outer corner edges 252aa, 252ba, 282aa, and 282ba of the hands 252a, 252b, 282a, and 282b engage the outermost points of the curved side surfaces 24c and 26c of the T-shaped support post 20.

FIG. 19 shows the position of the wire strand attachment clip 200 and specifically the wire catch 210, the first attachment arm 240a, the second attachment arm 240b, the third attachment arm 270a, and the fourth attachment arm 270b after being attached to the T-shaped support post 20 and attaching the wire strand 40 to the T-shaped support post 20. At this point in the attachment process, the wire strand attachment clip 200 is positioned on and securely attached to the T-shaped support post 20. Specifically, (1) the wire strand 40 is in the wire strand receiving areas 212, 242, and 272; (2) the first attachment arm 240a is securely engaging the elongated first side leg 24; (3) the second attachment arm 240b is securely engaging the elongated first side leg 24; (4) the third attachment arm 270a is securely engaging the elongated second side leg 26 of the T-shaped support post 20; and (5) the fourth attachment arm 270b is securely engaging the elongated second side leg 26 of the T-shaped support post 20. The combination of engagements includes: (1) the end surfaces 252ba and 252bb of the hands 252a and 252b engaging the curved front surface 24b of the first side leg 24 of the T-shaped support post 20; (2) the forearms 248a and 248b engaging the side surface 24c of the first side leg 24 of the T-shaped support post 20; (3) the end surfaces 282ba and 282bb of the hands 252a and 252b engaging the curved front surface 26b of the second side leg 26 of the T-shaped support post 20; and (4) the forearms 278a and 278b engaging the side surface 26c of the second side leg 26 of the T-shaped support post 20. At this point, the first attachment arm 240a, the second attachment arm 240b, the third attachment arm 270a, and the fourth attachment arm 270b are attached to the T-shaped support post 20 under a slight outward bias and remain outwardly biased during such attachment (i.e., they have not returned to their natural positions). In alternative embodiments, at this point, the first attachment arm 240a, the second attachment arm 240b, the third attachment arm 270a, and the fourth attachment arm 270b can return to their natural positions. The amount of the bias may depend on a combination of the resiliency of the material used to form the clip 200 and the respective angles of the clip 200. The combination of these multiple engagements facilitate the secure attachment of the wire strand attachment clip 200 and the wire strand 40 to the T-shaped support post 20. It should also be appreciated that the inner surfaces of the wire catch 210 will, as needed, engage and hold the wire strand 40 attached to the T-shaped support post 20 even when forces are placed on the T-shaped support post 20 and/or the wire strand 40. In this example embodiment, it is estimated that the energy level needed for attaching the clip 200 to a T-shaped support post 20 will range from about 0.95 Joules to about 1.32 Joules. This energy level will enable manual attachment or attachment using a suitable tool as described below. In this example embodiment, it is estimated that the force level needed for removal of the clip 200 from a T-shaped support post 20 will range from about 317.5 lbs (about 144 kgs) to about 434 lbs (about 197 kgs).

Figure 11:
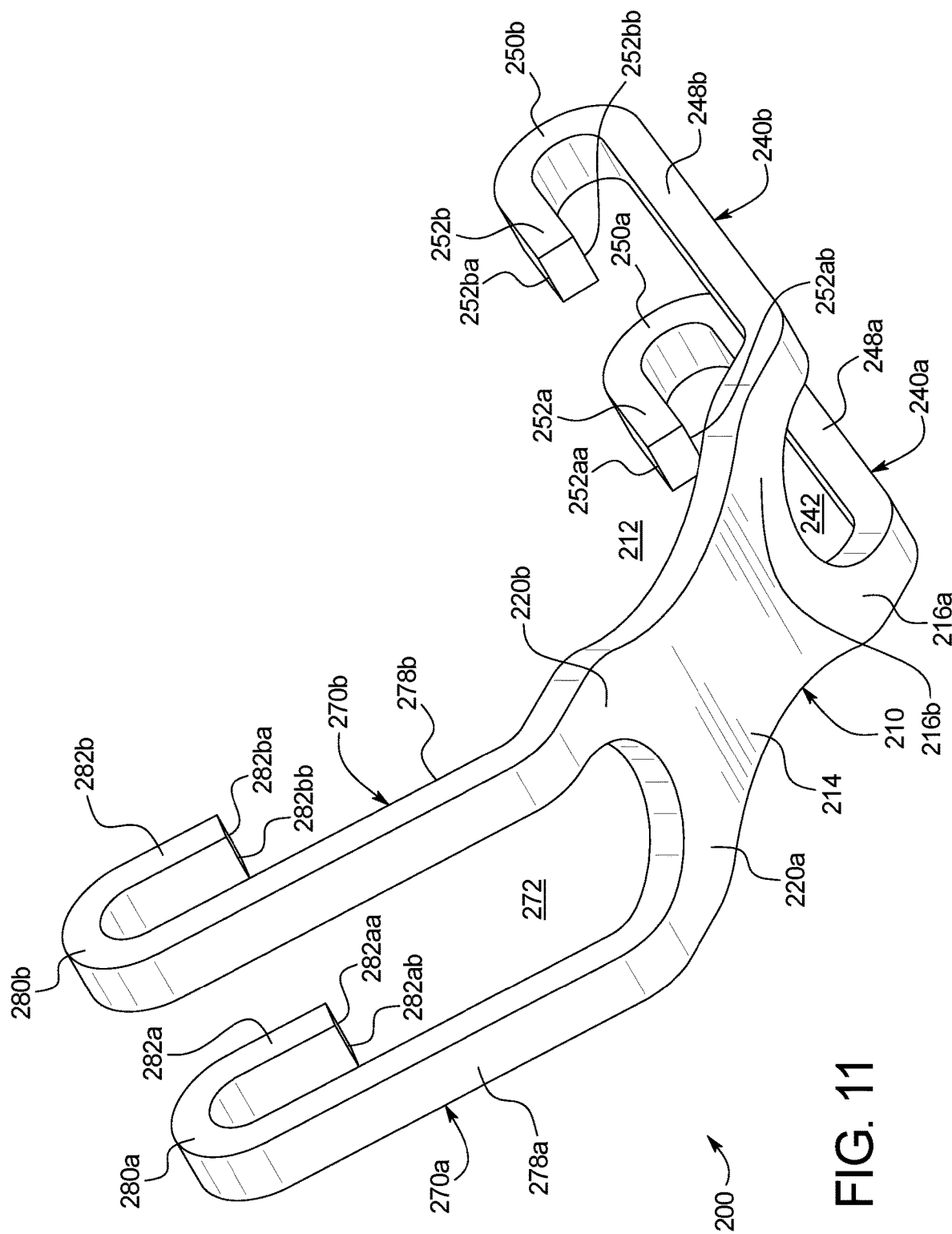
FIG. 11 is an enlarged perspective view of the wire strand attachment clip of FIG. 10.
Figure 11A:
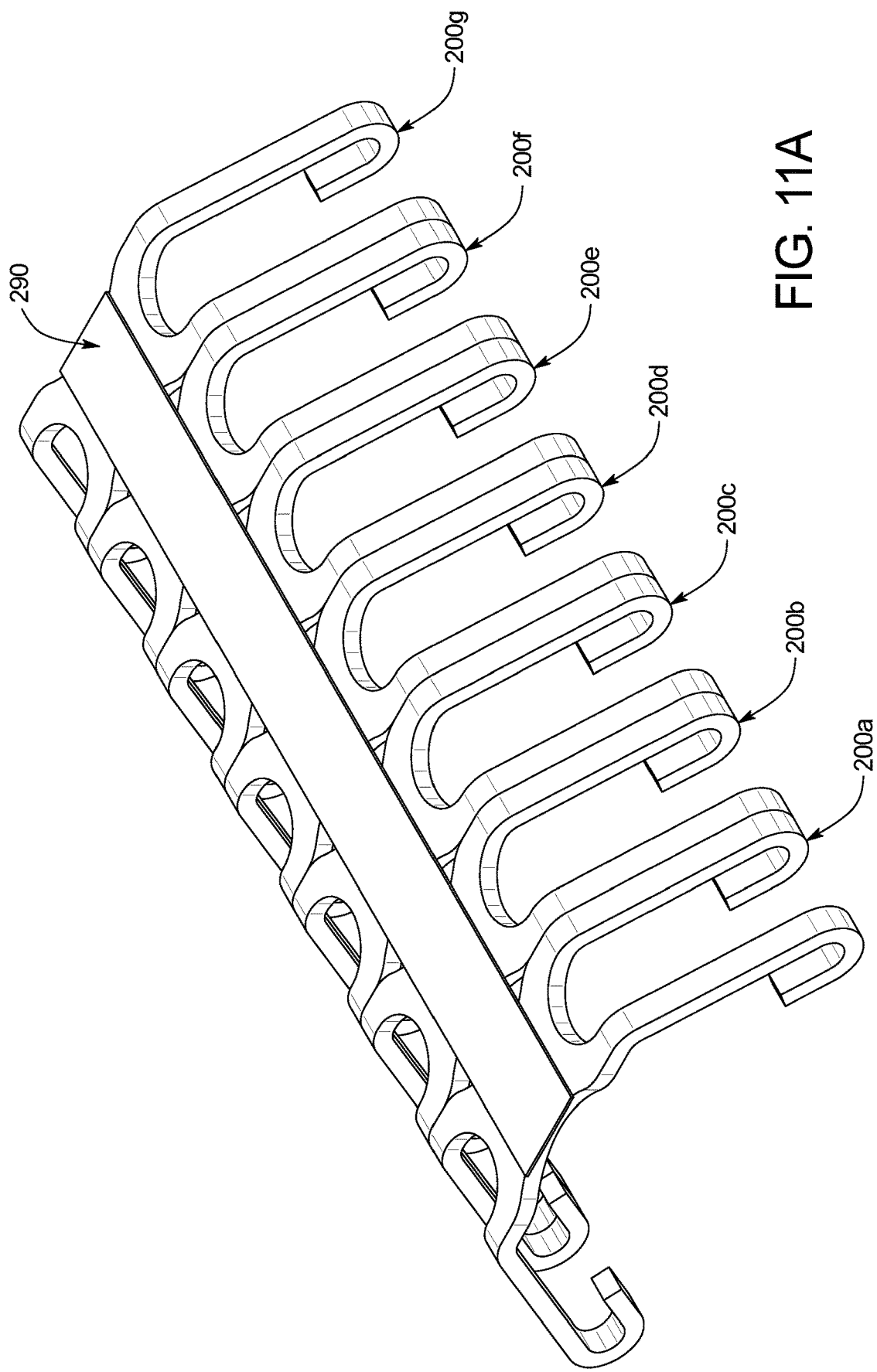
FIG. 11A is a perspective view of a collated group of a plurality of the wire strand attachment clips of FIG. 10.
Figure 12:
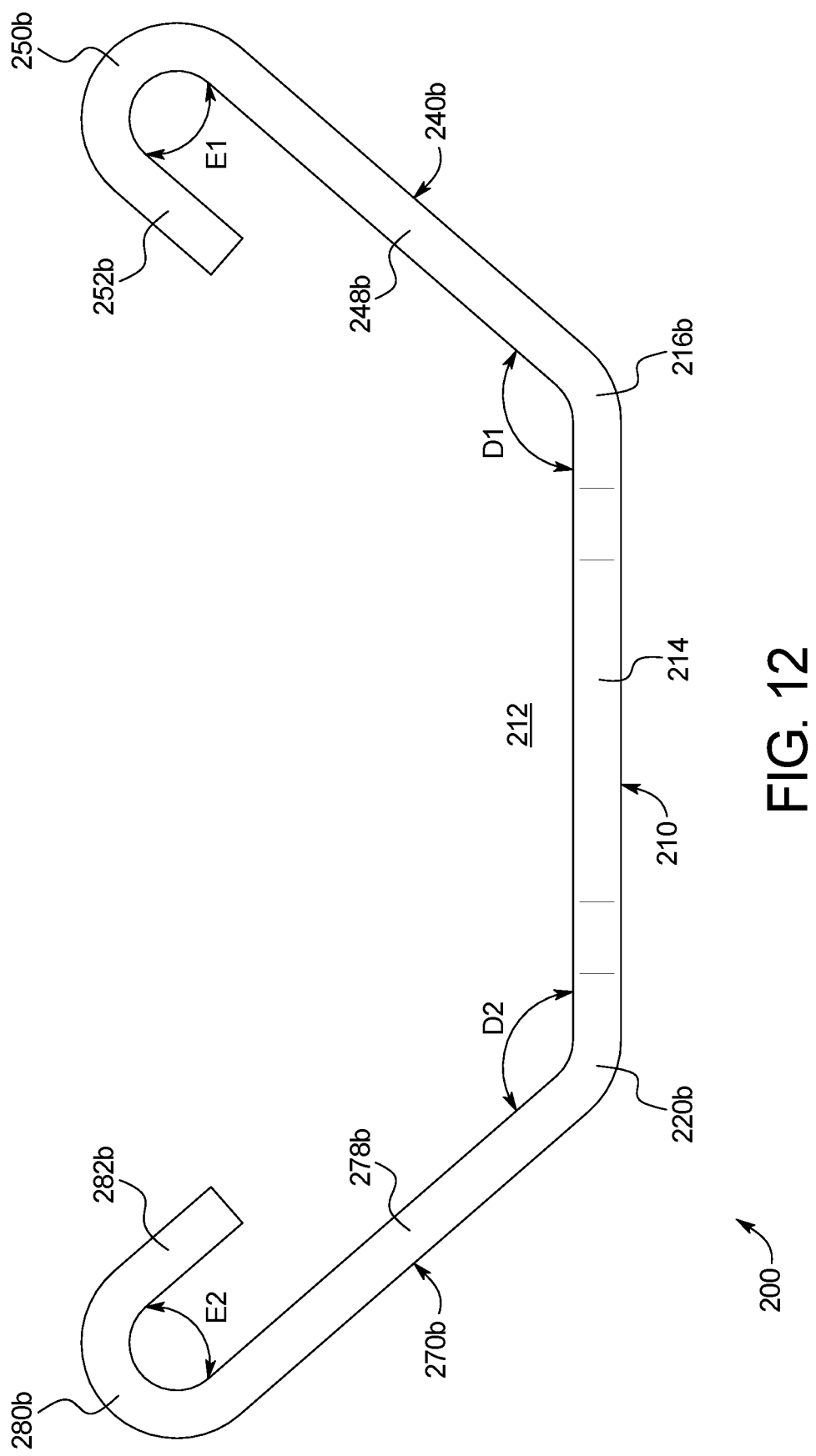
FIG. 12 is an enlarged top view of the wire strand attachment clip of FIG. 10.
Figure 13:
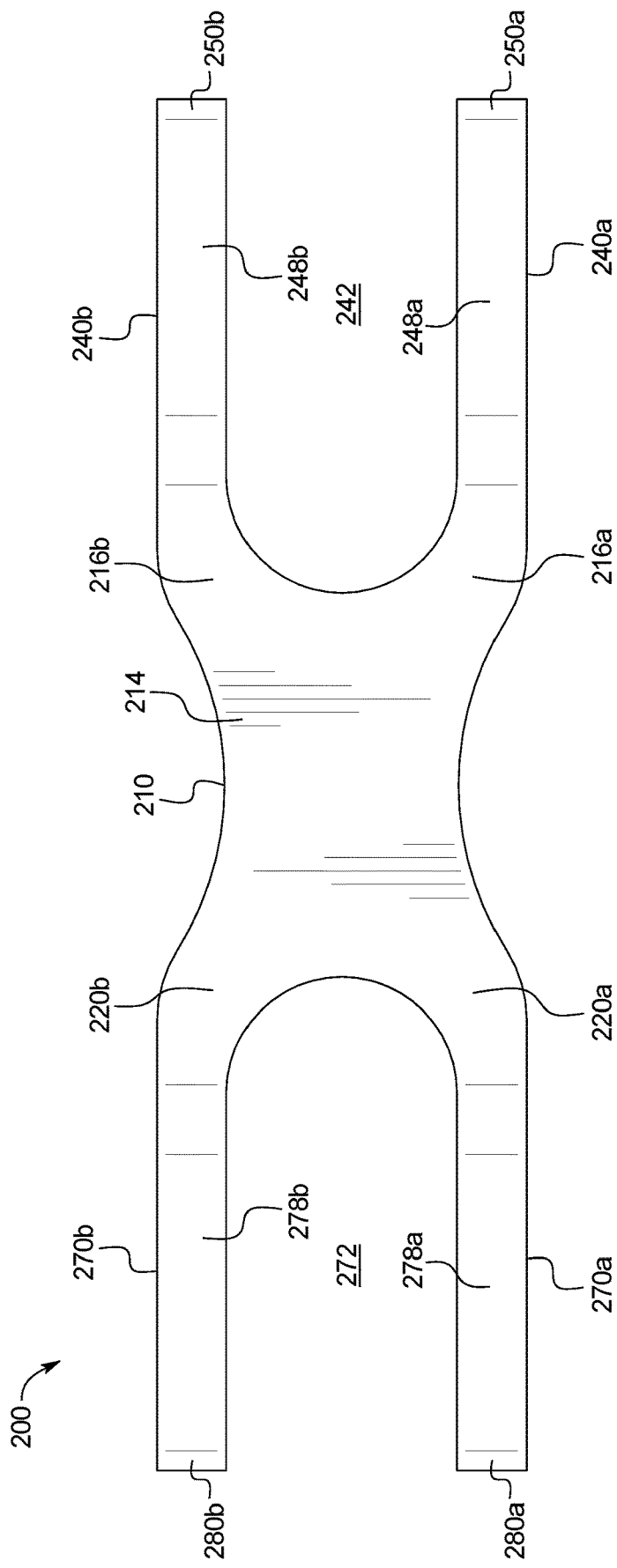
FIG. 13 is an enlarged rear view of the wire strand attachment clip of FIG. 10.
Figure 14:
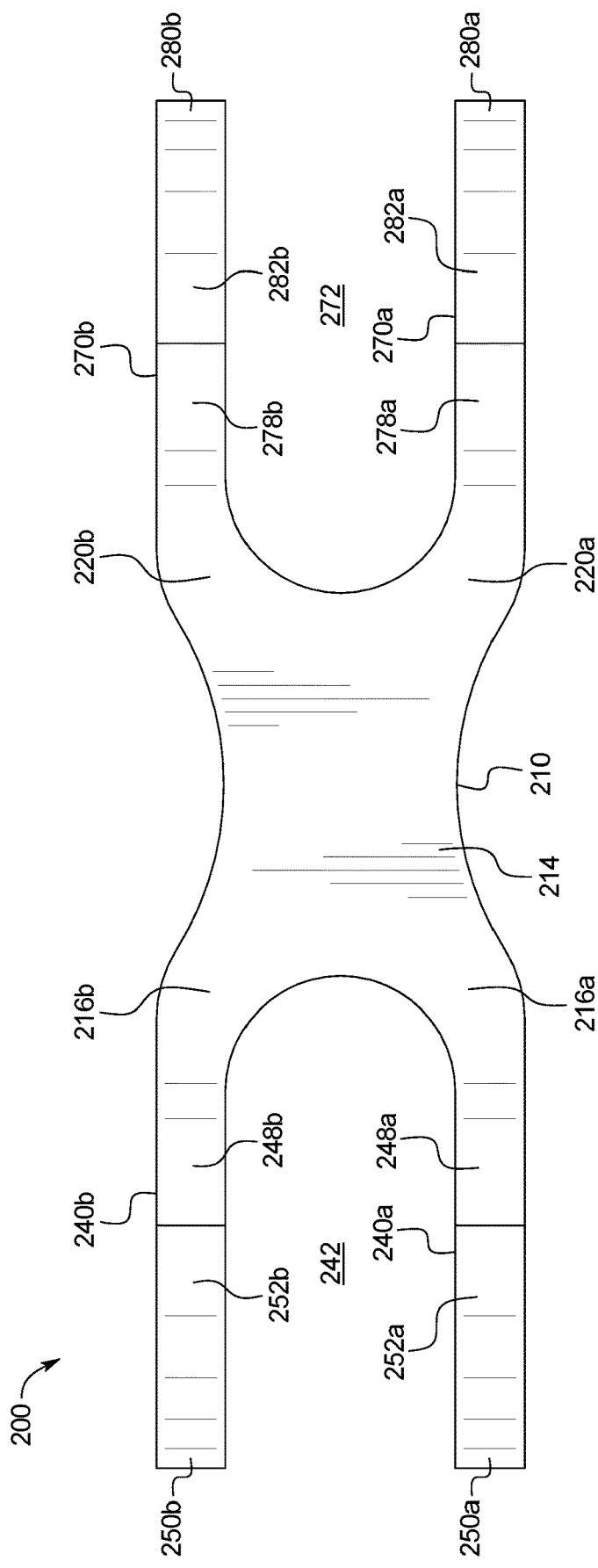
FIG. 14 is an enlarged front view of the wire strand attachment clip of FIG. 10.

In various embodiments of the present disclosure, this installation of the wire strand attachment clip 200 can be performed manually without the need for any installation tool such as by an installer using one or more of the installer's hands. In various embodiments of the present disclosure, this installation of the wire strand attachment clip 200 can be performed manually with an installation tool (not shown) such as by an installer using one or more hands with the installation tool. In various embodiments of the present disclosure, this installation of the wire strand attachment clip 200 can be performed automatically by an automatic installation tool (not shown) such as by an installer using one or more hands holding an automatic installation tool. In various such embodiments, the installation tool (not shown) includes a magazine that holds a plurality of wire strand attachment clips 200 that are fed through the installation tool. In various such embodiments, the installation tool (not shown) includes a magazine that holds a plurality of collated group of wire strand attachment clips 200 that are fed through the installation tool. The collated wire strand attachment clips may be collated in any suitable manner. FIG. 11A shows one way in which a plurality of wire strand attachment clips 200 may be attached and collated in a group such as a group for loading into a magazine attachable or attachable to an installation tool (not shown) such as a powered automatic installation tool (not shown). The example plurality of wire strand attachment clips 200a, 200b, 200c, 200d, 200e, 200f, and 200g are positioned bottom side to top side and attached by a clip attachment member 290. In this illustrated example embodiment, the clip attachment member 290 is a section of a suitable tape such as an adhesive backed paper tape. In this illustrated example embodiment, the clip attachment member 290 is attached to the respective wire catches and particularly the respective the rear wire engagers of the wire strand attachment clips 200a, 200b, 200c, 200d, 200e, 200f, and 200g. It should be appreciated that: (1) the quantity of wire strand attachment clips in each group; (2) the quantity of clip attachment members; and (3) the placement of the clip attachment members, may all vary in accordance with the present disclosure. It should also be appreciated that the configuration of the wire strand attachment clip 200 provides a significant advantage over prior known wire strand attachment devices by providing the ability to be collated and specifically the ability to be collated in a bottom side to top side manner for adjacent clips 200, and to facilitate attachment by one or more clip attachment members to one or more directly adjacent sections of the adjacently positioned clips 200.

FIGS. 20, 21, 22, and 23 illustrate another example embodiment of a wire strand attachment clip of the present disclosure generally indicated by numeral 300 (and sometimes referred to herein as the "clip" for brevity). This illustrated example wire strand attachment clip 300 includes: (1) a wire catch 310; (2) a first attachment arm 340 connected to and extending from the wire catch 310; and (3) a second attachment arm 370 connected to and extending from the wire catch 310. The illustrated example first attachment arm 340 includes: (1) a first arm shoulder 341 connected to and extending outwardly and rearwardly from the wire catch 310; (2) a first upper arm 342 connected to and extending outwardly and rearwardly from the first arm shoulder 341; (3) a first elbow 344 connected to and extending outwardly and then forwardly from the first upper arm 342; (4) a first forearm 348 connected to and extending outwardly and forwardly from the first elbow 344; (5) a first wrist 350 connected to and extending outwardly and forwardly from the first forearm 348 and then rearwardly and inwardly back toward the first arm shoulder 341; and (6) a first post engagement hand 352 connected to and extending inwardly and rearwardly from first wrist 350 toward the first arm shoulder 341. The illustrated example second attachment arm 370 includes: (1) a second arm shoulder 371 connected to and extending outwardly and rearwardly from the wire catch 310; (2) a second upper arm 372 connected to and extending outwardly and rearwardly from the second arm shoulder 371; (3) a second elbow 374 connected to and extending outwardly and then forwardly from the second upper arm 372; (4) a second forearm 378 connected to and extending outwardly and forwardly from the second elbow 374; (5) a second wrist 380 connected to and extending outwardly and forwardly from the second forearm 378 and then rearwardly and inwardly back toward the second arm shoulder 371; and (6) a second post engagement hand 382 connected to and extending inwardly and rearwardly from the second wrist 380 toward the second arm shoulder 371.

In various embodiment, when the first attachment arm 340 and the second attachment arm 370 are attached to the T-shaped support post, they remain under a slight outward bias and remain outwardly biased during such attachment (i.e., they have not returned to their natural positions). In alternative embodiments, when the first attachment arm 340 and the second attachment arm 370 are attached to the T-shaped support post, they can return to their natural positions. In certain embodiments, this will depend on the angle at which the arms are attached to the post. The amount of the bias may depend on a combination of the resiliency of the material used to form the clip 300 and the respective angles of the clip 300. In alternative embodiments, when the first attachment arm 340 and the second attachment arm 370 are attached to the T-shaped support post, one or more of such arms are crimped into a final attachment position. In such alternative embodiments, one of such arms may be folded or bent into the attachment position.

In various embodiments of the present disclosure, this installation of the wire strand attachment clip 300 can be performed manually without the need for any installation tool such as by an installer using one or more of the installer's hands. In various embodiments of the present disclosure, this installation of the wire strand attachment clip 300 can be performed manually with an installation tool (not shown) such as by an installer using one or more hands with the installation tool. In various embodiments of the present disclosure, this installation of the wire strand attachment clip 300 can be performed automatically by an automatic installation tool (not shown) such as by an installer using one or more hands holding an automatic installation tool. In various such embodiments, the installation tool (not shown) includes a magazine that holds a plurality of wire strand attachment clips 300 that are fed through the manual or automatic installation tool. In various such embodiments, the installation tool (not shown) includes a magazine that holds a plurality of collated group of wire strand attachment clips 300 that are fed through the installation tool. The collated wire strand attachment clips may be collated in any suitable manner.

Figure 23:
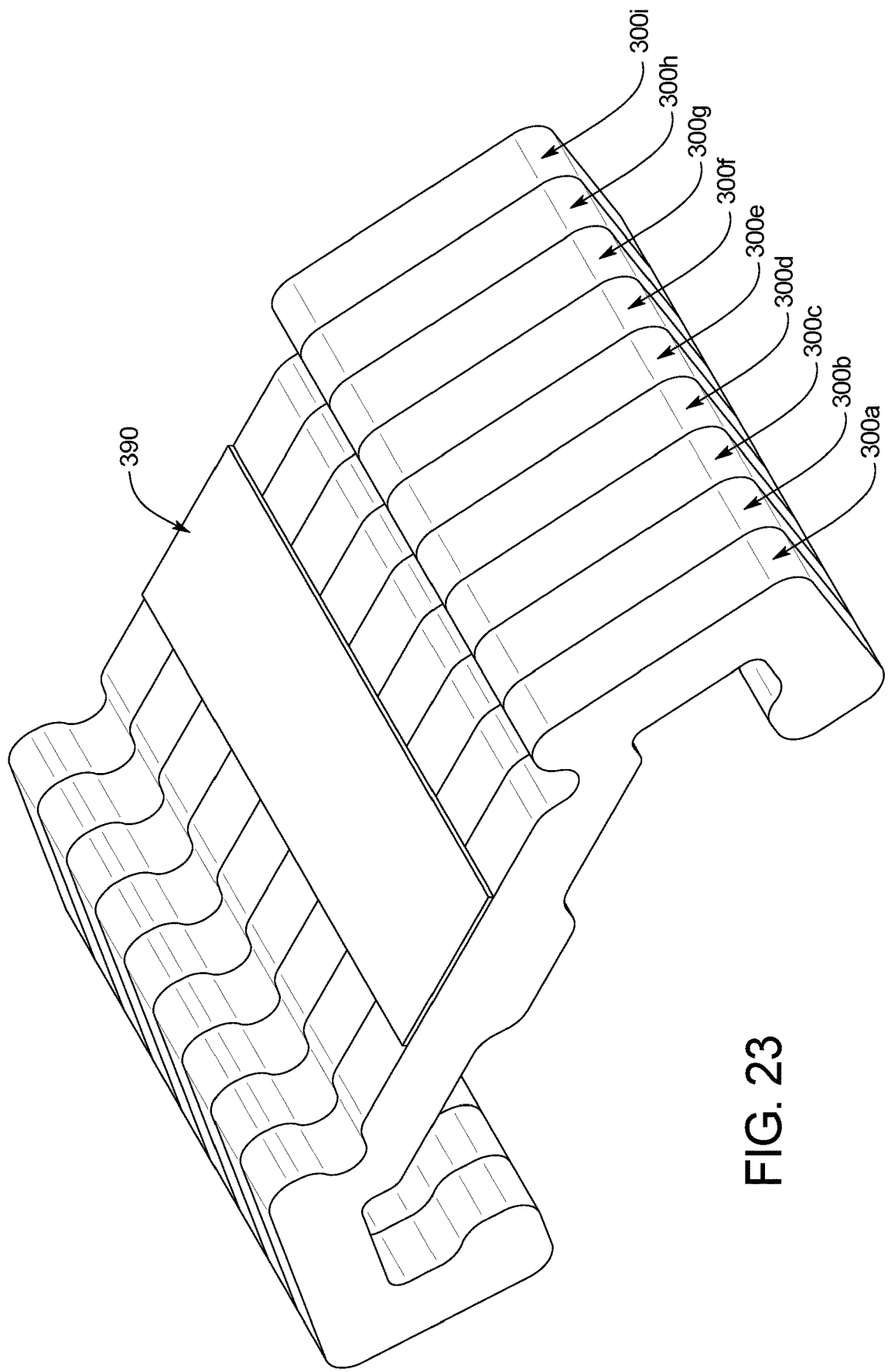
FIG. 23 is a perspective view of a collated group of a plurality of the wire strand attachment clips of FIG. 20.
Figure 24:
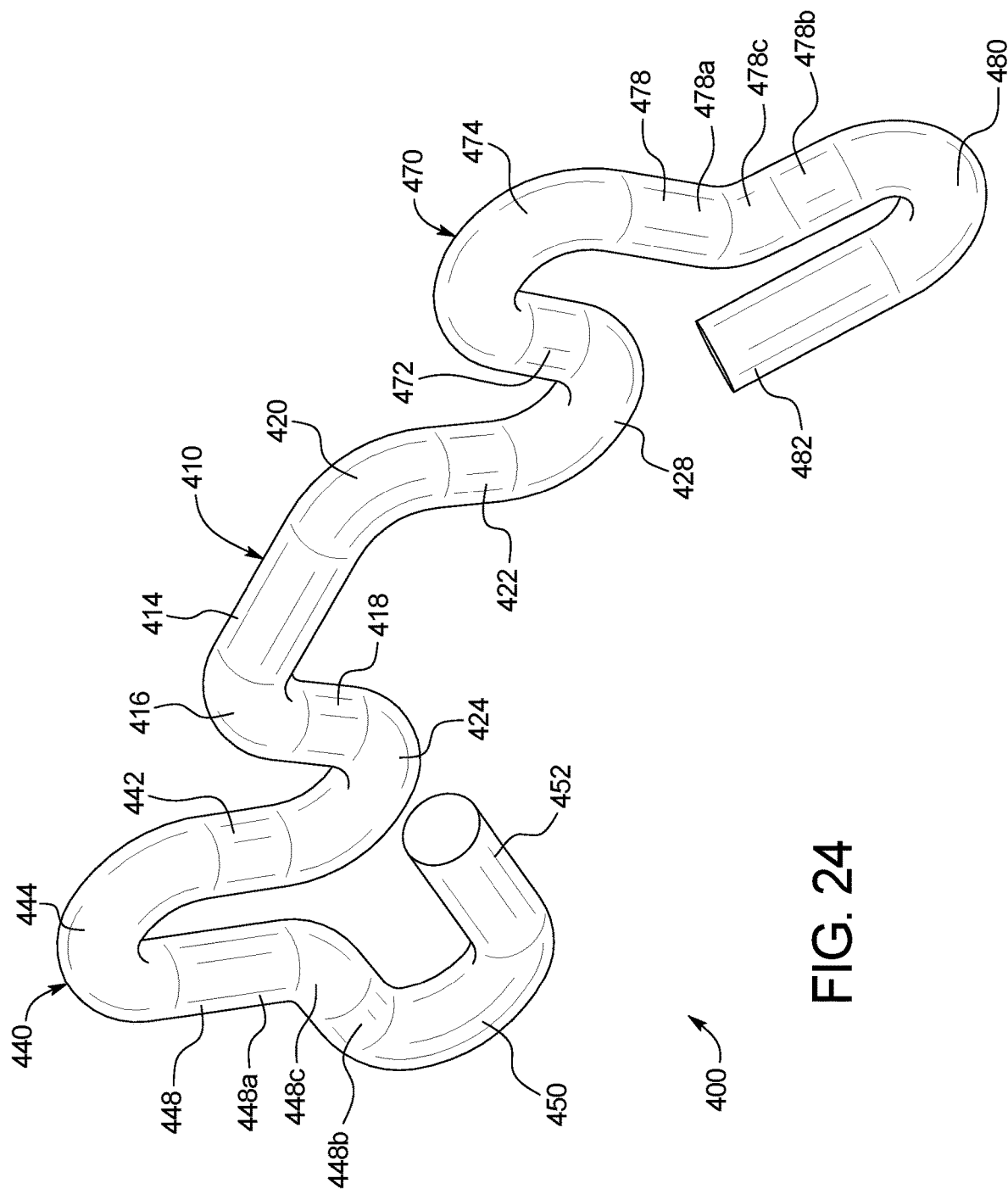
FIG. 24 is a perspective view of a wire strand attachment clip of another example embodiment of the present disclosure.
Figure 25:
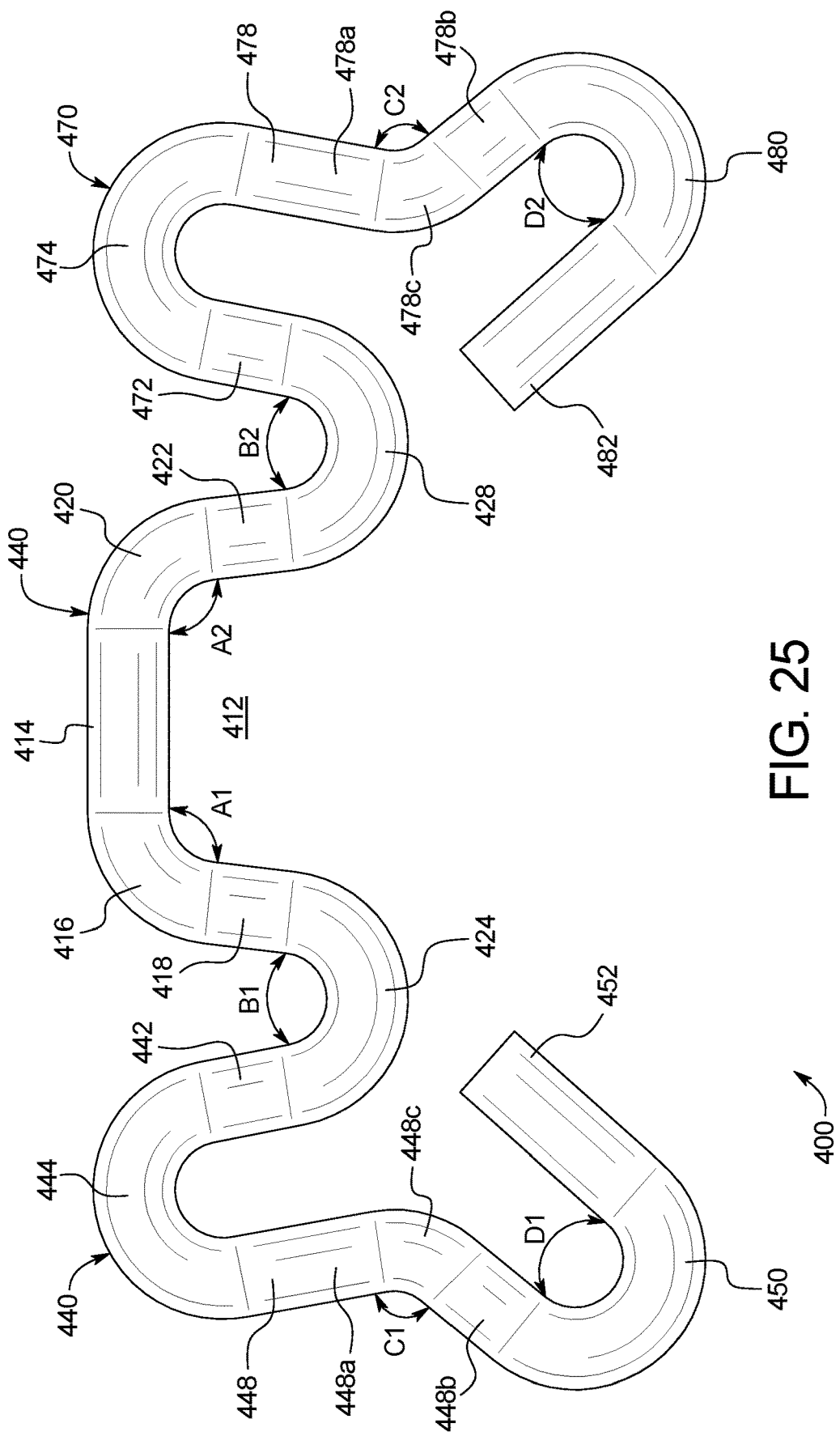
FIG. 25 is a front view of the wire strand attachment clip of FIG. 24.
Figure 26:
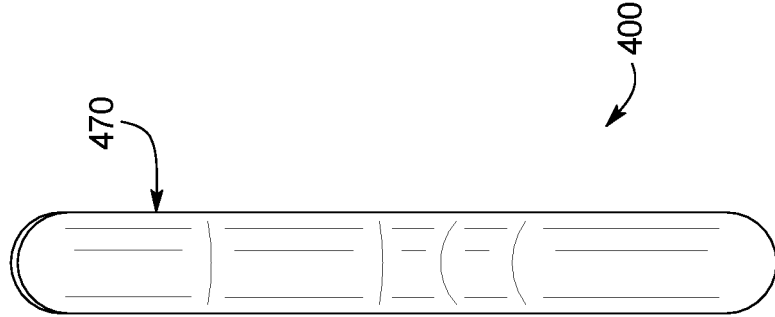
FIG. 26 is an end view of the wire strand attachment clip of FIG. 24.
Figure 27:
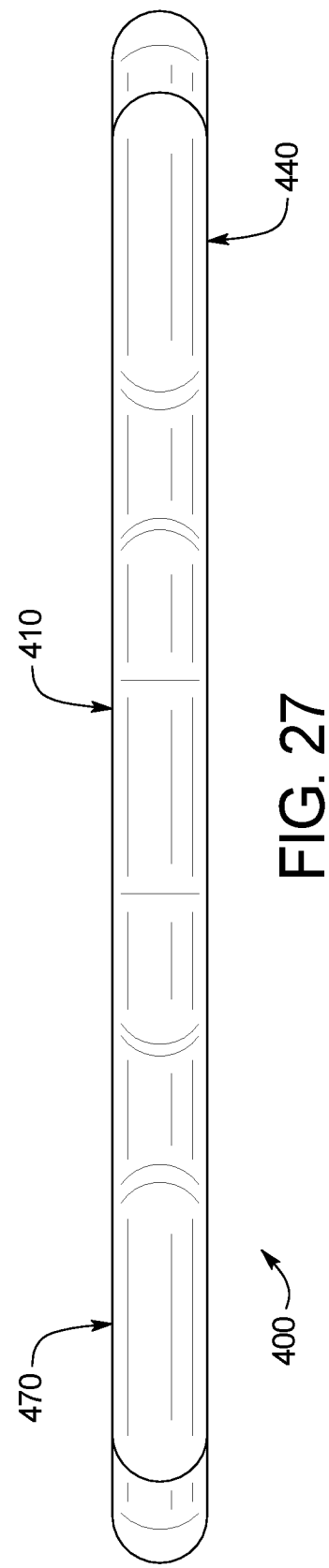
FIG. 27 is a top view of the wire strand attachment clip of FIG. 24.

FIG. 23 shows one way in which a plurality of wire strand attachment clips 300 may be attached and collated in a group such as a group for loading into a magazine attachable or attachable to an installation tool (not shown) such as a powered automatic installation tool (not shown). The example plurality of wire strand attachment clips 300a, 300b, 300c, 300d, 310e, 300f, 300g, 300h, and 300i are positioned bottom side to top side and attached by a clip attachment member 390. In this illustrated example embodiment, the clip attachment member 390 is a section of a suitable tape such as an adhesive backed paper tape. In this illustrated example embodiment, the clip attachment member 390 is attached to the respective wire catches and particularly the respective the rear wire engagers of the wire strand attachment clips 300a, 300b, 300c, 300d, 310e, 300f, 300g, 300h, and 300i. It should be appreciated that: (1) the quantity of wire strand attachment clips in each group; (2) the quantity of clip attachment members; and (3) the placement of the clip attachment members, may all vary in accordance with the present disclosure.

It should also be appreciated that the configuration of the wire strand attachment clip 300 provides a significant advantage over prior known wire strand attachment devices by providing the ability to be collated such as the ability to be collated in a bottom side to top side manner for adjacent clips 300. It should also be appreciated that the configuration of the wire strand attachment clip 300 facilitates attachment by one or more clip attachment members to one or more respective directly adjacent sections of the directly adjacently positioned clips 300. It should also be appreciated that the relatively short height of the wire strand attachment clip 300 also facilitates this collation. It should also be appreciated that the flat top and flat bottom surfaces of the wire strand attachment clip 300 also facilitates this collation.

FIGS. 24, 25, 26, 27, and 28 illustrate another example embodiment of a wire strand attachment clip of the present disclosure generally indicated by numeral 400 (and sometimes referred to herein as the "clip" for brevity). The illustrated example wire strand attachment clip 400 includes: (1) a wire catch 410; (2) a first attachment arm 440 connected to and extending from the wire catch 410; and (3) a second attachment arm 470 connected to and extending from the wire catch 410. Generally, the wire catch 410, the first attachment arm 440, and the second attachment arm 470 are dimensionally and biasingly configured to snap onto a T-shaped support post to attach a wire strand to that T-shaped support post, and particularly such that the wire catch 410 and/or the attachments arms 440 and 470 engage(s) spaced apart rear or side surfaces of the T-shaped support post, such that the first and second attachment arms 440 and 470 engage spaced apart front surfaces of the T-shaped support post, and such that the wire catch 410 can engage and hold the wire strand to the T-shaped support post. This illustrated example wire strand attachment clip 400 is similar to the wire strand attachment clip 100, except certain of the straight sections of clip 400 are formed as curved sections, certain of the sections of the clip 400 are longer, and certain of the angles have changed or been added. Since this illustrated example wire strand attachment clip 400 is similar to the wire strand attachment clip 100, only certain aspects and components of this clip 400 are described in this section for brevity. The features, functions, and alternatives described above regarding clip 100 thus also apply to this clip 400. In this illustrated example embodiment, the wire strand attachment clip 400 is formed (and particularly bent) into its shape from a solid straight cylindrical metal (and particularly steel) wire having about a 0.124 inch to about a 0.138 inch (about a 3.15 mm to about a 3.5 mm) outer diameter and a suitable length. It should be appreciated that the wire strand attachment clip 400 can be formed from other suitable materials and formed from other wires having other suitable outer diameters and lengths. The wire strand attachment clip 400 is formed such that the wire catch 410, the first attachment arm 440, and the second attachment arm 470 each have a desired amount of flexibility or bendability relative to each other, and a reasonably strong bias back toward their respective original positions relative to one another, as further described below.

More specifically, the illustrated example wire catch 410 includes: (1) a rear wire engager 414; (2) a first connector 416 connected to and extending forwardly and outwardly from a first end of the rear wire engager 414; (3) a first side wire engager 418 connected to and extending forwardly from the first connector 416 and from the first end of the rear wire engager 414; (4) a second connector 420 connected to and extending forwardly and outwardly from a second end of the rear wire engager 414; (5) a second side wire engager 422 connected to and extending forwardly from the second connector 420 and the second end of the rear wire engager 414; (6) a combination third connector and first post engager 424 connected to and extending forwardly and outwardly (and then inwardly and rearwardly) from a front end of the first side wire engager 418; and (7) a combination fourth connector and second post engager 428 connected to and extending forwardly and outwardly (and then inwardly and rearwardly) from a front end of the second side wire engager 422. The rear wire engager 414, the first connector 416, the first side wire engager 418, the second connector 420, the second side wire engager 422, the third connector 424, and the fourth connector 428 define a wire strand receiving and holding area 412 that receives the wire strand and also allows for certain movements of the wire strand in the wire strand receiving and holding area 412. In this illustrated example embodiment, angles labeled A1 and A2 are each about 97 degrees, and angles labeled B1 and B2 are each about 18 degrees; although these angles may vary in accordance with the present disclosure. When the wire catch 410, the first attachment arm 440, and the second attachment arm 470 are snapped onto a T-shaped support post to attach a wire strand to that T-shaped support post, the combination connector and first side post engager 424 and the combination connector and second side post engager 428 are configured to, in certain instances, securely engage spaced apart rear surfaces of the T-shaped support post to provide a secure attachment of the wire strand attachment clip 400 to the T-shaped support post and to prevent the wire strand from exiting the wire strand receiving and holding area 412.

The illustrated example first attachment arm 440 includes: (1) a first upper arm 442 connected to and extending outwardly and rearwardly from the combination third connector and first post engager; (2) a first elbow 444 connected to and extending outwardly and then forwardly from the first upper arm 442; (3) a first forearm 448 connected to and extending outwardly and forwardly from the first elbow 444; (4) a first wrist 450 connected to and extending outwardly and forwardly from the first forearm 448 and then rearwardly and inwardly back toward the rear wire engager 414; and (5) a first post engagement hand 452 connected to and extending inwardly and rearwardly from first wrist 450 toward the rear wire engager 414. In this illustrated example embodiment, the first forearm 448 includes a first straight section 448a connected to a second straight section 448b by a third curved section 448c.

The illustrated example second attachment arm 470 includes: (1) a second upper arm 472 connected to and extending outwardly and rearwardly from the combination connector and second side post engager 428; (2) a second elbow 474 connected to and extending outwardly and then forwardly from the second upper arm 472; (3) a second forearm 478 connected to and extending outwardly and forwardly from the second elbow 474; (4) a second wrist 480 connected to and extending outwardly and forwardly from the second forearm 478 and then rearwardly and inwardly back toward the rear wire engager 414; and (5) a second post engagement hand 482 connected to and extending inwardly and rearwardly from second wrist 480 toward the rear wire engager 414. In this illustrated example embodiment, the second forearm 478 includes a first straight section 478a connected to a second straight section 478b by a third curved section 478c. In this illustrated example embodiment, angles labeled C1 and C2 and are each about 136 degrees and angles labeled D1 and D2 and are each about 180 degrees, although these angles may vary in accordance with the present disclosure.

When the wire catch 410, the first attachment arm 440, and the second attachment arm 470 are snapped onto a T-shaped support post to attach a wire strand to that T-shaped support post, the first arm shoulder 441, the first post engagement hand 452, the first arm shoulder 471, and the second post engagement hand 482 are configured to securely engage spaced apart front surfaces of the T-shaped support post to provide a secure attachment of the wire strand attachment clip 400 to the T-shaped support post and to prevent the wire strand from exiting the wire strand receiving and holding area 412. In this example embodiment, it is estimated that the energy level needed for attaching the clip 400 to a T-shaped support post will be about 6.68 Joules. This energy level will enable manual attachment or attachment using a suitable tool as described below. In this example embodiment, it is estimated that the force level needed for removal of the clip 400 from a T-shaped support post 20 will be about 278 lbs (about 127 kgs).

In various embodiments of the present disclosure, this installation of the wire strand attachment clip 400 can be performed manually without the need for any installation tool such as by an installer using one or more of the installer's hands. In various embodiments of the present disclosure, this installation of the wire strand attachment clip 400 can be performed manually with an installation tool (not shown) such as by an installer using one or more hands with the installation tool. In various embodiments of the present disclosure, this installation of the wire strand attachment clip 400 can be performed automatically by an automatic installation tool (not shown) such as by an installer using one or more hands holding an automatic installation tool. In various such embodiments, the installation tool (not shown) includes a magazine that holds a plurality of wire strand attachment clips 400 that are fed through the manual or automatic installation tool. In various such embodiments, the installation tool (not shown) includes a magazine that holds a plurality of collated group of wire strand attachment clips 400 that are fed through the installation tool. The collated wire strand attachment clips may be collated in any suitable manner.

Figure 28:
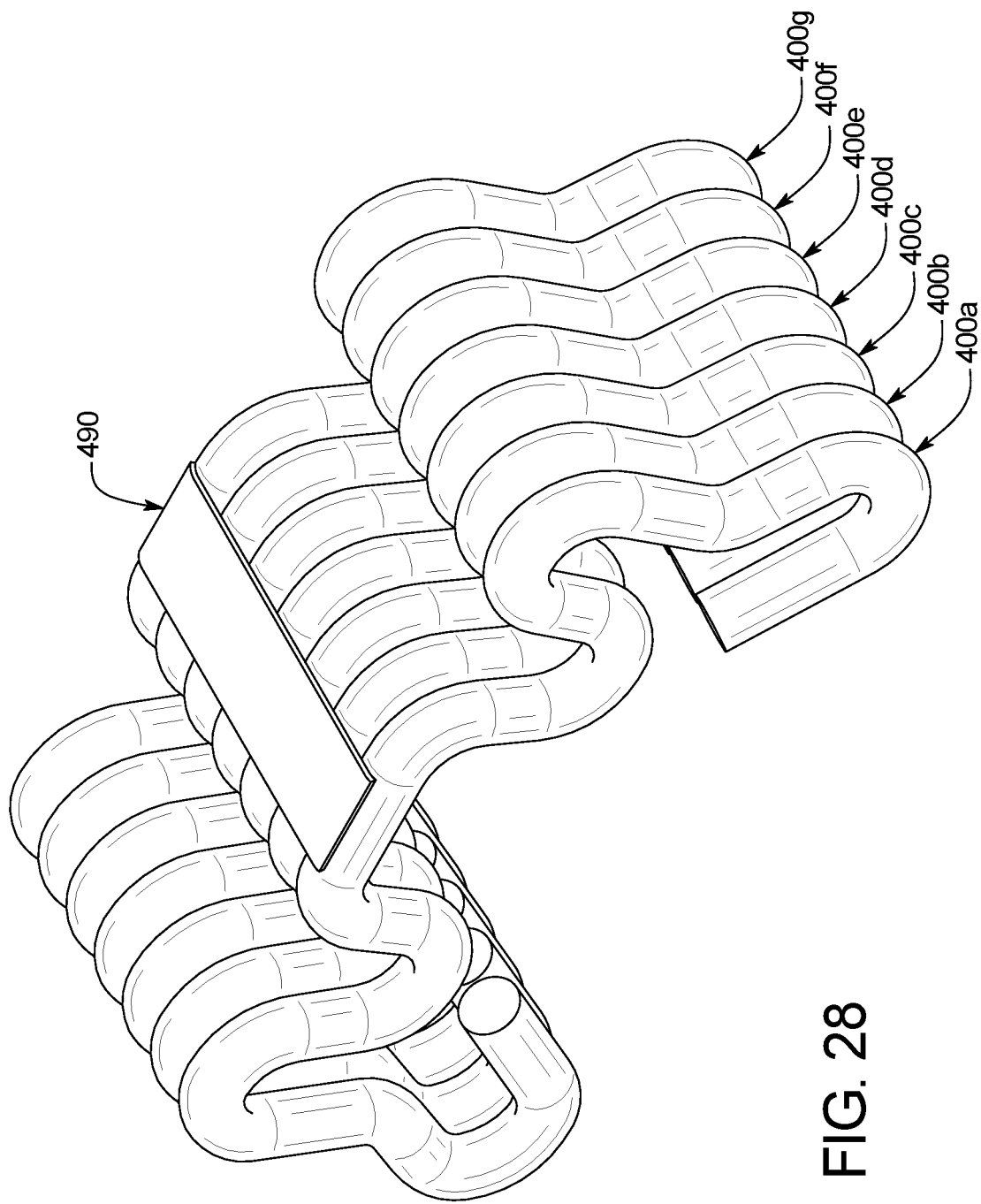
FIG. 28 is a perspective view of a collated group of a plurality of the wire strand attachment clips of FIG. 24.
Figure 29:
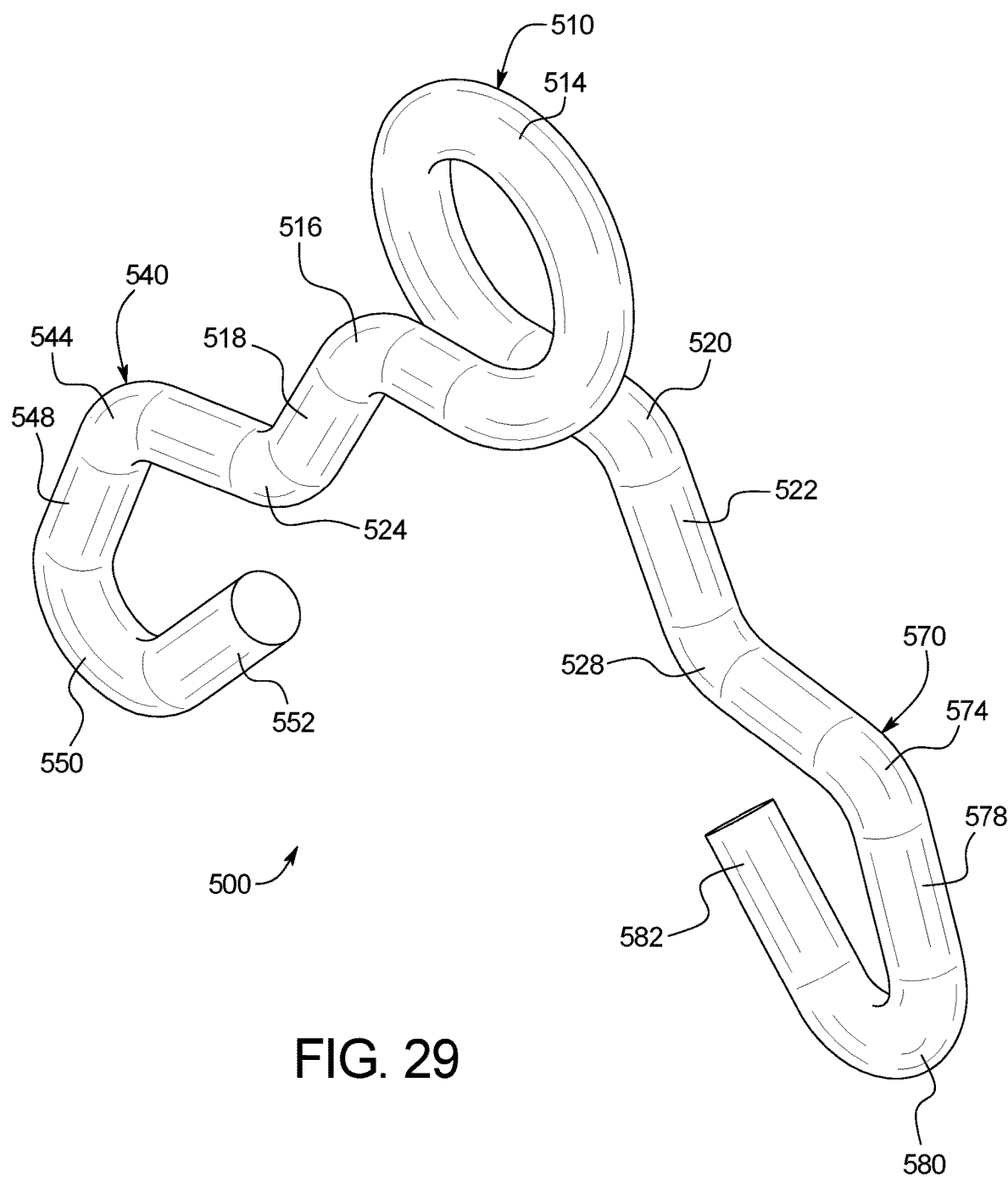
FIG. 29 is a perspective view of a wire strand attachment clip of another example embodiment of the present disclosure.
Figure 30:
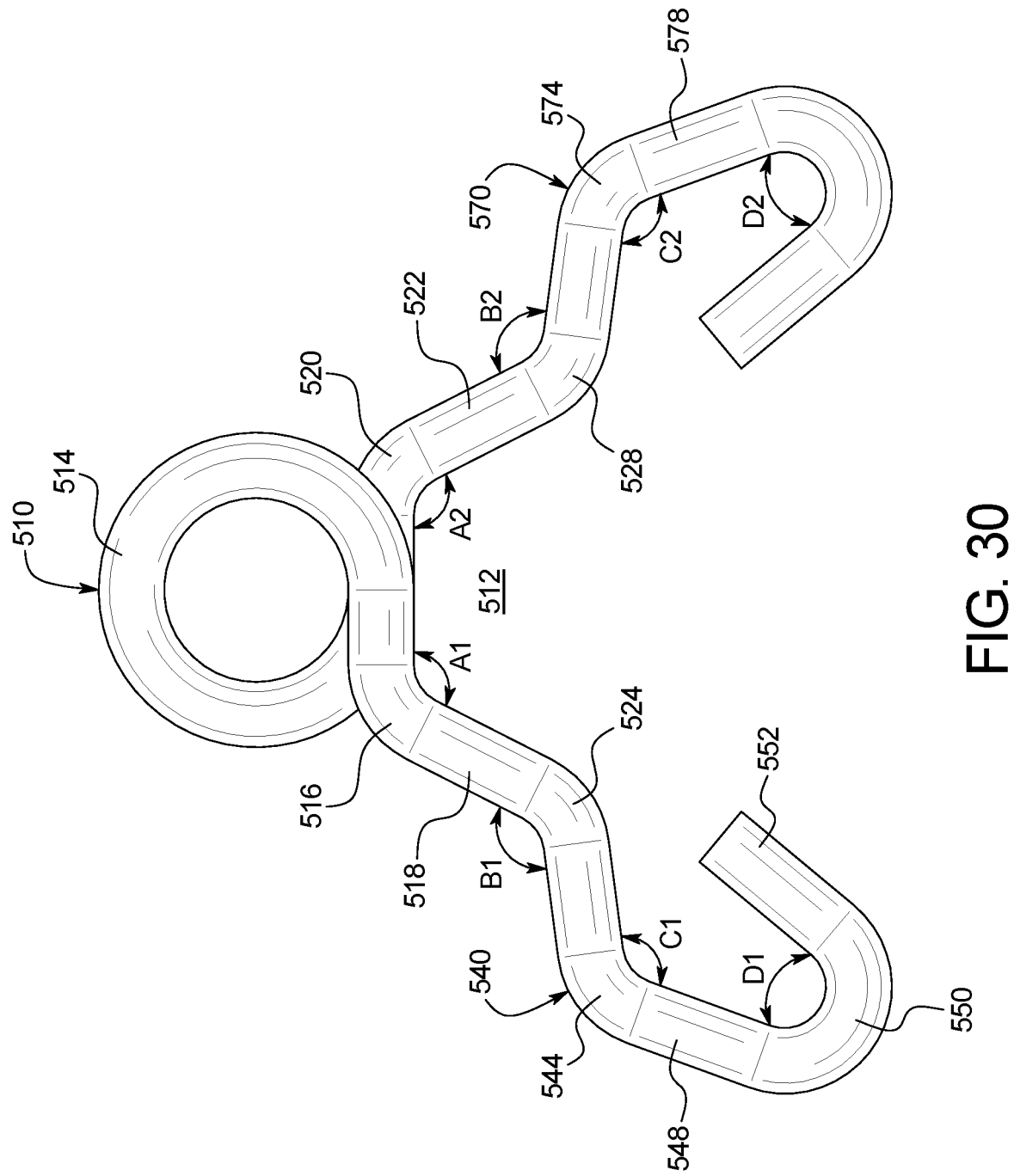
FIG. 30 is a front view of the wire strand attachment clip of FIG. 29.
Figure 31:
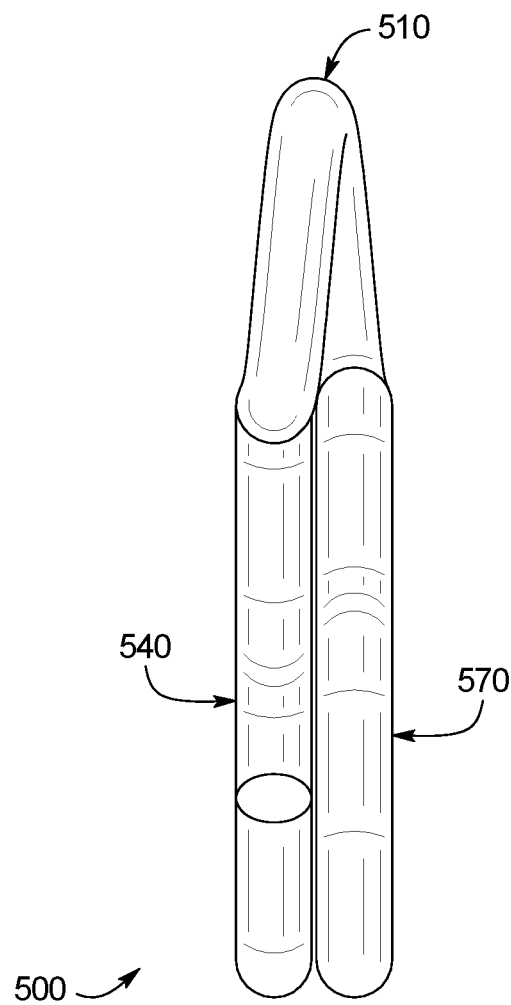
FIG. 31 is an end view of the wire strand attachment clip of FIG. 29.
Figure 32:
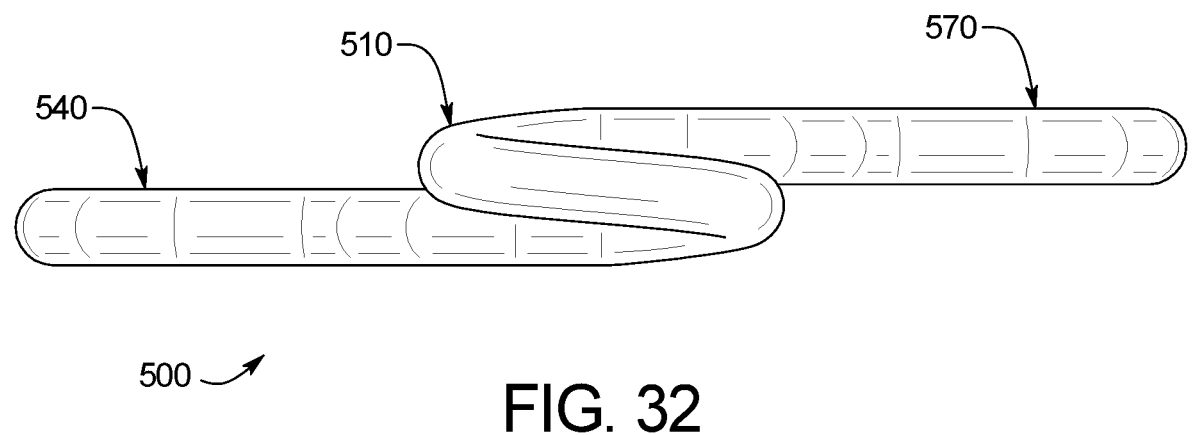
FIG. 32 is a top view of the wire strand attachment clip of FIG. 29.

FIG. 28 shows one way in which a plurality of wire strand attachment clips 400 may be attached and collated in a group such as a group for loading into a magazine attachable or attachable to an installation tool (not shown) such as a powered automatic installation tool (not shown). The example plurality of wire strand attachment clips 400a, 400b, 400c, 400d, 400e, 400f, and 400g are positioned bottom side to top side and attached by a plurality of clip attachment member 490. In this illustrated example embodiment, the clip attachment member 490 is a section of a suitable tape such as an adhesive backed paper tape. In this illustrated example embodiment, the clip attachment member 490 is attached to the respective wire catches and particularly the respective the rear wire engagers of the wire strand attachment clips 400a, 400b, 400c, 400d, 400e, 400f, and 400g. It should be appreciated that: (1) the quantity of wire strand attachment clips in each group; (2) the quantity of clip attachment members; and (3) the placement of the clip attachment members, may all vary in accordance with the present disclosure. It should also be appreciated that the configuration of the wire strand attachment clip 400 provides a significant advantage over prior known wire strand attachment devices by providing the ability to be collated such as the ability to be collated in a bottom side to top side manner for adjacent clips 400. It should also be appreciated that the configuration of the wire strand attachment clip 400 facilitates attachment by one or more clip attachment members to one or more respective directly adjacent sections of the directly adjacently positioned clips 400. It should also be appreciated that the relatively short height of the wire strand attachment clip 100 also facilitates this collations.

FIGS. 29, 30, 31, 32, and 33 illustrate another example embodiment of a wire strand attachment clip of the present disclosure generally indicated by numeral 500 (and sometimes referred to herein as the "clip" for brevity). The illustrated example wire strand attachment clip 500 includes: (1) a wire catch 510; (2) a first attachment arm 540 connected to and extending from the wire catch 510; and (3) a second attachment arm 570 connected to and extending from the wire catch 510. Generally, the wire catch 510, the first attachment arm 540, and the second attachment arm 570 are dimensionally and biasingly configured to snap onto a T-shaped support post to attach a wire strand to that T-shaped support post, and particularly such that the wire catch 510 and/or the attachments arms 540 and 570 engage (s) spaced apart rear or side surfaces of the T-shaped support post, such that the first and second attachment arms 540 and 570 engage spaced apart front surfaces of the T-shaped support post, and such that the wire catch 510 can engage and hold the wire strand to the T-shaped support post. This illustrated example wire strand attachment clip 500 is somewhat similar in function to the wire strand attachment clip 100. Since this illustrated example wire strand attachment clip 500 is somewhat similar to the wire strand attachment clip 100, only certain aspects and components of this clip 500 are described in this section for brevity. The features, functions, and alternatives described above regarding clip 100 thus also apply to this clip 500. In this illustrated example embodiment, the wire strand attachment clip 500 is formed (and particularly bent) into its shape from a solid straight cylindrical metal (and particularly steel) wire having about a 0.124 inch to about a 0.138 inch (about a 3.15 mm to about a 3.5 mm) outer diameter and a suitable length. It should be appreciated that the wire strand attachment clip 500 can be formed from other suitable materials and formed from other wires having other suitable outer diameters and lengths. The wire strand attachment clip 500 is formed such that the wire catch 510, the first attachment arm 540, and the second attachment arm 570 each have a desired amount of flexibility or bendability relative to each other, and a reasonably strong bias back toward their respective original positions relative to one another, as further described below.

More specifically, the illustrated example wire catch 510 includes: (1) a rear wire engager 514; (2) a first connector 516 connected to and extending forwardly and outwardly from a first end of the rear wire engager 514; (3) a first side wire engager 518 connected to and extending forwardly from the first connector 516 and from the first end of the rear wire engager 514; (4) a second connector 520 connected to and extending forwardly and outwardly from a second end of the rear wire engager 514; (5) a second side wire engager 522 connected to and extending forwardly from the second connector 520 and the second end of the rear wire engager 514; (6) a combination third connector and first post engager 524 connected to and extending forwardly and outwardly from a front end of the first side wire engager 518; and (7) a combination fourth connector and second post engager 528 connected to and extending forwardly and outwardly from a front end of the second side wire engager 522. The rear wire engager 514, the first connector 516, the first side wire engager 518, the second connector 520, and the second side wire engager 522 define a wire strand receiving and holding area 512 that receives the wire strand and also allows for certain movements of the wire strand in the wire strand receiving and holding area 512. In this illustrated example embodiment, the rear wire engager 514 include a loop with two forward surfaces (not labeled) configured to engage the wire strand. In this illustrated example embodiment, angles labeled A1 and A2 are each about 120 degrees and angles labeled B1 and B2 are each about 120 degrees, although these angles may vary in accordance with the present disclosure. When the wire catch 510, the first attachment arm 540, and the second attachment arm 570 are snapped onto a T-shaped support post to attach a wire strand to that T-shaped support post, the combination connector and first side post engager 524 and the combination connector and second side post engager 528 are configured to, in certain instances, securely engage spaced apart rear surfaces of the T-shaped support post to provide a secure attachment of the wire strand attachment clip 500 to the T-shaped support post and to prevent the wire strand from exiting the wire strand receiving and holding area 512.

The illustrated example first attachment arm 540 includes: (1) a first elbow 544 connected to and extending outwardly and then forwardly from the combination third connector and first post engager 524; (2) a first forearm 548 connected to and extending outwardly and forwardly from the first elbow 544; (3) a first wrist 350 connected to and extending outwardly and forwardly from the first forearm 548 and then rearwardly and inwardly back toward the combination third connector and first post engager 524; and (4) a first post engagement hand 552 connected to and extending inwardly and rearwardly from first wrist 550 toward the combination third connector and first post engager 524. The illustrated example second attachment arm 570 includes: (1) a second elbow 574 connected to and extending outwardly and then forwardly from the combination fourth connector and second post engager 528; (2) a second forearm 578 connected to and extending outwardly and forwardly from the second elbow 574; (3) a second wrist 580 connected to and extending outwardly and forwardly from the second forearm 578 and then rearwardly and inwardly back toward the combination fourth connector and second post engager 528; and (4) a second post engagement hand 582 connected to and extending inwardly and rearwardly from second wrist 580 toward the combination fourth connector and second post engager 528. In this illustrated example embodiment, angles labeled C1 and C2 and are each about 126 degrees and angles labeled D1 and D2 and are each about 25 degrees, although these angles may vary in accordance with the present disclosure. When the wire catch 510, the first attachment arm 540, and the second attachment arm 570 are snapped onto a T-shaped support post to attach a wire strand to that T-shaped support post, the first post engagement hand 552 and the second post engagement hand 582 are configured to securely engage spaced apart front surfaces of the T-shaped support post to provide a secure attachment of the wire strand attachment clip 500 to the T-shaped support post and to prevent the wire strand from exiting the wire strand receiving and holding area 512. In this example embodiment, it is estimated that the energy level needed for attaching the clip 500 to a T-shaped support post will be about 3.11 Joules. This energy level will enable manual attachment or attachment using a suitable tool as described below. In this example embodiment, it is estimated that the force level needed for removal of the clip 500 from a T-shaped support post will be about 489 lbs (about 222 kgs).

In various embodiments of the present disclosure, this installation of the wire strand attachment clip 500 can be performed manually without the need for any installation tool such as by an installer using one or more of the installer's hands. In various embodiments of the present disclosure, this installation of the wire strand attachment clip 500 can be performed manually with an installation tool (not shown) such as by an installer using one or more hands with the installation tool. In various embodiments of the present disclosure, this installation of the wire strand attachment clip 500 can be performed automatically by an automatic installation tool (not shown) such as by an installer using one or more hands holding an automatic installation tool. In various such embodiments, the installation tool (not shown) includes a magazine that holds a plurality of wire strand attachment clips 500 that are fed through the manual or automatic installation tool. In various such embodiments, the installation tool (not shown) includes a magazine that holds a plurality of collated group of wire strand attachment clips 500 that are fed through the installation tool. The collated wire strand attachment clips may be collated in any suitable manner.

Figure 33:
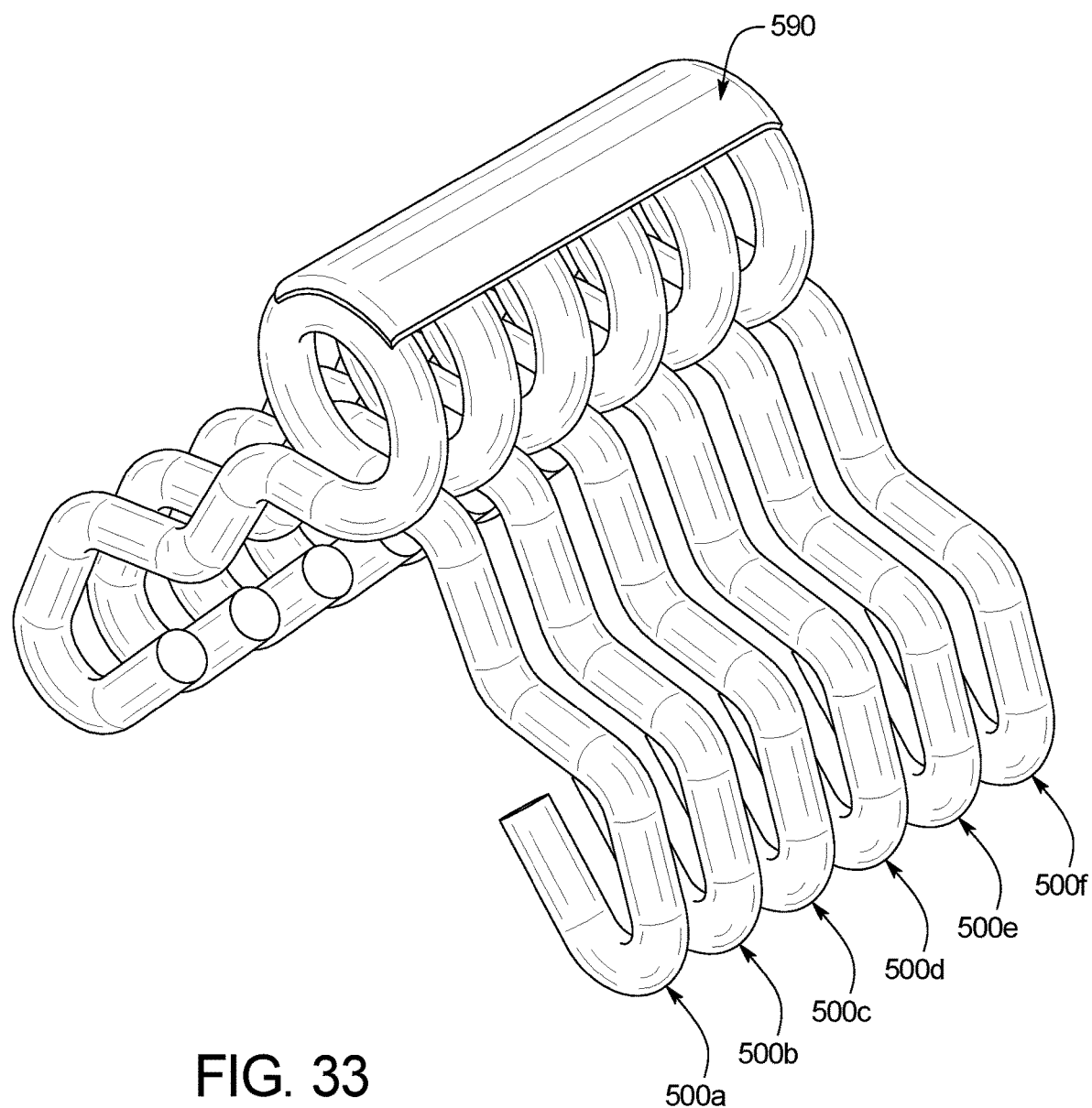
FIG. 33 is a perspective view of a collated group of a plurality of the wire strand attachment clips of FIG. 29.

FIG. 33 shows one way in which a plurality of wire strand attachment clips 100 may be attached and collated in a group such as a group for loading into a magazine attachable or attachable to an installation tool (not shown) such as a powered automatic installation tool (not shown). The example plurality of wire strand attachment clips 500a, 500b, 500c, 500d, 500e, and 500f are positioned bottom side to top side and attached by a clip attachment member 590.

In this illustrated example embodiment, the clip attachment member 590 is a section of a suitable tape such as an adhesive backed paper tape. In this illustrated example embodiment, the clip attachment member 590 is attached to the respective wire catches and particularly the respective the rear wire engagers of the wire strand attachment clips 500*a*, 500*b*, 500*c*, 500*d*, 500*e*, and 500*f*. It should be appreciated that: (1) the quantity of wire strand attachment clips in each group; (2) the quantity of clip attachment members; and (3) the placement of the clip attachment members, may all vary in accordance with the present disclosure. It should also be appreciated that the configuration of the wire strand attachment clip 500 provides a significant advantage over prior known wire strand attachment devices by providing the ability to be collated such as the ability to be collated in a bottom side to top side manner for adjacent clips 500. It should also be appreciated that the configuration of the wire strand attachment clip 500 facilitates attachment by one or more clip attachment members to one or more respective directly adjacent sections of the directly adjacently positioned clips 500. It should also be appreciated that the relatively short height of the wire strand attachment clip 100 also facilitates this collations.

Figure 34:
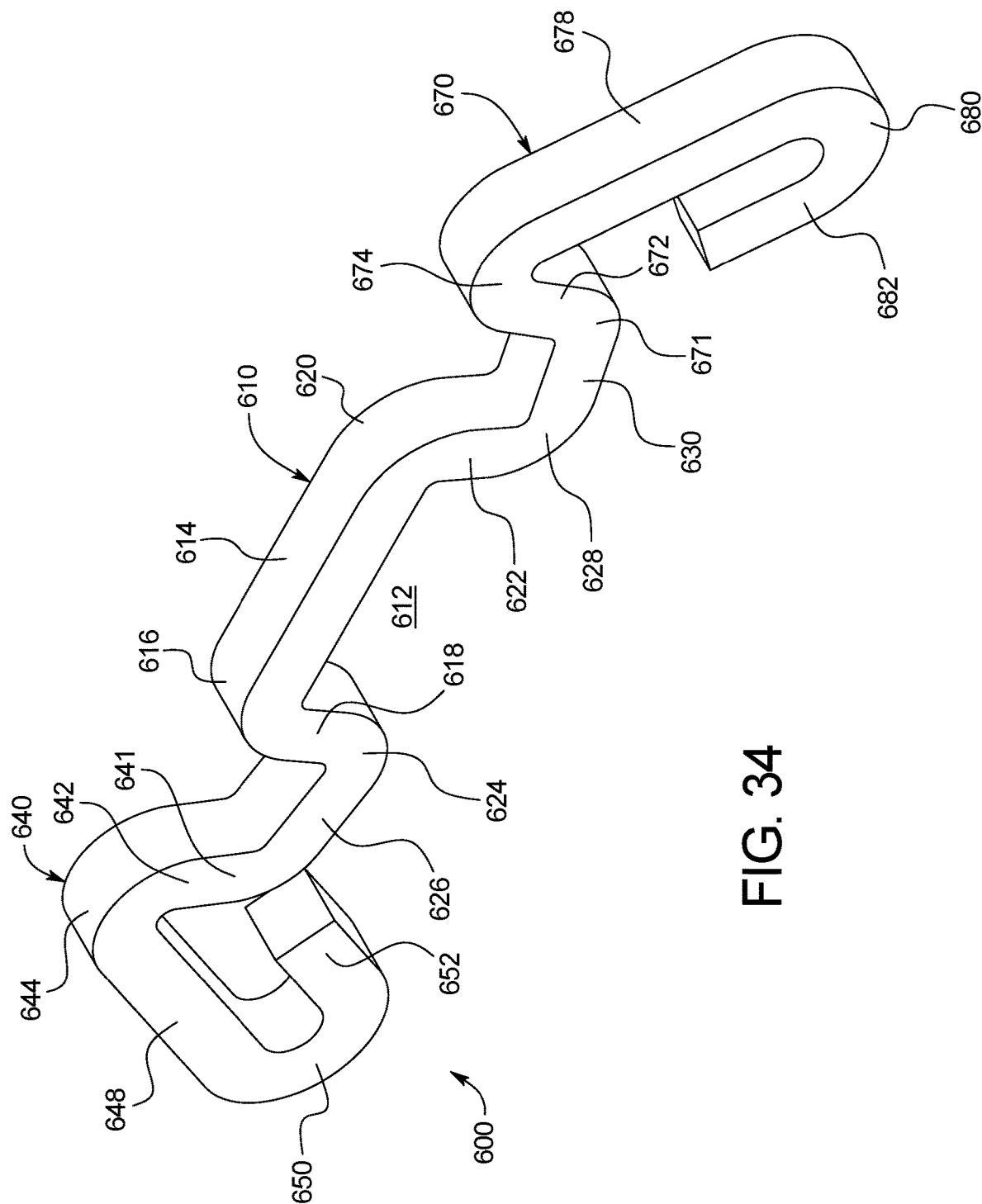
FIG. 34 is a perspective view of a wire strand attachment clip of another example embodiment of the present disclosure.
Figure 35:
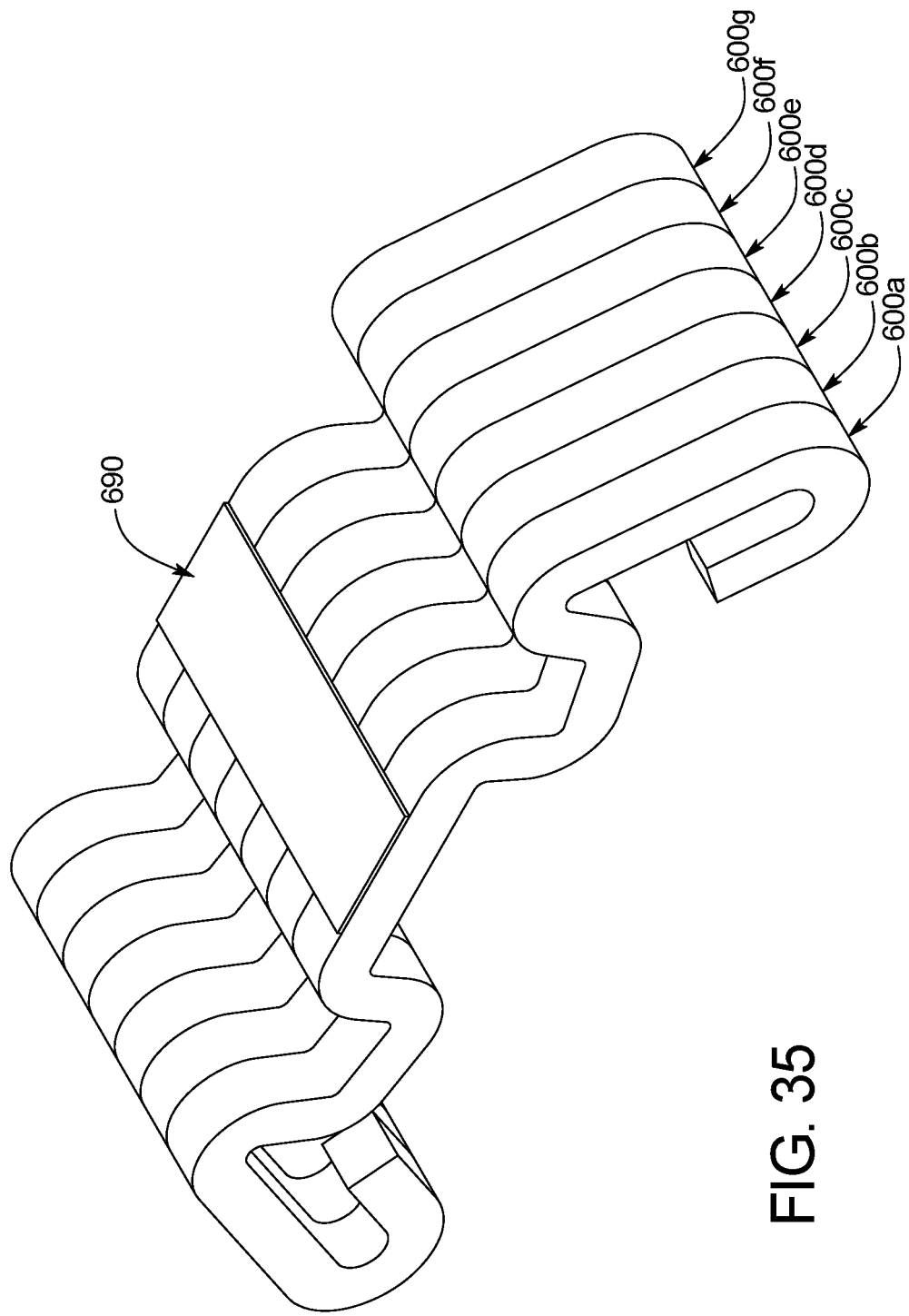
FIG. 35 is a perspective view of a collated group of a plurality of the wire strand attachment clips of FIG. 34.

FIGS. 34 and 35 illustrate another example embodiment of a wire strand attachment clip of the present disclosure generally indicated by numeral 600 (and sometimes referred to herein as the "clip" for brevity). This illustrated example wire strand attachment clip 600 includes: (1) a wire catch 610; (2) a first attachment arm 640 connected to and extending from the wire catch 610; and (3) a second attachment arm 670 connected to and extending from the wire catch 610. Generally, the wire catch 610, the first attachment arm 640, and the second attachment arm 670 are dimensionally and biasingly configured to snap onto a T-shaped support post to attach a wire strand to that T-shaped support post, and particularly such that the wire catch 610 and/or the attachments arms 640 and 670 engage(s) spaced apart rear or side surfaces of the T-shaped support post, such that the first and second attachment arms 640 and 670 engage spaced apart front surfaces of the T-shaped support post, and such that the wire catch 610 can engage and hold the wire strand to the T-shaped support post. This illustrated example wire strand attachment clip 600 is similar to the wire strand attachment clip 100, except that instead of being formed from a cylindrical wire, the wire strand attachment clip 600 is formed from a substantially rectangular or rectangular wire (such as a substantially square or square wire) and thus has flat top, flat bottom, flat front, and flat rear surfaces. This alternative configuration facilitates enhanced collation of these multiple wire strand attachment clips 600 such as clips 600*a*, 600*b*, 600*c*, 600*d*, 600*e*, 600*f*, and 600*g* as shown in FIG. 35. Since this illustrated example wire strand attachment clip 600 is similar to the wire strand attachment clip 100, only certain aspects and components of this clip 600 are described in this section for brevity. The features, functions, and alternatives described above regarding clip 100 thus also apply to this clip 600. In this illustrated example embodiment, the wire strand attachment clip 600 is formed (and particularly bent) into its shape from a solid straight substantially square metal (and particularly steel) wire having about a $^{11}/_{16}$ inch to about a $2^{1}/_{8}$ inch (about a 16 mm to about a 52 mm) height and width and a suitable length. It should be appreciated that the wire strand attachment clip 600 can be formed from other suitable materials and formed from other wires having other suitable outer diameters and lengths. The wire strand attachment clip 600 is formed such that the wire catch 610, the first attachment arm 640, and the second attachment arm 670 each have a desired amount of flexibility or bendability relative to each other, and a reasonably strong bias back toward their respective original positions relative to one another, as further described below.

Similar to the wire strand attachment clip 100, the wire strand attachment clip 600 includes a wire catch 610 including: (1) a rear wire engager 614; (2) a first connector 616 connected to and extending forwardly and outwardly from a first end of the rear wire engager 614; (3) a first side wire engager 618 connected to and extending forwardly from the first connector 616 and from the first end of the rear wire engager 614; (4) a second connector 620 connected to and extending forwardly and outwardly from a second end of the rear wire engager 614; (5) a second side wire engager 622 connected to and extending forwardly from the second connector 620 and the second end of the rear wire engager 614; (6) a third connector 624 connected to and extending forwardly and outwardly from a front end of the first side wire engager 618; (7) a first side post engager 626 connected to and extending outwardly from the third connector 624 and from the front end of the first side wire engager 618; (8) a fourth connector 628 connected to and extending forwardly and outwardly from a front end of the second side wire engager 622; and (9) a second side post engager 630 connected to and extending outwardly from the fourth connector 628 and from the front end of the second side wire engager 622. The rear wire engager 614, the first connector 616, the first side wire engager 618, the second connector 620, the second side wire engager 622, the third connector 624, and the fourth connector 628 define a wire strand receiving and holding area 612 that receives the wire strand and also allows for certain movement of the wire strand in the wire strand receiving and holding area 612. When the wire catch 610, the first attachment arm 640, and the second attachment arm 670 are snapped onto a T-shaped support post to attach a wire strand to that T-shaped support post, the first side post engager 626 and the second side post engager 630 are configured to, in certain instances, securely engage spaced apart rear surfaces of the T-shaped support post to provide a secure attachment of the wire strand attachment clip 600 to the T-shaped support post and to prevent the wire strand from exiting the wire strand receiving and holding area 612. Similar to the wire strand attachment clip 100, the illustrated example first attachment arm 640 of clip 600 includes: (1) a first arm shoulder 641 connected to and extending outwardly and rearwardly from the first side post engager 626; (2) a first upper arm 642 connected to and extending outwardly and rearwardly from the first arm shoulder 641 and from the first side post engager 626; (3) a first elbow 644 connected to and extending outwardly and then forwardly from the first upper arm 642; (4) a first forearm 648 connected to and extending outwardly and forwardly from the first elbow 644; (5) a first wrist 650 connected to and extending outwardly and forwardly from the first forearm 648 and then rearwardly and inwardly back toward the first arm shoulder 641 and the rear wire engager 614; and (6) a first post engagement hand 652 connected to and extending inwardly and rearwardly from first wrist 650 toward the first arm shoulder 641 and the rear wire engager 614. Similar to the wire strand attachment clip 100, the illustrated example second attachment arm 670 of clip 600 includes: (1) a second arm shoulder 671 connected to and extending outwardly and rearwardly from the second side post engager 630; (2) a second upper arm 672 connected to and extending outwardly and rearwardly from the second arm shoulder 671 and from the second side post engager 630; (3) a second elbow 674 connected to and extending outwardly and then forwardly from the second upper arm 672; (4) a second forearm 678 connected to and extending outwardly and forwardly from the second elbow 674; (5) a second wrist 680 connected to and extending outwardly and forwardly from the second forearm 678 and then rearwardly and inwardly back toward the second arm shoulder 671 and the rear wire engager 614; and (6) a second post engagement hand 682 connected to and extending inwardly and rearwardly from second wrist 680 toward the second arm shoulder 671 and the rear wire engager 614. In this example embodiment, it is estimated that the energy level needed for attaching the clip 600 to a T-shaped support post 20 will be about 8.68 Joules. This energy level will enable manual attachment or attachment using a suitable tool as described below. In this example embodiment, it is estimated that the force level needed for removal of the clip 600 from a T-shaped support post 20 will be about 364 lbs (about 165 kgs).

In various embodiments of the present disclosure, this installation of the wire strand attachment clip 600 can be performed manually without the need for any installation tool such as by an installer using one or more of the installer's hands. In various embodiments of the present disclosure, this installation of the wire strand attachment clip 600 can be performed manually with an installation tool (not shown) such as by an installer using one or more hands with the installation tool. In various embodiments of the present disclosure, this installation of the wire strand attachment clip 600 can be performed automatically by an automatic installation tool (not shown) such as by an installer using one or more hands holding an automatic installation tool. In various such embodiments, the installation tool (not shown) includes a magazine that holds a plurality of wire strand attachment clips 600 that are fed through the manual or automatic installation tool. In various such embodiments, the installation tool (not shown) includes a magazine that holds a plurality of collated group of wire strand attachment clips 600 that are fed through the installation tool. The collated wire strand attachment clips may be collated in any suitable manner.

FIG. 35 shows one way in which a plurality of wire strand attachment clips 600 may be attached and collated in a group such as a group for loading into a magazine attachable or attachable to an installation tool (not shown) such as a powered automatic installation tool (not shown). The example plurality of wire strand attachment clips 600a, 600b, 600c, 600d, 600e, 600f, and 600g are positioned bottom side to top side and attached by an attachment member 690. In this illustrated example embodiment, the clip attachment member 690 is a section of a suitable tape such as an adhesive backed paper tape. In this illustrated example embodiment, the clip attachment member 690 is attached to the respective wire catches and particularly the respective the rear wire engagers of the wire strand attachment clips 600a, 600b, 600c, 600d, 600e, 600f, and 600g. It should be appreciated that: (1) the quantity of wire strand attachment clips in each group; (2) the quantity of clip attachment members; and (3) the placement of the clip attachment members, may all vary in accordance with the present disclosure.

It should also be appreciated that the configuration of the wire strand attachment clip 600 provides a significant advantage over prior known wire strand attachment devices by providing the ability to be collated such as the ability to be collated in a bottom side to top side manner for adjacent clips 600. It should also be appreciated that the configuration of the wire strand attachment clip 600 facilitates attachment by one or more clip attachment members to one or more respective directly adjacent sections of the directly adjacently positioned clips 600. It should also be appreciated that the relatively short height of the wire strand attachment clip 600 also facilitates this collation. It should also be appreciated that the flat top and flat bottom surfaces of the wire strand attachment clip 100 also facilitates this collation.

It should be appreciated that for each of the above described embodiments of the wire strand attachment clip of the present disclosure, the combinations of bends in the shape of the wire strand attachment clip provide the desired amount of flexibility. It should also be appreciated that combination of bends enable the clip to function as a spring attaching the wire strand and the support post, while still allowing for certain movements of the wire strand relative to the support post (such as when an animal engages the wire stand). It should further be appreciated that the quantity, angles, and positions of the bends may vary in accordance with the present disclosure. It should be appreciated that for each of the above described embodiments of the wire strand attachment clip of the present disclosure, the shape of the wire strand attachment clip does not need to be changed for placement of that wire strand attachment clip on a T-shaped support post. For example, none of the attachment arms need to be bent during the attachment process. In other word, the attachment arms and/or the wire catch are flexed outwardly, but not bent into a different shape (such as in various known wire strand attachment devices). This enables a more simplified attachment including simplified attachment by a manual or automatic operated tool. In other words, by not having to make one or more additional bends during installation, the tool does not have to undertake any bend steps. It should be appreciated that while certain of the example wire strand attachment clips of the present disclosure are formed from rectangular members and thus have flat top and flat bottom surfaces, that various other embodiments of the wire strand attachment clips of the present disclosure may be formed with flat top and/or flat bottom surfaces to facilitate collation. It should be appreciated that each collated group of wire stand attachment clips may be considered an a wire strand attachment clip assembly or stack in accordance with the present disclosure. It should be appreciated that while a T-shaped support post is employed as an example in this disclosure, various clips of the present disclosure may be employed with other support posts such as Y-shaped support post.

Figure 36:
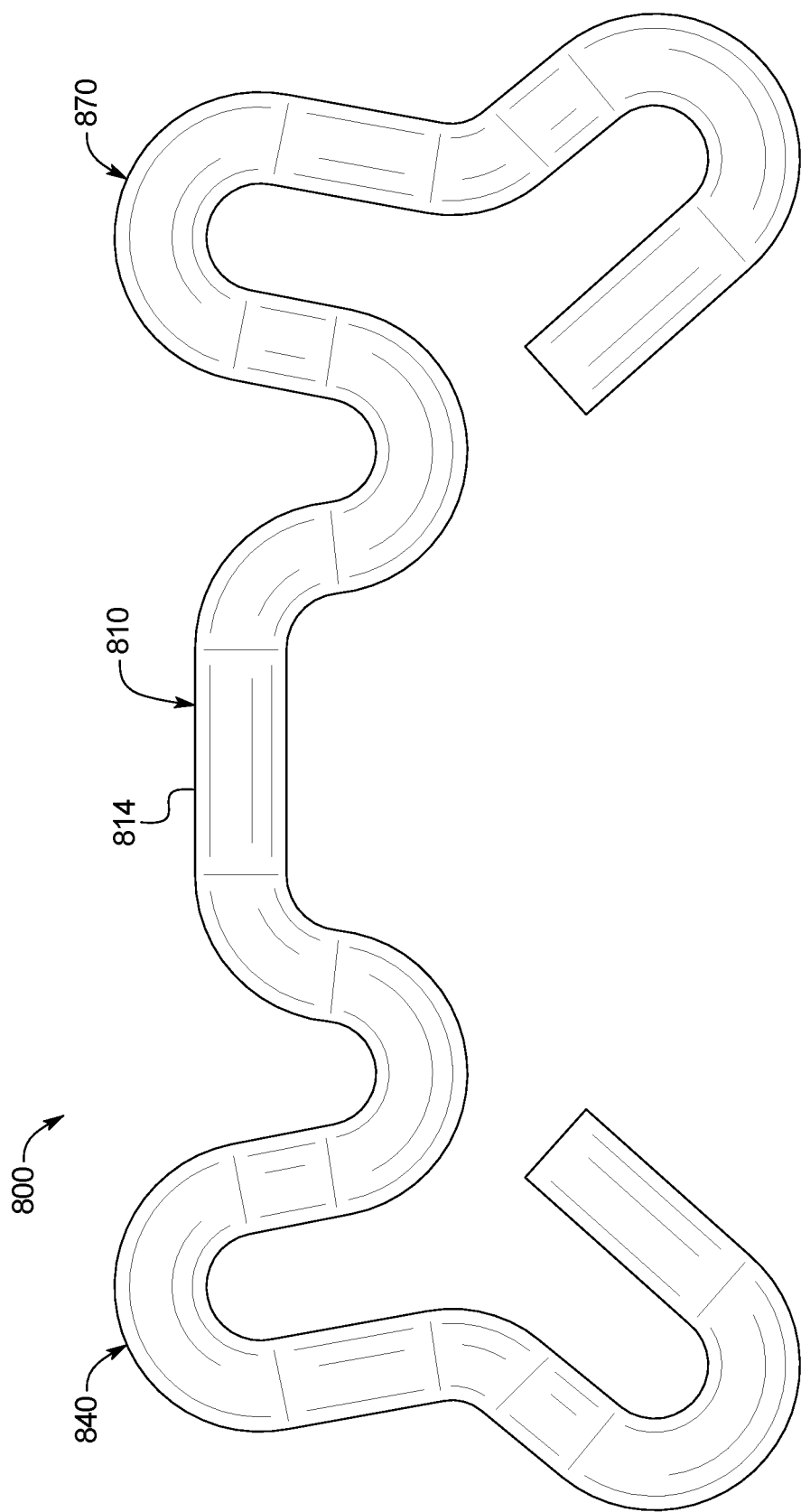
FIG. 36 is a front view of a wire strand attachment clip of another example embodiment of the present disclosure.

FIG. 36 illustrates another example embodiment of a wire strand attachment clip of the present disclosure generally indicated by numeral 800 (and sometimes referred to herein as the "clip" for brevity). The illustrated example wire strand attachment clip 800 includes: (1) a wire catch 810; (2) a first attachment arm 840 connected to and extending from the wire catch 810; and (3) a second attachment arm 870 connected to and extending from the wire catch 810. Generally, the wire catch 810, the first attachment arm 840, and the second attachment arm 870 are dimensionally and biasingly configured to snap onto a T-shaped support post to attach a wire strand to that T-shaped support post, and particularly such that the wire catch 810 and/or the attachments arms 840 and 870 engage respective surfaces of the T-shaped support post, and such that the wire catch 810 can engage and hold the wire strand to the T-shaped support post. This illustrated example wire strand attachment clip 800 is similar to the wire strand attachment clip 400, except that respective parts of the first attachment arm 840 and the second attachment arm 870 extend rearwardly relative to the rear wire engager 814 of the wire catch 810. In other words, the rear wire engager 814 is closer to the T-shaped support post when mounted on such post. This alternative causes the clip 800 to engage the wire with more force and/or to be tighter on the wire.

It should be appreciated from the above that while various embodiments of the wire strand attachment clip of the present disclosure are configured to be snapped onto the T-shaped post, other embodiments are configured to be otherwise positioned on the T-shaped post such as by bending one or more of the arms or parts thereof.

It should be appreciated that the size, length, and/or thickness of each of the above clips may vary in accordance with the present disclosure.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A wire strand attachment clip comprising:
a wire catch that defines a wire strand receiving and holding area configured to receive a wire strand, the wire catch including a rear wire engager, a first side wire engager connected to and extending forwardly from a first end of the rear wire engager, a second side wire engager connected to and extending forwardly from a second end of the rear wire engager, a first side post engager connected to and extending outwardly from the first side wire engager, and a second side post engager connected to and extending outwardly from the second side wire engager;
a first attachment arm connected to and extending from the wire catch, the first attachment arm including a first arm shoulder connected to and extending outwardly and rearwardly from the first side post engager, a first upper arm connected to and extending outwardly and rearwardly from the first arm shoulder and from the first side post engager, a first elbow connected to and extending outwardly and then forwardly from the first upper arm, a first forearm connected to and extending outwardly and forwardly from the first elbow, a first wrist connected to and extending outwardly and forwardly from the first forearm and then rearwardly and inwardly back toward the first arm shoulder and the rear wire engager, and a first post engagement hand connected to and extending inwardly and rearwardly from the first wrist toward the first arm shoulder and the rear wire engager; and
a second attachment arm connected to and extending from the wire catch, the second attachment arm including a second arm shoulder connected to and extending outwardly and rearwardly from the second side post engager, a second upper arm connected to and extending outwardly and rearwardly from the second arm shoulder and from the second side post engager, a second elbow connected to and extending outwardly and then forwardly from the second upper arm, a second forearm connected to and extending outwardly and forwardly from the second elbow, a second wrist connected to and extending outwardly and forwardly from the second forearm and then rearwardly and inwardly back toward the second arm shoulder and the rear wire engager, and a second post engagement hand connected to and extending inwardly and rearwardly from the second wrist toward the second arm shoulder and the rear wire engager,
wherein the wire catch, the first attachment arm, and the second attachment arm are dimensionally and biasingly configured to snap onto a T-shaped support post to attach the wire strand to that T-shaped support post such that the first attachment arm and the second attachment arm each engage front and rear surfaces of the T-shaped support post.

2. The wire strand attachment clip of claim 1, which is formed from a solid cylindrical metal wire.

3. The wire strand attachment clip of claim 1, which is formed from a solid rectangular metal wire.

4. The wire strand attachment clip of claim 1, wherein the wire catch includes a first connector connected to and extending forwardly and outwardly from the first end of the rear wire engager, the first side wire engager connected to and extending forwardly from the first connector, a second connector connected to and extending forwardly and outwardly from the second end of the rear wire engager, the second side wire engager connected to and extending forwardly from the second connector a third connector connected to and extending forwardly and outwardly from a front end of the first side wire engager, the first side post engager connected to and extending outwardly from the third connector, a fourth connector connected to and extending forwardly and outwardly from a front end of the second side wire engager, and the second side post engager connected to and extending outwardly from the fourth connector.

5. The wire strand attachment clip of claim 4, wherein the first connector, the second connector, the third connector, and the fourth connector are each curved sections.

6. The wire strand attachment clip of claim 5, wherein the rear wire engager, the first side wire engager, the second side wire engager, the first side post engager, and the second side post engager are each straight sections.

7. The wire strand attachment clip of claim 1, wherein the first arm shoulder, the first elbow, the first wrist, the second arm shoulder, the second elbow, and the second wrist are each formed as curved sections.

8. The wire strand attachment clip of claim 7, wherein the first upper arm, the first forearm, the first post engagement hand, the second upper arm, the second forearm, and the second post engagement hand are each straight sections.

9. A collated group of wire strand attachment clips comprising:
a plurality of wire strand attachment clips each including:
a wire catch that defines a wire strand receiving and holding area configured to receive a wire strand, the wire catch including a rear wire engager, a first side wire engager connected to and extending forwardly from a first end of the rear wire engager, a second side wire engager connected to and extending forwardly from a second end of the rear wire engager, a first side post engager connected to and extending outwardly from the first side wire engager, and a second side post engager connected to and extending outwardly from the second side wire engager,
a first attachment arm connected to and extending from the wire catch, the first attachment arm including a first arm shoulder connected to and extending outwardly and rearwardly from the first side post engager, a first upper arm connected to and extending outwardly and rearwardly from the first arm shoulder and from the first side post engager, a first elbow connected to and extending outwardly and then forwardly from the first upper arm, a first forearm connected to and extending outwardly and forwardly from the first elbow, a first wrist connected to and extending outwardly and forwardly from the first forearm and then rearwardly and inwardly back toward the first arm shoulder and the rear wire engager, and a first post engagement hand connected to and extending inwardly and rearwardly from the first wrist toward the first arm shoulder and the rear wire engager, and a second attachment arm connected to and extending from the wire catch, the second attachment arm including a second arm shoulder connected to and extending outwardly and rearwardly from the second side post engager, a second upper arm connected to and extending outwardly and rearwardly from the second arm shoulder and from the second side post engager, a second elbow connected to and extending outwardly and then forwardly from the second upper arm, a second forearm connected to and extending outwardly and forwardly from the second elbow, a second wrist connected to and extending outwardly and forwardly from the second forearm and then rearwardly and inwardly back toward the second arm shoulder and the rear wire engager, and a second post engagement hand connected to and extending inwardly and rearwardly from the second wrist toward the second arm shoulder and the rear wire engager, wherein the wire catch, the first attachment arm, and the second attachment arm are dimensionally and biasingly configured to snap onto a T-shaped support post to attach the wire strand to that T-shaped support post such that the first attachment arm and the second attachment arm each engage front and rear surfaces of the T-shaped support post; and at least one clip attachment member secured to each of the plurality of wire strand attachment clips.

10. The collated group of wire strand attachment clips of claim 9, wherein each of the wire strand attachment clips is formed from a solid cylindrical metal wire.

11. The collated group of wire strand attachment clips of claim 9, wherein each of the wire strand attachment clips is formed from a rectangular metal wire.

12. The collated group of wire strand attachment clips of claim 9, wherein the at least one clip attachment member includes a first clip attachment member secured to the wire catch of each wire strand attachment clip.

13. The collated group of wire strand attachment clips of claim 9, wherein the at least one clip attachment member includes a first clip attachment member secured to the wire catch of each wire strand attachment clip, a second clip attachment member secured to the first arm of each wire strand attachment clip, and a third clip attachment member secured to the second arm of each wire strand attachment clip.

14. The collated group of wire strand attachment clips of claim 9, wherein each wire strand attachment clip has a top surface and a bottom surface, and wherein part of the top surface of one of the wire strand attachment clips is positioned adjacent to part of the bottom surface of another one of the wire strand attachment clips.

15. The collated group of wire strand attachment clips of claim 9, wherein all of the top surface of one of the wire strand attachment clips is positioned adjacent to all of the bottom surface of another one of the wire strand attachment clips.

16. The collated group of wire strand attachment clips of claim 9, wherein all of the top surfaces all of the wire strand attachment clips are flat and all of the bottom surfaces of all of the wire strand attachment clips are flat.

\* \* \* \* \*